US011887371B2

(12) United States Patent
Walker et al.

(10) Patent No.: US 11,887,371 B2
(45) Date of Patent: Jan. 30, 2024

(54) THUMBNAIL VIDEO SEGMENTATION IDENTIFYING THUMBNAIL LOCATIONS FOR A VIDEO

(71) Applicant: ADOBE INC., San Jose, CA (US)

(72) Inventors: Seth Walker, Oakland, CA (US);
Hijung Shin, Arlington, MA (US);
Cristin Ailidh Fraser, San Diego, CA (US); Aseem Agarwala, Seattle, WA (US); Lubomira Dontcheva, Seattle, WA (US); Joel Richard Brandt, Venice, CA (US); Jovan Popović, Seattle, WA (US); Joy Oakyung Kim, Menlo Park, CA (US); Justin Salamon, San Francisco, CA (US); Jui-hsien Wang, Sammamish, WA (US); Timothy Jeewun Ganter, Woodinville, WA (US); Xue Bai, Bellevue, WA (US); Dingzeyu Li, Seattle, WA (US)

(73) Assignee: Adobe Inc., San Jose, CA (US)

( * ) Notice: Subject to any disclaimer, the term of this patent is extended or adjusted under 35 U.S.C. 154(b) by 30 days.

(21) Appl. No.: 17/330,718

(22) Filed: May 26, 2021

(65) Prior Publication Data
US 2022/0076026 A1 Mar. 10, 2022

Related U.S. Application Data

(63) Continuation-in-part of application No. 17/017,344, filed on Sep. 10, 2020, now Pat. No. 11,450,112.

(51) Int. Cl.
*G11B 27/00* (2006.01)
*G11B 27/031* (2006.01)
(Continued)

(52) U.S. Cl.
CPC ............ *G06V 20/49* (2022.01); *G06V 10/751* (2022.01); *G06V 20/46* (2022.01); *G06V 40/161* (2022.01); *G11B 27/10* (2013.01)

(58) Field of Classification Search
CPC ....... G11B 27/10; G11B 27/031; G11B 27/34; G11B 27/00; G11B 27/02; G06V 10/751;
(Continued)

(56) References Cited

U.S. PATENT DOCUMENTS 6,104,398 A 8/2000 Cox, Jr. et al.
6,400,378 B1 6/2002 Snook
(Continued)

OTHER PUBLICATIONS

Chinfat, "E15—The Tool Bar/The Selection Tool—Adobe Premiere Pro CC 2018," accessed at https://www.youtube.com/watch?v=IJRhzOqrMzA, p. 1 (May 8, 2018).
(Continued)

*Primary Examiner* — Daquan Zhao
(74) *Attorney, Agent, or Firm* — Shook, Hardy & Bacon L.L.P.

(57) ABSTRACT

Embodiments are directed to a thumbnail segmentation that defines the locations on a video timeline where thumbnails are displayed. Candidate thumbnail locations are determined from boundaries of feature ranges of the video indicating when instances of detected features are present in the video. In some embodiments, candidate thumbnail separations are penalized for being separated by less than a minimum duration corresponding to a minimum pixel separation (e.g., the width of a thumbnail) between consecutive thumbnail locations on a video timeline. The thumbnail segmentation is computed by solving a shortest path problem through a graph that models different thumbnail locations and separations. As such, a video timeline is displayed with thumbnails at locations on the timeline defined by the thumbnail seg-
(Continued)

mentation, with each thumbnail depicting a portion of the video associated with the thumbnail location.

19 Claims, 40 Drawing Sheets

(51) Int. Cl.
| | |
|---|---|
| *G11B 27/34* | (2006.01) |
| *G06V 20/40* | (2022.01) |
| *G11B 27/10* | (2006.01) |
| *G06V 10/75* | (2022.01) |
| *G06V 40/16* | (2022.01) |
| *G06V 10/82* | (2022.01) |

(58) Field of Classification Search
CPC ........ G06V 10/82; G06V 20/46; G06V 20/49; G06V 40/161; G06V 40/172
USPC ......................................... 386/278, 282, 279
See application file for complete search history.

(56) References Cited

U.S. PATENT DOCUMENTS

| | | | |
|---|---|---|---|
| 7,480,442 | B2 | 1/2009 | Girgensohn et al. |
| 7,796,857 | B2 | 9/2010 | Hiroi et al. |
| 7,805,678 | B1 | 9/2010 | Niles et al. |
| 8,290,345 | B2 | 10/2012 | Numoto |
| 8,306,402 | B2 | 11/2012 | Ishihara |
| 8,620,893 | B2 | 12/2013 | Howard et al. |
| 8,789,083 | B1 | 7/2014 | Landers et al. |
| 8,874,584 | B1 | 10/2014 | Chen et al. |
| 9,110,562 | B1 | 8/2015 | Eldawy |
| 9,583,140 | B1 | 2/2017 | Rady |
| 10,750,245 | B1 | 8/2020 | Zeiler et al. |
| 11,080,007 | B1 | 8/2021 | Melzer |
| 11,120,490 | B1 | 9/2021 | Pham et al. |
| 11,568,900 | B1 | 1/2023 | Achddou et al. |
| 11,683,290 | B1 | 6/2023 | Stern et al. |
| 2002/0061136 | A1 | 5/2002 | Shibata et al. |
| 2002/0186234 | A1 | 12/2002 | Van De Streek et al. |
| 2003/0177503 | A1 | 9/2003 | Sull et al. |
| 2003/0234805 | A1 | 12/2003 | Toyama et al. |
| 2004/0125124 | A1 | 7/2004 | Kim et al. |
| 2004/0135815 | A1 | 7/2004 | Browne et al. |
| 2005/0203927 | A1 | 9/2005 | Sull et al. |
| 2006/0224983 | A1 | 10/2006 | Albrecht et al. |
| 2007/0022159 | A1 | 1/2007 | Zhu et al. |
| 2007/0025614 | A1 | 2/2007 | Qian |
| 2007/0044010 | A1 | 2/2007 | Sull et al. |
| 2007/0106693 | A1 | 5/2007 | Houh et al. |
| 2007/0201558 | A1 | 8/2007 | Xu et al. |
| 2008/0215552 | A1 | 9/2008 | Safoutin |
| 2009/0172745 | A1 | 7/2009 | Horozov et al. |
| 2009/0231271 | A1 | 9/2009 | Heubel et al. |
| 2010/0070483 | A1 | 3/2010 | Delgo et al. |
| 2010/0088726 | A1 | 4/2010 | Curtis et al. |
| 2010/0107117 | A1 | 4/2010 | Pearce et al. |
| 2010/0111417 | A1 | 5/2010 | Ward et al. |
| 2010/0281372 | A1 | 11/2010 | Lyons et al. |
| 2011/0307084 | A1 | 12/2011 | Gehring et al. |
| 2012/0197763 | A1 | 8/2012 | Moreira |
| 2013/0027412 | A1 | 1/2013 | Roddy |
| 2013/0097507 | A1 | 4/2013 | Prewett |
| 2013/0236162 | A1 | 9/2013 | Kim et al. |
| 2013/0294642 | A1 | 11/2013 | Wang et al. |
| 2014/0105571 | A1 | 4/2014 | Chang et al. |
| 2014/0173484 | A1 | 6/2014 | Hicks |
| 2014/0270708 | A1* | 9/2014 | Girgensohn ..... H04N 21/44008 386/282 |
| 2014/0340204 | A1 | 11/2014 | O'Shea et al. |
| 2014/0358807 | A1 | 12/2014 | Chinnappan et al. |
| 2015/0005646 | A1 | 1/2015 | Balakrishnan et al. |
| 2015/0052465 | A1 | 2/2015 | Altin et al. |
| 2015/0261389 | A1 | 9/2015 | Abate |
| 2015/0356355 | A1 | 12/2015 | Oguchi et al. |
| 2015/0370806 | A1 | 12/2015 | White et al. |
| 2016/0071524 | A1 | 3/2016 | Tammi et al. |
| 2017/0169128 | A1 | 6/2017 | Batchu Krishnaiahsetty et al. |
| 2017/0228138 | A1 | 8/2017 | Paluka et al. |
| 2018/0113579 | A1 | 4/2018 | Johnston et al. |
| 2020/0066305 | A1* | 2/2020 | Spence ................ G11B 27/036 |
| 2020/0090661 | A1 | 3/2020 | Ackerman et al. |
| 2020/0106965 | A1 | 4/2020 | Malia et al. |
| 2021/0142827 | A1 | 5/2021 | Allen et al. |

OTHER PUBLICATIONS

"Hierarchical Segmentation of video timeline and matching searh data," accessed https://www.google.com/search?q=hierarchical+se gmentation+of+video+timeline+and+matching+search+data&hl=en &blw=1142&bih=547&tbm=pts&s . . . , accessed on Dec. 2, 2021, pp. 2.

"Transient oscillation video matching," accessed at https://www.google.com/search?q=transient+oscillation+video+matching&hl=en &biw=1225&bih=675&tbm=pts&sxsrf= AOaemvJjtgRC6aa4ltvNUFxJa6 . . . , accessed on Dec. 2, 2021, pp. 2.

Preinterview First Office Action dated Sep. 27, 2021 in U.S. Appl. No. 17/017,366, 5 pages.

Preinterview first Office Action dated Sep. 30, 2021 in U.S. Appl. No. 17/017,362, 4 pages.

Restriction Requirement dated Oct. 18, 2021 in U.S. Appl. No. 17/017,344, 5 pages.

Non-Final Office Action dated Nov. 9, 2021 in U.S. Appl. No. 17/017,344, 9 pages.

First Action Interview—Office Action dated Dec. 3, 2021 in U.S. Appl. No. 17/017,366, 4 pages.

Non-Final Office Action dated Dec. 7, 2021 in U.S. Appl. No. 17/017,370, 26 pages.

Final Office Action dated May 9, 2022 in U.S. Appl. No. 17/017,366, 14 pages.

Non-Final Office Action dated Jun. 2, 2022 in U.S. Appl. No. 17/330,689, 9 pages.

First action interview—office action dated Feb. 3, 2022 in U.S. Appl. No. 17/017,362, 3 pages.

Final Office Action dated Feb. 28, 2022 in U.S. Appl. No. 17/017,370, 32 pages.

Notice of Allowance dated Mar. 23, 2022 in U.S. Appl. No. 17/017,344, 7 pages.

Notice of Allowance dated Apr. 6, 2022 in U.S. Appl. No. 17/330,667, 8 pages.

Corrected Notice of Allowability dated Apr. 25, 2022 in U.S. Appl. No. 17/017,344, 2 pages.

Restriction Requirement dated Apr. 26, 2022 in U.S. Appl. No. 17/330,689, 6 pages.

Notice of Allowance dated Jul. 13, 2022 in U.S. Appl. No. 17/017,366, 7 pages.

Non-Final Office Action dated Jul. 29, 2022 in U.S. Appl. No. 17/017,370, 37 pages.

Final Office Action dated Aug. 15, 2022 in U.S. Appl. No. 17/017,362, 7 pages.

Preinterview first office action dated Aug. 18, 2022 in U.S. Appl. No. 17/017,353, 5 pages.

Non-Final Office Action dated Sep. 29, 2022 in U.S. Appl. No. 17/330,677, 12 pages.

Alcazar, J.L., et al., "Active Speakers in Context," Proceedings of the IEEE/CVF Conference on Computer Vision and Pattern Recognition (CVPR), pp. 12465-12474 (2020).

Co-pending U.S. Appl. No. 16/879,362, filed May 20, 2020.

Non-Final Office Action dated Oct. 24, 2022 in U.S. Appl. No. 17/330,702, 9 pages.

Non-Final Office Action dated Oct. 26, 2022 in U.S. Appl. No. 17/330,702, 8 pages.

Final Office Action dated Oct. 27, 2022 in U.S. Appl. No. 17/330,689, 8 pages.

Notice of Allowance dated Nov. 21, 2022 in U.S. Appl. No. 17/017,362, 5 pages.

(56) References Cited

OTHER PUBLICATIONS

First Action Interview Office Action dated Nov. 22, 2022 in U.S. Appl. No. 17/017,353, 4 pages.
Final Office Action dated Jan. 4, 2023 in U.S. Appl. No. 17/330,677, 12 pages.
"Apple, Final Cut Pro 7 User Guide", 2020, Retrieved from Internet URL: https://prohelp.apple.com/finalcutpro_helpr01/English/en/finalcutpro/usermanual/index.html#chapter=7%26section=1), pp. 11 (Year: 2010).
Notice of Allowance dated Feb. 8, 2023 in U.S. Appl. No. 17/017,366, 5 pages.
Non-Final Office Action dated Jan. 24, 2023 in U.S. Appl. No. 17/330,689, 13 pages.
Notice of Allowance dated Feb. 2, 2023 in U.S. Appl. No. 17/017,370, 6 pages.
Non-Final Office Action dated Feb. 16, 2023 in U.S. Appl. No. 17/969,536, 16 pages.
Final Office Action dated Mar. 9, 2023 in U.S. Appl. No. 17/330,702, 8 pages.
Notice of Allowance dated Apr. 18, 2023 in U.S. Appl. No. 17/330,677, 5 pages.
Shibata, M., "Temporal segmentation method for video sequence", Proceedings of SPIE, Applications in Optical Science and Engineering, Visual Communications and Image Processing, vol. 1818, pp. 1-13 (1992).
Swanberg, D., et al., "Knowledge-guided parsing in video databases", Proceedings of SPIE, IS&T/SPIE's Symposium on Electronic Imaging: Science and Technology, Storage and retrieval for Image and Video Databases, vol. 1908, pp. 1-13 (Apr. 14, 1993).
McDarris, J., "Adobe Photoshop Tutorial: Every Tool in the Toolbar Explained and Demonstrated", You Tube, Retrieved from Internet URL: https://www.youtube.com/watch?v=2cQT1ZgvgGI, accessed on Jun. 21, 2023, pp. 3.
Final Office Action dated Jun. 14, 2023 in U.S. Appl. No. 17/017,353, 34 pages.
Final Office Action dated Jun. 20, 2023 in U.S. Appl. No. 17/330,689, 13 pages.
Non Final Office Action dated Jun. 14, 2023 in U.S. Appl. No. 17/805,080, 9 pages.
Non Final Office Action dated May 19, 2023 in U.S. Appl. No. 17/805,076, 9 pages.
Non Final Office Action dated Jun. 30, 2023 in U.S. Appl. No. 17/330,702, 7 pages.
Notice of Allowance dated Aug. 16, 2023 in U.S. Appl. No. 17/805,076, 5 pages.
Non Final Office Action dated May 18, 2023 in U.S. Appl. No. 17/805,075, 9 pages.
Final Office Action dated Jul. 19, 2023 in U.S. Appl. No. 17/969,536, 18 pages.
Non-Final Office Action dated Sep. 1, 2023 in U.S. Appl. No. 17/017,353, 32 pages.
Non-Final Office Action dated Sep. 21, 2023 in U.S. Appl. No. 17/805,075, 5 pages.
Final Office Action dated Nov. 15, 2023 in U.S. Appl. No. 17/330,702, 7 pages.
Notice of Allowance dated Oct. 18, 2023 in U.S. Appl. No. 17/969,536, 7 pages.
Notice of Allowance dated Nov. 1, 2023 in U.S. Appl. No. 17/805,080, 5 pages.
Notice of Allowance dated Sep. 11, 2023 in U.S. Appl. No. 17/330,689, 5 pages.

\* cited by examiner

THUMBNAIL VIDEO SEGMENTATION IDENTIFYING THUMBNAIL LOCATIONS FOR A VIDEO

CROSS-REFERENCE TO RELATED APPLICATION

This application is a continuation-in-part of U.S. patent application Ser. No. 17/017,344, filed on Sep. 10, 2020, entitled Segmentation and Hierarchical Clustering of Video, the entire contents of which are hereby incorporated by reference.

BACKGROUND

Recent years have seen a proliferation in the use of video, which has applications in practically every industry from film and television to advertising and social media. Businesses and individuals routinely create and share video content in a variety of contexts, such as presentations, tutorials, commentary, news and sports segments, blogs, product reviews, testimonials, comedy, dance, music, movies, and video games, to name a few examples. Video can be captured using a camera, generated using animation or rendering tools, edited with various types of video editing software, and shared through a variety of outlets. Indeed, recent advancements in digital cameras, smartphones, social media, and other technologies have provided a number of new ways that make it easier for even novices to capture and share video. With these new ways to capture and share video comes an increasing demand for video editing features.

Conventionally, video editing involves selecting video frames and performing some type of action on the frames or associated audio. Some common operations include importing, trimming, cropping, rearranging, applying transitions and effects, adjusting color, adding titles and graphics, exporting, and others. Video editing software, such as ADOBE® PREMIERE® PRO and ADOBE PREMIERE ELEMENTS, typically includes a graphical user interface (GUI) that presents a video timeline that represents the video frames in the video and allows the user to select particular frames and the operations to perform on the frames. However, conventional video editing can be tedious, challenging, and even beyond the skill level of many users.

SUMMARY

Embodiments of the present invention are directed to video segmentation and various interaction modalities for video browsing, editing, and playback. In an example embodiment, a video is ingested by detecting various features using one or more machine learning models, and one or more video segmentations are generated based on the detected features. The detected features serve as the basis for one or more video segmentations, such as a default segmentation, a search segmentation based on a user query, a snap point segmentation that identifies selection snap points, and/or a thumbnail segmentation that identifies which parts of a video timeline to illustrate with different thumbnails. Finder and editor interfaces expose the different segmentations, providing users with the ability to browse, select, edit, and/or playback semantically meaningful video segments.

In some embodiments, a segmentation of a video is computed by determining candidate boundaries from detected feature boundaries from one or more feature tracks; modeling different segmentation options by constructing a graph with nodes that represent candidate boundaries, edges that represent candidate segments, and edge weights that represent cut costs; and computing the video segmentation by solving a shortest path problem to find the path through the edges (segmentation) that minimizes the sum of edge weights along the path (cut costs). In some embodiments, one or more aspects of a segmentation routine depend on the type of segmentation (e.g., default, search, snap point, thumbnail). By way of non-limiting example, candidate cut points are determined differently, different edges are used for different types of segmentations, and/or different cut costs are used for edge weights. In an example embodiment, a default segmentation is computed from a desired set of detected features, such as detected sentences, faces, and visual scenes.

In some embodiments, a finder interface exposes a video segmentation such as a default segmentation with interactive tiles that represent the video segments in the video segmentation and detected features in each video segment. In some embodiments, each interactive tile represents a different video segment from a particular video segmentation (e.g., a default video segmentation) and includes a thumbnail (e.g., the first frame of the video segment represented by the tile), some transcript from the beginning of the video segment, a visualization of detected faces in the video segment, and/or one or more faceted timelines that visualize a category of detected features (e.g., a visualization of detected visual scenes, audio classifications, visual artifacts). In an embodiment, different ways of interacting with a particular interactive tile serve to navigate to a corresponding portion of the video, add a corresponding video segment to a selection, and/or scrub through tile thumbnails.

In some embodiments, a search segmentation is computed based on a query. Initially, a first segmentation such as a default segmentation is displayed (e.g., as interactive tiles in a finder interface, as a video timeline in an editor interface), and the default segmentation is re-segmented in response to a user query. The query can take the form of a keyword and one or more selected facets in a category of detected features. Keywords are searched for detected transcript words, detected object or action tags, or detected audio event tags that match the keywords. Selected facets are searched for detected instances of the selected facets. Each video segment that matches the query is re-segmented by solving a shortest path problem through a graph that models different segmentation options. The finder interface updates the interactive tiles to represent the search segmentation. Thus, searching serves to break down the interactive tiles to represent smaller units of the video based on a query.

In some embodiments, the finder interface is used to browse a video and add video segments to a selection. Upon adding a desired set of video segments to a selection, a user switches to an editor interface to perform one or more refinements or other editing operations on the selected video segments. In some embodiments, the editor interface initializes a video timeline with a representation of the video segments selected from the finder interface, such as a composite video timeline representing a composite video formed by the selected video segments, with boundaries of the video segments illustrated as an underlay to the composite timeline. In some embodiments, the composite video timeline includes a visualization of detected features and corresponding feature ranges to help with selecting, trimming, and editing video segments.

Some embodiments are directed to a snap point segmentation that defines the locations of selection snap points for a selection of video segments through interactions with the video timeline. Candidate snap points are determined from boundaries of feature ranges of the video indicating when instances of detected features are present in the video. In some embodiments, candidate snap point separations are penalized for being separated by less than a minimum duration corresponding to a minimum pixel separation between consecutive snap points on a video timeline. The snap point segmentation is computed by solving a shortest path problem through a graph that models different snap point locations and separations. When a user clicks or taps on the video timeline and drags, a selection snaps to the snap points defined by the snap point segmentation. In some embodiments, the snap points are displayed during a drag operation and disappear when the drag operation is released.

Some embodiments are directed to a thumbnail segmentation that defines the locations on a video timeline where thumbnails are displayed. Candidate thumbnail locations are determined from boundaries of feature ranges of the video indicating when instances of detected features are present in the video. In some embodiments, candidate thumbnail separations are penalized for being separated by less than a minimum duration corresponding to a minimum pixel separation (e.g., the width of a thumbnail) between consecutive thumbnail locations on a video timeline. The thumbnail segmentation is computed by solving a shortest path problem through a graph that models different thumbnail locations and separations. As such, a video timeline is displayed with thumbnails at locations on the timeline defined by the thumbnail segmentation, with each thumbnail depicting a portion of the video associated with the thumbnail location.

In some embodiments, the editor interface provides any number of editing functions for a selected video segment. Depending on the implementation, available editing functions include stylistic refinements that transform content (e.g., wind noise reduction), duration-impacting refinements that elide content (e.g., "hiding" regions of footage, removing swear words, make a time lapse, shorten to n seconds), and/or contextual functions that depend on selected content (e.g., remove or beep words from content with a corresponding transcript). Generally, the editor interface provides any suitable editing functionality, including rearranging, cropping, applying transitions or effects, adjusting color, adding titles or graphics, and/or others. The resulting composite video can be played back, saved, exported, or otherwise.

As such, the present disclosure provides intuitive video interaction techniques that allow users to easily select, trim, playback, and export semantically meaningful video segments with a desired level of granularity, giving creators and consumers a more intuitive structure for interacting with video.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1A:
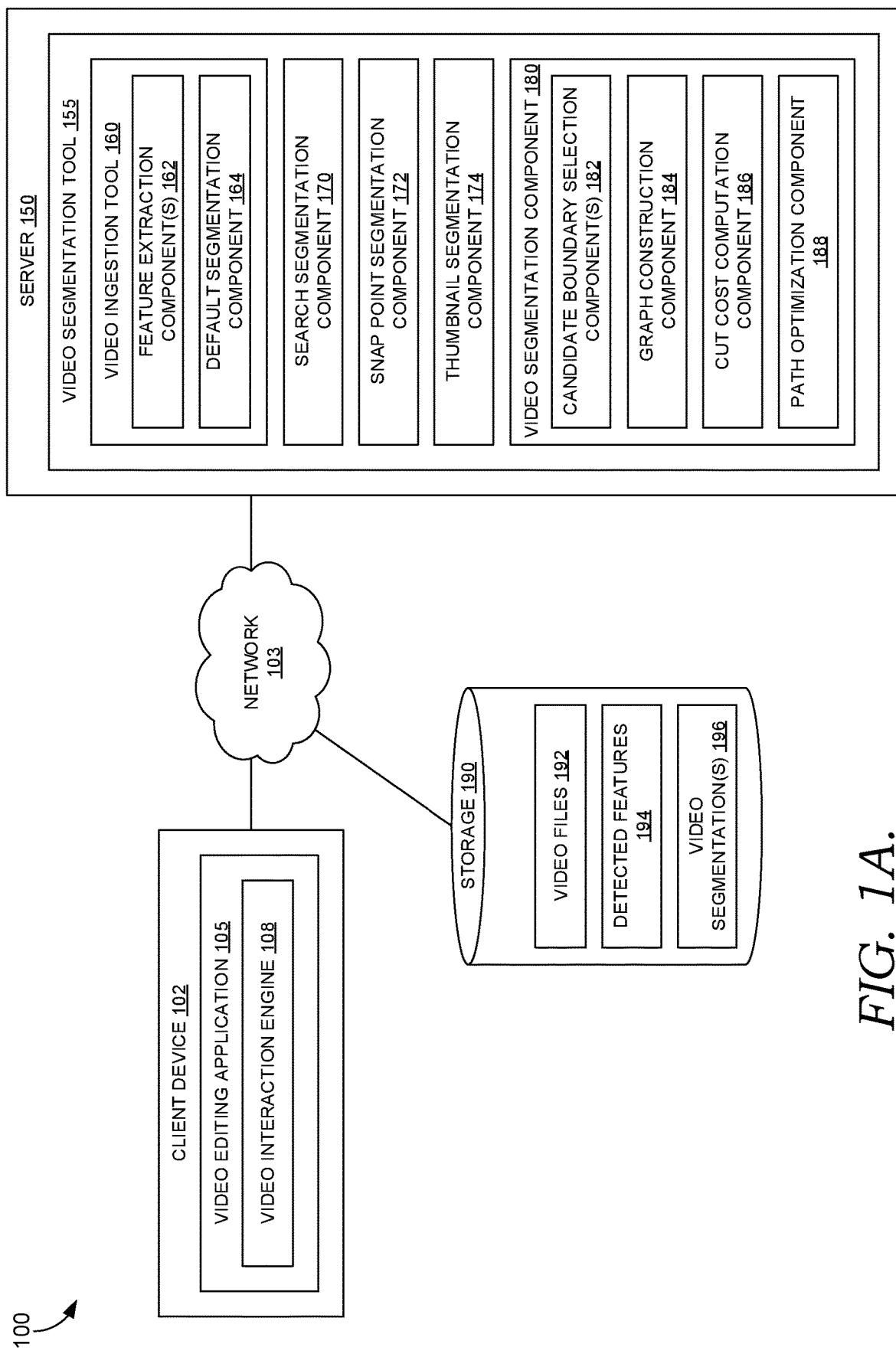
FIGS. 1A-1B are block diagrams of an example computing system for video editing or playback, in accordance with embodiments of the present invention.

A video file, clip, or project can usually be split up into visual and audio elements. For example, a video might encode or otherwise identify a video track comprising a sequence of still images (e.g., video frames) and an accompanying audio track comprising one or more audio signals. Conventionally, video editing tools provide an interface that lets users perform time-based editing on selected video frames. That is, conventional video editing generally involves representing a video as a sequence of fixed units of equal duration (e.g., video frames) and presenting a video timeline that allows the user to select and interact with particular video frames. However, interaction modalities that rely on a selection of particular video frames or a corresponding time range are inherently slow and fine-grained, resulting in editing workflows that are often considered tedious, challenging, or even beyond the skill level of many users. In other words, time-based video editing that requires selecting particular video frames or time ranges provides an interaction modality with a fixed granularity, resulting in an inflexible and inefficient interface. As such, there is a need for an improved interface and improved interaction modalities for video editing tools.

Accordingly, embodiments of the present invention are directed to video segmentation and various interaction modalities for video browsing, editing, and playback. In an example embodiment, a video is ingested by detecting various features using one or more machine learning models, and one or more video segmentations are generated based on the detected features. More specifically, the video is processed using one or more machine learning models to detect features (e.g., transcript, linguistic features, speakers, faces, audio classifications, visually similar scenes, visual artifacts, video objects or actions, audio events, software log events) and corresponding feature ranges where the detected features are present. The detected features serve as the basis for one or more video segmentations, such as a default segmentation, a search segmentation based on a user query, a snap point segmentation that identifies selection snap points, and/or a thumbnail segmentation that identifies which parts of a video timeline to illustrate with different thumbnails. Finder and editor interfaces expose the different segmentations, providing users with the ability to browse, select, edit, and/or playback semantically meaningful video segments. As such, the present techniques provide new ways to create, edit, and consume video, giving creators and consumers a more intuitive structure for interacting with video.

In an example implementation, a video segmentation is identified by determining candidate cut points from detected feature boundaries; modeling different segmentation options by constructing a graph with nodes that represent candidate cut points, edges that represent candidate segments, and edge weights that represent cut costs; and computing the video segmentation by solving a shortest path problem to find the path through the edges (segmentation) that minimizes the sum of edge weights along the path (cut costs). In some embodiments, depending on the use case, a segmentation routine accepts different input parameters, such as designated feature tracks (e.g., predetermined, user-selected, and/or otherwise), user queries, target minimum or maximum length of a video segment (which in some cases depends on zoom level), range of a video to segment, and/or others. Additionally or alternatively, in some cases, one or more aspects of a segmentation routine depend on the type of segmentation. By way of non-limiting example, candidate cut points are determined differently, different edges are used for different types of segmentations, and/or different cut costs are used for edge weights. In some embodiments, the output is a representation of a complete set (i.e., covering the entire and/or designated range of the video) of disjoint (i.e., non-overlapping) video segments.

In an example embodiment, a default segmentation is computed from a desired set of detected features, such as detected sentences, faces, and visual scenes. A finder interface exposes the default segmentation with interactive tiles that represent the video segments in the default segmentation and detected features in each video segment. In some embodiments, the finder interface exposes the categories of features used by the default segmentation, accepts a selection of a desired set of feature categories, re-computes the default segmentation based on the selected feature categories, and updates the interactive tiles to represent the updated default segmentation. In an example implementation with search, the finder interface accepts a query (e.g., keyword and/or facet), generates or triggers a search segmentation that re-segments the default segmentation based on the query, and updates the interactive tiles to represent the search segmentation. Thus, searching serves to break down the interactive tiles to represent smaller units of the video based on a query. Additionally or alternatively, a slider or other interaction element exposes an input parameter for a segmentation (e.g., target minimum and maximum length of video segment) that lets a user interactively control the size of video segments represented by the tiles.

In an example embodiment, each interactive tile represents a video segment from a particular segmentation (e.g., default or search) and detected features in the video segment. For example, each tile shows a thumbnail (e.g., the first frame of the video segment), some transcript from the beginning of the video segment, a visualization of detected faces in the video segment, and one or more faceted timelines that visualize a category of detected features (e.g., a visualization of detected visual scenes, audio classifications, visual artifacts). Clicking on a visualization of a detected feature in an interactive tile navigates to the part of the video with the detected feature.

In some embodiments, the finder interface includes a selected clips panel where users can add video segments to a selection. Depending on the implementation, video segments are added to the selection in various ways, such as by dragging a tile into the selected clips panel, activating a button or other interaction element in an interactive tile, interacting with a visualization of a detected feature in an interactive tile (e.g., right clicking on a visualization to activate a contextual menu and adding a corresponding video segment to selection from the contextual menu), interacting with the transcript (e.g., highlighting, right clicking to activate a contextual menu, and adding to selection from the contextual menu), and/or other ways. In some embodiments, the finder interface includes one or more buttons or other interaction elements that switch to the editor interface, initializing a video timeline with a representation of the selected video segments in the selected clips panel.

In an example embodiment, the editor interface provides a composite video timeline representing a composite video formed by the video segments selected in the finder interface, with boundaries of the video segments illustrated as an underlay to the composite timeline. In some embodiments, a drag operation along the composite timeline snaps selection boundaries to snap points defined by a snap point segmentation and/or a current zoom level. In an example implementation with search, the editor interface accepts a query (e.g., keyword and/or facet), generates a search segmentation that segments the video segments in the composite video based on the search, and presents a visualization of the search segmentation (e.g., by illustrating the boundaries of the video segments as an underlay to the composite timeline).

In some embodiments, the composite video timeline includes a visualization of detected features and corresponding feature ranges to help with trimming. For example, while dragging across the composite timeline, visualizations of detected features can help inform which parts of the video to select (e.g., a part of the video that contains a visualized audio classification). Additionally or alternatively, while dragging across the composite timeline, the snap points defined by the snap point segmentation—which represent certain feature boundaries—are visualized on the timeline (e.g., as vertical lines on the composite timeline), illustrating which parts of the video would be good snap points. In yet another example, clicking on a visualization of a detected feature (e.g., a bar representing a portion of the video with a detected artifact) causes a selection of the part of the composite video with the detected feature. As such, the editor interface provides an intuitive interface to select semantically meaningful video segments for editing.

In some embodiments, the composite timeline represents each video segment in the composite video with one or more thumbnails showing a representative video frame. In an example implementation, each video segment includes one or more thumbnails at timeline locations identified by the thumbnail segmentation and/or a current zoom level, with longer video segments more likely to include multiple thumbnails. For example, as a user zooms in, more thumbnails appear at semantically meaningful locations, with any already visible thumbnails remaining in place. As such, thumbnails serve as landmarks to help navigate a video and select video segments.

In an example implementation, the editor interface provides any number of editing functions for a selected video segment. Depending on the implementation, available editing functions include stylistic refinements that transform content (e.g., wind noise reduction), duration-impacting refinements that elide content (e.g., "hiding" regions of footage, removing swear words, make a time lapse, shorten to n seconds), and/or contextual functions that depend on selected content (e.g., remove or beep words from content with a corresponding transcript). Generally, the editor interface provides any suitable editing functionality, including rearranging, cropping, applying transitions or effects, adjusting color, adding titles or graphics, and/or others. The resulting composite video can be played back, saved, exported, or otherwise.

As such, the present disclosure provides intuitive video interaction techniques that allow users to easily select, trim, playback, and export semantically meaningful video segments with a desired level of granularity. Rather than simply providing a video timeline segmented by some fixed unit of equal duration (e.g., a frame, a second) in a manner that is divorced from semantic meaning, exposing a video segmentation based on detected features provides video segments with unequal duration and boundaries that are located at semantically meaningful, rather than arbitrary, locations. Accordingly, the present video interaction techniques provide a more flexible and efficient interaction modality, allowing users to quickly identify, select, and operate on meaningful chunks of a video that are likely to be of interest. As such, editors can now work more quickly and consumers can now jump to a section of interest without having to watch the video.

Example Video Editing Environment

Referring now to FIG. 1A, a block diagram of example environment 100 suitable for use in implementing embodiments of the invention is shown. Generally, environment 100 is suitable for video editing or playback, and, among other things, facilitates video segmentation and interactions with resulting video segments. Environment 100 includes client device 102 and server 150. In various embodiments, client device 102 and/or server 150 are any kind of computing device capable of facilitating video editing or playback, such as computing device 2300 described below with reference to FIG. 23. Examples of computing devices include a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, some combination thereof, or any other suitable computer device.

In various implementations, the components of environment 100 include computer storage media that stores information including data, data structures, computer instructions (e.g., software program instructions, routines, or services), and/or models (e.g., machine learning models) used in some embodiments of the technologies described herein. For example, in some implementations, client device 102, server 150, and/or storage 190 comprise one or more data stores (or computer data memory). Further, although client device 102, server 150, and storage 190 are each depicted as a single component in FIG. 1A, in some embodiments, client device 102, server 150, and/or storage 190 are implemented using any number of data stores, and/or are implemented using cloud storage.

The components of environment 100 communicate with each other via a network 103. In some embodiments, network 103 includes one or more local area networks (LANs), wide area networks (WANs), and/or other networks. Such networking environments are commonplace in offices, enterprise-wide computer networks, intranets, and the Internet.

Figure 1B:
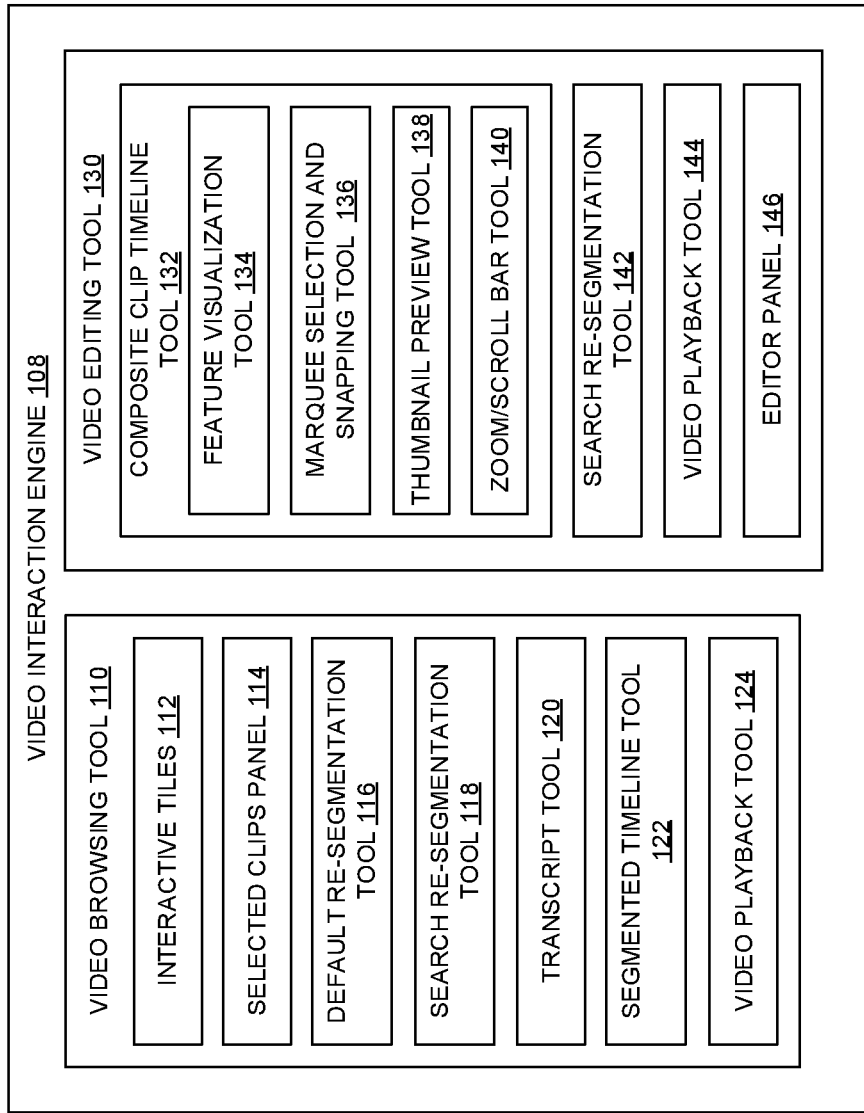

In the example illustrated in FIGS. 1A and 1B, client device 102 includes video interaction engine 108, and server 150 includes video segmentation tool 155. In various embodiments, video interaction engine 108, video segmentation tool 155, and/or any of the elements illustrated in FIGS. 1A and 1B are incorporated, or integrated, into an application(s) (e.g., a corresponding application on client device 102 and server 150, respectively), or an add-on(s) or plug-in(s) to an application(s). In some embodiments, the application(s) is any application capable of facilitating video editing or playback, such as a stand-alone application, a mobile application, a web application, and/or the like. In some implementations, the application(s) comprises a web application, for example, that is accessible through a web browser, hosted at least partially server-side, and/or the like. Additionally or alternatively, the application(s) include a dedicated application. In some cases, the application is integrated into an operating system (e.g., as a service). Example video editing applications include ADOBE PREMIERE PRO and ADOBE PREMIERE ELEMENTS.

In various embodiments, the functionality described herein is allocated across any number of devices. In some embodiments, video editing application 105 is hosted at least partially server-side, such that video interaction engine 108 and video segmentation tool 155 coordinate (e.g., via network 103) to perform the functionality described herein. In another example, video interaction engine 108 and video segmentation tool 155 (or some portion thereof) are integrated into a common application executable on a single device. Although some embodiments are described with respect to an application(s), in some embodiments, any of the functionality described herein is additionally or alternatively integrated into an operating system (e.g., as a service), a server (e.g., a remote server), a distributed computing environment (e.g., as a cloud service), and/or otherwise. These are just examples, and any suitable allocation of functionality among these or other devices may be implemented within the scope of the present disclosure.

To begin with a high-level overview of an example workflow through the configuration illustrated in FIGS. 1A and 1B, client device 102 is a desktop, laptop, or mobile device such as a tablet or smart phone, and video editing application 105 provides one or more user interfaces. In some embodiments, a user accesses a video through video editing application 105, and/or otherwise uses video editing application 105 to identify the location where a video is stored (whether local to client device 102, at some remote location such as storage 190, or otherwise). Additionally or alternatively, a user records a video using video recording capabilities of client device 102 (or some other device) and/or some application executing at least partially on the device (e.g., ADOBE BEHANCE). In some cases, video editing application 105 uploads the video (e.g., to some accessible storage 190 for video files 192) or otherwise communicates the location of the video to server 150, and video segmentation tool 155 receives or access the video and performs one or more ingestion functions on the video.

In some embodiments, video segmentation tool 155 extracts various features from the video (e.g., transcript, linguistic features, speakers, faces, audio classifications, visually similar scenes, visual artifacts, video objects or actions, audio events, software log events), and generates and stores a representation of the detected features, corresponding feature ranges where the detected features are present, and/or corresponding confidence levels (e.g., detected features 194). In an example implementation, based on the detected features, video segmentation tool 155 generates and stores a representation of one or more segmentations of the video (e.g., video segmentation(s) 196), such as a default segmentation, a search segmentation based on a user query, a snap point segmentation, and/or a thumbnail segmentation. In some cases, one or more of the segmentations are generated at multiple levels of granularity (e.g., corresponding to different zoom levels). In some embodiments, some segmentations are generated at ingestion. In some cases, some or all segmentations are generated at some other time (e.g., on demand). As such, video segmentation tool 155 and/or video editing application 105 access a video (e.g., one of video files 192) and generate and store a representation of one or more segmentation(s) of the video (e.g., video segmentation(s) 196), constituent semantically meaningful video segments of the video segmentations(s) (e.g., video files 192), and/or some representation thereof in any suitable storage location, such as storage 190, client device 102, server 150, some combination thereof, and/or other locations.

In an example embodiment, video editing application 105 (e.g., video interaction engine 108) provides one or more user interfaces with one or more interaction elements that allow a user to interact with the ingested video, and more specifically, with one or more video segmentation(s) 196 (e.g., semantically meaningful video segments, snap points, thumbnail locations) and/or detected features 194. FIG. 1B illustrates an example implementation of video interaction engine 108 comprising video browsing tool 110 and video editing tool 130.

In an example implementation, video browsing tool 110 provides a finder interface that exposes a default segmentation with interactive tiles 112 that represent the video segments in the default segmentation and represent detected features 194 in each video segment. In an example implementation with search, video browsing tool 110 includes search re-segmentation tool 118 that accepts a query (e.g., keyword and/or facet), generates or otherwise triggers a search segmentation (e.g., generated by search segmentation component 170 of FIG. 1A) that re-segments the default segmentation based on the query, and updates interactive tiles 112 to represent the search segmentation. Video browsing tool 110 provides selected clips panel 114, where users can add video segments to a selection.

Video editing tool 130 provides an editor interface with composite clip timeline tool 132 that presents a composite video timeline representing a composite video formed by the video segments selected in the finder interface. In some embodiments, marquee selection and snapping tool 136 detects a drag operation along the composite timeline and snaps selection boundaries to snap points defined by the snap point segmentation and/or a current zoom level. In some cases, composite clip timeline tool 132 includes feature visualization tool 134, which presents a visualization of detected features 194 and corresponding feature ranges to help with trimming. Additionally or alternatively, thumbnail preview tool 138 represents one or more thumbnails showing a representative video frame at locations on the composite timeline identified by the thumbnail segmentation and/or a current zoom level. As such, video editing tool 130 enables users to navigate a video and select semantically meaningful video segments.

Depending on the implementation, video editing tool 130 and/or video interaction engine 108 performs any number and variety of operations on selected video segments. By way of non-limiting example, selected video segments are played back, deleted, edited in some other way (e.g., by rearranging, cropping, applying transitions or effects, adjusting color, adding titles or graphics), exported, and/or other operations. Thus, in various embodiments, video interaction engine 108 provides interface functionality that allows a user to select, navigate, play, and/or edit a video based on interactions with semantically meaningful video segments and detected features thereof.

Example Video Segmentation Techniques

Returning to FIG. 1A, in some embodiments, video segmentation tool 155 generates a representation of one or more segmentations of a video. Generally, one or more segmentations are generated at any suitable time, such as when ingesting or initially processing a video (e.g., a default segmentation), upon receiving a query (e.g., a search segmentation), when displaying a video timeline, upon activing a user interface, and/or at some other time.

In the example illustrated in FIG. 1A, video ingestion tool 160 ingests a video (e.g., a video file, a portion of a video file, video represented or otherwise identified by a project file). In some embodiments, ingesting a video comprises extracting one or more features from the video and/or generating one or more segmentations of the video identifying corresponding semantically meaningful video segments and/or segment boundaries. In the implementation illustrated in FIG. 1A, video ingestion tool 160 includes feature extraction component(s) 162 and default segmentation component 164. In this implementation, feature extraction component(s) 162 detects one or more features from the video, and default segmentation component 164 triggers video segmentation component 180 to generate a default video segmentation during video ingestion.

At a high level, video ingestion tool 160 (e.g., feature extraction component(s) 162) detects, extracts, or otherwise determines various features (e.g., transcript, linguistic features, speakers, faces, audio classifications, visually similar scenes, visual artifacts, video objects or actions, audio events, software log events) from a video, for example, using one or more machine learning models, natural language processing, digital signal processing, and/or other techniques. In some embodiments, feature extraction component(s) 162 include one or more machine learning models for each of a plurality of categories of feature to detect. As such, video ingestion tool 160 and/or corresponding feature extraction component(s) 162 extract, generate, and/or store a representation of detected features (e.g., facets) in each category, corresponding feature ranges where the detected features are present, and/or corresponding confidence levels.

In some embodiments, one or more feature categories (e.g., speakers, faces, audio classifications, visually similar scenes, etc.) have their own feature track that represents the instances of detected features (e.g., facets such as unique faces or speakers) in a feature category. By way of nonlimiting example, for each feature category, the representation of detected features (e.g., detected features 194) includes a list, array, or other representation of each instance of a detected facet (e.g., each unique face) in the feature category (e.g., detected faces). In an example implementation, each instance of a detected facet is represented with a feature range where the instance is detected (e.g., start and stop timestamps per instance), a unique value identifying the facet to which the instance belongs (e.g., a unique value for each unique face, speaker, visual scene, etc.), a corresponding confidence level quantifying prediction confidence or likelihood, and/or a representation of other characteristics.

In some embodiments, feature extraction component(s) 162 extract a transcript and/or linguistic features from an audio track associated with a video. In an example implementation, any known speech-to-text algorithm is applied to the audio track to generate a transcript of speech, detect speech segments (e.g., corresponding to words, sentences, utterances of continuous speech separated by audio gaps, etc.), detect non-speech segments (e.g., pauses, silence, or non-speech audio), and/or the like. In some embodiments, voice activity detection in applied (e.g., to the audio track, to detected non-speech segments) to detect and/or categorize segments of the audio track with non-word human sounds (e.g., laughter, audible gasps, etc.). In some cases, the transcript and/or detected transcript segments are associated with the video's timeline, and transcript segments are associated with corresponding time ranges. In some embodiments, any known topical segmentation technique (semantic analysis, natural language processing, applying a language model) is used to partition or otherwise identify portions of the video likely to contain similar topics, and detected speech segments are associated with a score that represents how likely the speech segment ends a topical segment.

In some embodiments, feature extraction component(s) 162 include one or more machine learning models that detect unique speakers from an audio track associated with a video. In an example implementation, any known voice recognition, speaker identification, or speaker diarization technique is applied to detect unique vocal prints (e.g., within a single video, across a collection of videos) and partition or otherwise identify portions of the audio track(s) based on speaker identity. Example techniques used in voice recognition, speaker identification, or speaker diarization use frequency estimation, pattern matching, vector quantization, decision trees, hidden Markov models, Gaussian mixture models, neural networks, and/or other techniques. In some embodiments, feature extraction component(s) 162 applies a speaker diarization technique such as that described in Juan Leon Alcazar, Fabian Caba, Long Mai, Federico Perazzi, Joon-Young Lee, Pablo Arbelaez, Bernard Ghanem; *Active Speakers in Context*, Proceedings of the IEEE/CVF Conference on Computer Vision and Pattern Recognition (CVPR), 2020, pp. 12465-12474. Additionally or alternatively to using audio signatures to detect speakers, in some embodiments, one or more machine learning models are used to determine which detected face is speaking by detecting mouth movement on detected faces. In an example implementation, each instance of a detected speaker in a video is associated with a corresponding time range of the video where the speaker was detected, a corresponding confidence level quantifying prediction confidence or likelihood, and/or a thumbnail of the detected face of the detected speaker. Additionally or alternatively, detected speech segments (e.g., words, phrases, sentences) and/or other transcript features are associated with a representation of corresponding detected speaker to generate a diarized transcript.

In some embodiments, feature extraction component(s) 162 include one or more machine learning models that detect unique faces from video frames of a video. In an example implementation, any known face detection technique (e.g., RetinaFace) is applied to detect unique faces in each video frame and/or across time. For example, each video frame is processed by segmenting each face from the background (e.g., using one or more neural network), aligning each face, detecting locations of facial landmarks (e.g., eyes, nose, mouth), and generating a (e.g., vector) representation of the detected facial landmarks. In some embodiments, detected faces from different frames (e.g., within a single video, across a collection of videos) and that have similar representations (e.g., separated by a distance within some threshold, clustered based on one or more clustering algorithms) are determined to belong to the same identity. In an example implementation, each instance of a detected face is associated with a corresponding time range that spans the video frames where the face was detected and/or a corresponding confidence level quantifying prediction confidence or likelihood.

In some embodiments, feature extraction component(s) 162 include one or more machine learning models that extract audio classifications from an audio track associated with a video. Any known sound recognition technique is applied to detect any number of audio classes (e.g., music, speech, other). In an example implementation, each frame of audio data from the audio track is encoded into a vector representation (e.g., using linear predictive coding) and classified by one or more neural networks. In some embodiments, the audio timeline is categorized into the detected audio classes (e.g., music, speech, or other). In an example implementation, consecutive audio frames with the same classification are grouped together and associated with a corresponding time range that spans the audio frames and/or a corresponding (e.g., averaged) confidence level quantifying prediction confidence or likelihood.

In some embodiments, feature extraction component(s) 162 include one or more machine learning models that detect visually similar scenes from video frames of a video. In an example implementation, each video frame is processed (e.g., by one or more neural networks) to extract a corresponding (e.g., vector) representation of visual features in the video frame, and the representations of the different video frames are clustered across time into a (e.g., fixed or variable) number of visual scenes using any suitable clustering algorithm (e.g., k-means clustering). In some embodiments, each visual scene is associated with a corresponding time range that spans the video frames in the visual scene. In some cases, each scene transition is assigned a transition confidence, for example, by computing a distance metric comparing the representations of the visual features in the video frames that surround transition.

In some embodiments, feature extraction component(s) 162 include one or more machine learning models that detect visual artifacts in the video frames of a video. Any known visual detection technique is applied to identify one or more classes of visual artifacts from the video frames. In an example implementation, one or more neural network classifiers detect a corresponding class of visual artifact, such as erratic camera motion across video frames, camera occlusion in a given video frame, blur in a given video frame, compression artifacts in a given video frame, a lack of movement (e.g., an empty video frame, no visual changes across video frames), and/or others. In some embodiments, each instance of a detected visual artifact is associated with a corresponding time range that spans the video frames where the visual artifact was detected and/or a corresponding confidence level quantifying prediction confidence or likelihood.

In some embodiments, feature extraction component(s) 162 include one or more machine learning models that detect objects or actions from video frames of a video. Any known object or action recognition technique is applied to visually extract one or more classes of object or action from one or more video frames. In an example implementation, one or more neural network classifiers detect the presence of any number of object classes (e.g., hundreds, thousands, etc.) in each video frame. Additionally or alternatively, one or more neural network classifiers detect the presence of any number of action classes (e.g., low-level movement such as standing up, sitting down, walking, and talking; higher level events such dining, playing, and dancing; and/or others) in sequences of video frames. In some embodiments, each instance of a detected object or action class is associated with a corresponding time range that spans the video frames where the object or action was detected, a corresponding confidence level quantifying prediction confidence or likelihood, and/or one or more searchable keywords (e.g., tags) that represent the class.

In some embodiments, feature extraction component(s) 162 include one or more machine learning models that detect audio events from an audio track associated with a video. Any known sound recognition technique is applied to detect any number of audio event classes (e.g., alarm, laughter, ringing, applause, coughing, buzzing, horn, barking, gun shot, siren, etc.). In an example implementation, each frame of audio data from the audio track is encoded into a vector representation (e.g., using linear predictive coding) and classified by one or more neural networks. In an example implementation, consecutive audio frames with the same classification are grouped together and associated with a corresponding time range that spans the audio frames, a corresponding confidence level quantifying prediction confidence or likelihood, and/or one or more searchable keywords (e.g., tags) that represent the class.

In some embodiments, feature extraction component(s) 162 extract log events represented in one or more temporal logs, such as software usage logs, associated with a video. Various implementations involve different types of temporal logs and/or log events. For example, in one implementation involving screen captured or screencast videos of tutorials for creative software such as ADOBE PHOTOSHOP or ADOBE FRESCO, a software usage log generated by the creative software while screen capturing or screencasting is read to identify the times of detected log events such as tool events (e.g., use of a particular software tool, such as select brush, create layer, etc.). In an example gaming implementation, a software usage log is read to identify the times of detected software log events such as leveling up or beating an enemy. Although the foregoing examples involve temporal logs with log events derived from video frames, this need not be the case. For example, in an implementation with a live chat or chat stream associated with a livestreamed video, a corresponding user chat log or session is read to identify times of events such as chat messages about a particular topic. In an example video streaming implementation (whether livestreaming or viewing archived video), a usage log representing how a user(s) has viewed the video is read to identify the times of detected interaction events such as navigational events (e.g., play, pause, skip). Generally, any type of temporal log and/or metadata can be read to identify log events and corresponding times. In an example implementation, each instance of an extracted log event is associated with a corresponding time range that spans the portion of the video where the log event occurred and/or one or more searchable keywords (e.g., tags) that represent the log event (e.g., for tool events, a software tool name or action).

In the implementation illustrated in FIG. 1A, video segmentation component 180 executes a segmentation routine that accepts different input parameters, such as an identification of designated feature tracks (e.g., predetermined, user-selected, and/or otherwise), user queries (e.g., keywords and/or selected facets), target minimum or maximum length of a video segment (which in some cases depends on zoom level), range of a video to segment, and/or others. Video segmentation component 180 uses the input parameters to construct a graph with nodes that represent candidate cut points, edges that represent candidate segments, and edge weights that represent cut costs, and video segmentation component 180 computes a video segmentation by solving a shortest path problem to find the path (segmentation) that minimizes the sum of edge weights (cut costs).

In some embodiments, one or more aspects of the segmentation routine depend on the type of segmentation (e.g., default, search, snap point, thumbnail). For example, and as described in more detail below, depending on the type of segmentation, candidate cut points are determined differently, different edges are used, different cut costs are used for edge weights, different target minimum or maximum video segment lengths are used, zoom level impacts (or does not impact) target minimum or maximum video segment lengths, a user query impacts (or does not impact) the segmentation, and/or other dependencies are possible. Accordingly, in some embodiments, default segmentation component 164, search segmentation component 170, snap point segmentation component 172, and/or thumbnail segmentation component 174 trigger video segmentation component 180 to generate a corresponding video segmentation using corresponding candidate cut points, edges, edge weights, target minimum or maximum video segment length, query applicability, and/or other aspects. Additionally or alternatively, separate segmentation routines are executed. In an example implementation, a default segmentation is determined at ingestion. In another example implementation, search, snap point, and/or thumbnail segmentations are determined on demand (e.g. upon receiving a query, upon loading an editor interface, upon zooming into a video timeline). However, these are just example, and other implementations determine any type of segmentation at any suitable time.

In an example embodiment, video segmentation component 180 outputs a representation of a complete set (i.e., covering the entire and/or designated range of the video) of disjoint (i.e., non-overlapping) video segments, and/or timestamps or some other representation of the video segment boundaries (e.g., cut points). In some implementations that determine a search segmentation, the output additionally or alternatively comprises a representation of whether each video segment in a search segmentation is a match for a particular query (e.g., whether video segments are "on" or "off" with respect to the query), a representation of which feature(s) and/or value(s) of matching segments matched the query, and/or a representation of what time(s) within each matching segment the query was matched.

The following embodiment involves an implementation of video segmentation component 180 having one or more common aspects across different types of segmentations. For illustrative purposes, example operations of this implementation of video segmentation component 180 are described with respect to a default segmentation and a search segmentation. In this implementation, video segmentation component 180 includes candidate boundary selection component 182, graph construction component 184, cut cost computation component 186, and path optimization component 188. At a high level, candidate boundary selection component 182 identifies candidate boundaries from the boundaries of feature ranges in designated feature tracks. Graph construction component 184 constructs a graph with paths that represent different segmentation options, cut cost computation component 186 computes edges weights for edges between nodes in the graph, and path optimization component 188 solves a shortest path problem along the graph to compute an optimal segmentation.

Candidate boundary selection component 182 identifies candidate boundaries from the boundaries of feature ranges (feature boundaries) in designated feature tracks and within a designated range of the video. In an example default segmentation, the feature tracks include detected sentences (e.g., from the transcript), detected faces, and detected visual scenes, and the designated range of the video is the entire video. In an example search segmentation, the feature tracks include the same feature tracks as the default segmentation, and the designated range of the video is each video segment in the default segmentation (i.e., the search segmentation runs on each video segment in the default segmentation, thereby re-segmenting the default segmentation). In another example search segmentation, the feature tracks include the same or different feature tracks as the default segmentation, and the designated range of the video is the entire video (i.e., the search segmentation creates a new segmentation independent of the default segmentation).

In an example implementation, candidate boundary selection component 182 identifies instances of detected features from the designated feature tracks that overlap with the designated range of the video, adjusts feature boundaries to snap to proximate feature boundaries of priority features, and identifies candidate boundaries from the remaining feature boundaries. FIGS. 2A-2F are illustrations of an example technique for computing candidate boundaries from detected feature boundaries. FIGS. 2A-2F illustrate a portion of example designated feature tracks, sentence track 210 and face track 220 (showing two facets, face 1 and face 2).

Figure 2A:
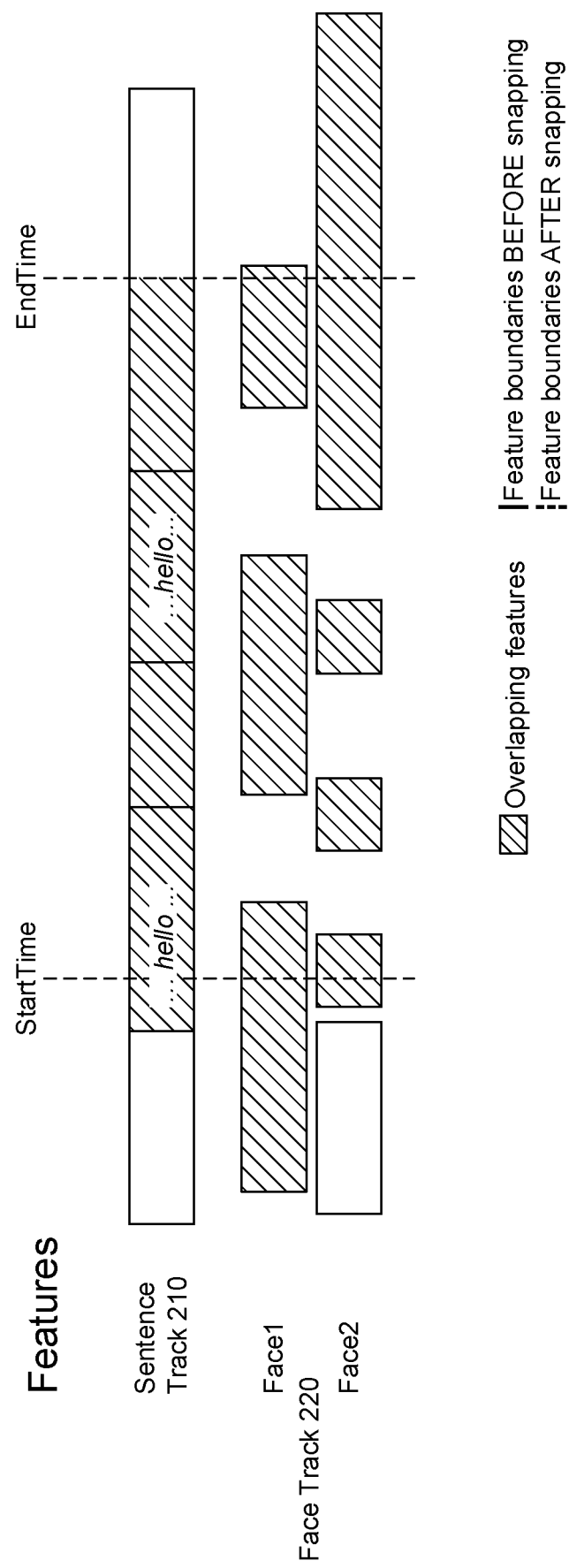
FIGS. 2A-2F are illustrations of an example technique for computing candidate boundaries from detected feature boundaries, in accordance with embodiments of the present invention.

FIG. 2A is an illustration of an example technique for identifying instances of detected features from the designated feature tracks that overlap with the designated range of the video to segment. In this example, all detected features from sentence track 210 and face track 220 that overlap with the designated range between startTime and endTime are identified (the overlapping features identified with shading). In some embodiments where feature tracks are represented with a list of detected instances and corresponding ranges, identifying overlapping features comprises iterating through the listed ranges and generating a representation of those ranges that at least partially overlap with the designated range of the video to segment.

Figure 2B:
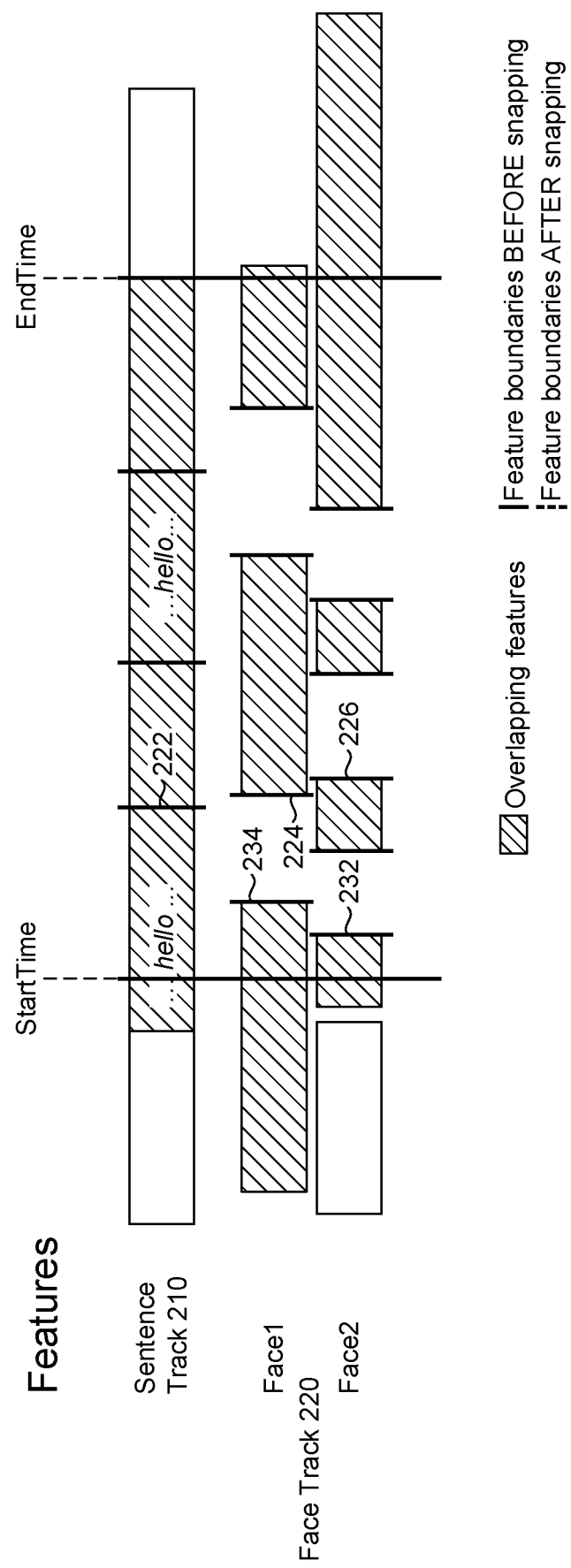
Figure 2C:
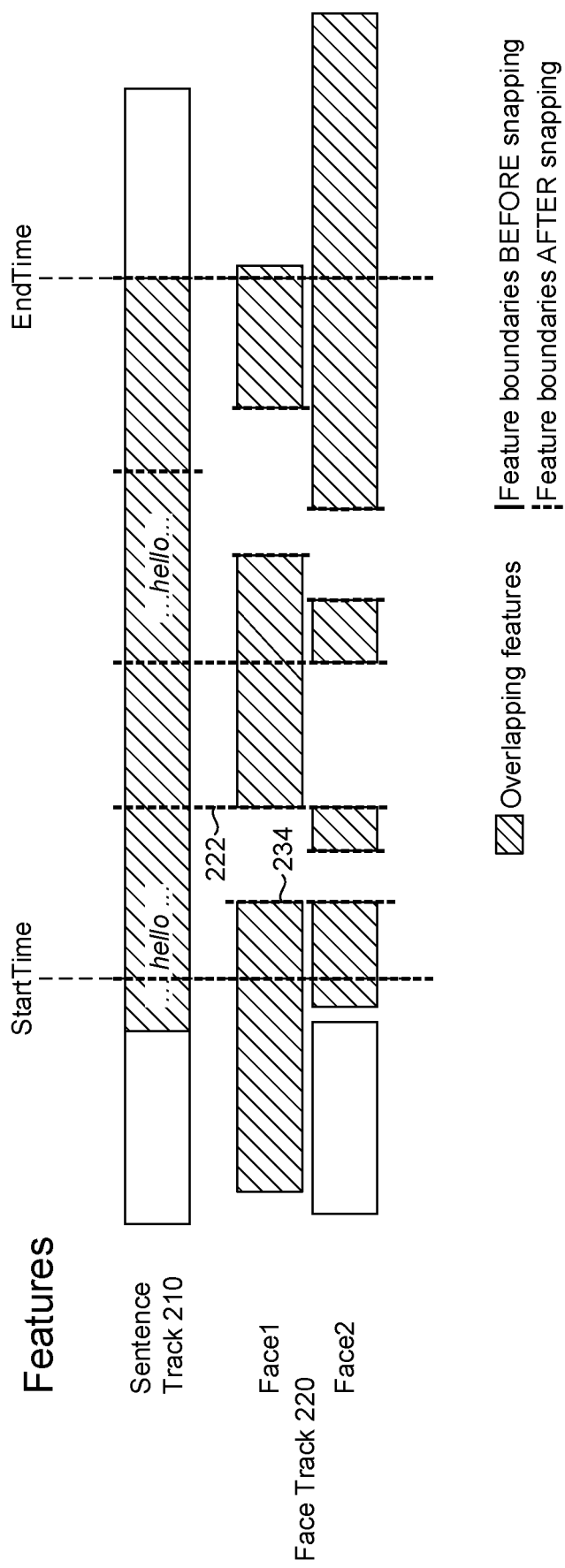

FIGS. 2B-2C are illustrations of an example technique for adjusting feature boundaries to snap to proximate feature boundaries of priority features. In some embodiments, feature tracks are prioritized (e.g., in a priority list), for example, based on which categories of features are considered to be the most important or determined to have the highest quality data. In an example implementation, a prioritized list of feature tracks includes transcript features (e.g., sentences), then visual scenes, then faces. Candidate boundary selection component 182 iterates over the designated feature tracks in priority order, starting with the most important feature track. For each priority feature boundary of an overlapping feature from a priority feature track, candidate boundary selection component 182 merges into the priority feature boundary those feature boundaries from other features tracks that are located within a threshold merging distance (e.g., 500 ms) of the priority feature boundary. Additionally or alternatively, candidate boundary selection component 182 truncates and/or discards feature boundaries that fall outside the designated range of the video to segment. In FIG. 2B, feature boundaries 224 and 226 from face track 220 are within a threshold merging distance of priority feature boundary 222 from sentence track 210, so feature boundaries 224 and 226 are snapped to priority feature boundary 222, as illustrated in FIG. 2C.

In some embodiments, feature boundaries of detected features within a feature track are merged into proximate feature boundaries located outside the detected features within a threshold merging distance, for example, to create a span that encompasses both detected features. Additionally or alternatively, feature boundaries of detected features within a feature track are merged into proximate feature boundaries that are that are predicted with a higher confidence level and located within a threshold merging distance. For example, in FIG. 2B, feature boundary 232 (for face 2) from face track 220 is within a threshold merging distance of feature boundary 234 (for face 1) from face track 220, so feature boundaries 232 is snapped to feature boundary 234, as illustrated in FIG. 2C.

Figure 2D:
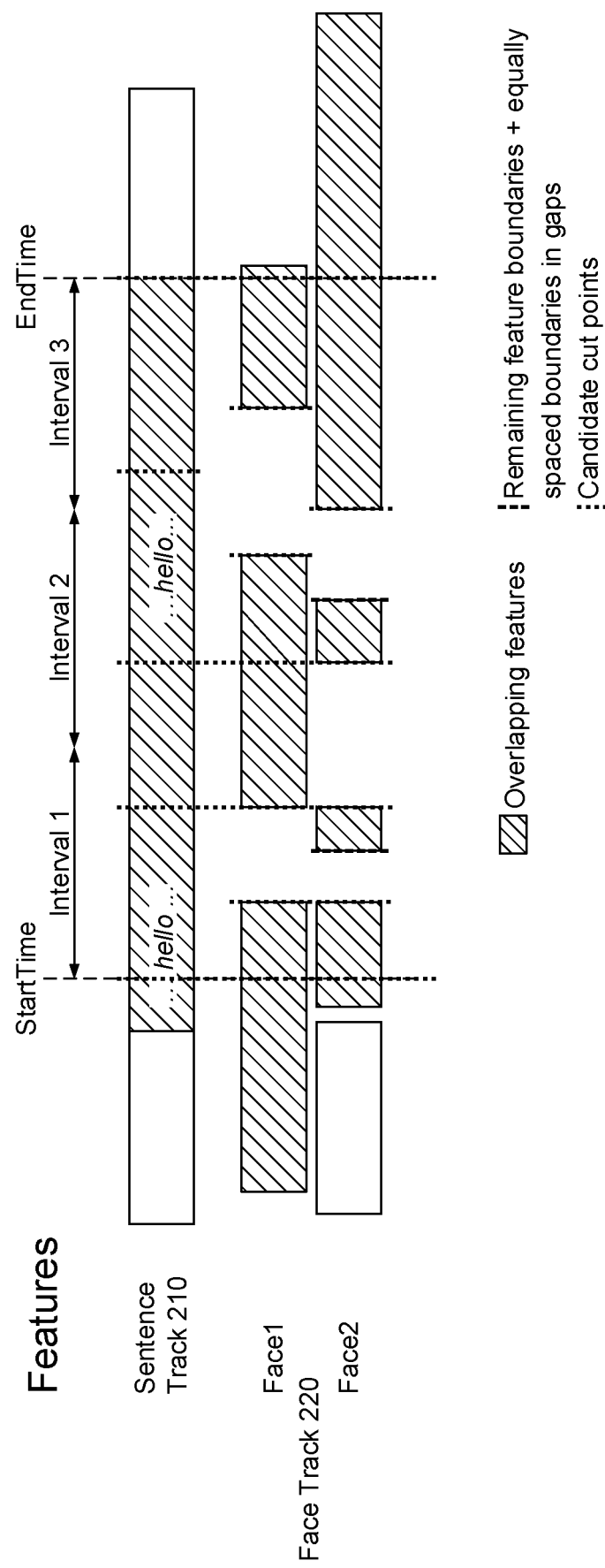

FIG. 2D is an illustration of an example technique for identifying candidate boundaries for a default segmentation from the remaining feature boundaries. In some embodiments, candidate boundary selection component 182 evaluates the remaining feature boundaries after adjustment, determines whether the distance between two consecutive feature boundaries is larger than some threshold gap duration (e.g., 500 ms), and if so, inserts one or more (e.g., equally spaced) boundaries in the gap so the distance between two consecutive feature boundaries is less than the threshold gap duration. In some embodiments, to improve performance, candidate boundary selection component 182 divides the designated range of the video into some number of intervals of equal length (three in FIG. 2D), and for each interval, selects the top N boundaries in that interval based on some scoring function. In an example implementation, a cut cost is computed for each of the remaining feature boundaries (as described in more detail below with respect to cut cost computation component 186), and candidate boundary selection component 182 selects the top N boundaries with the lowest boundary cut costs.

Figure 2E:
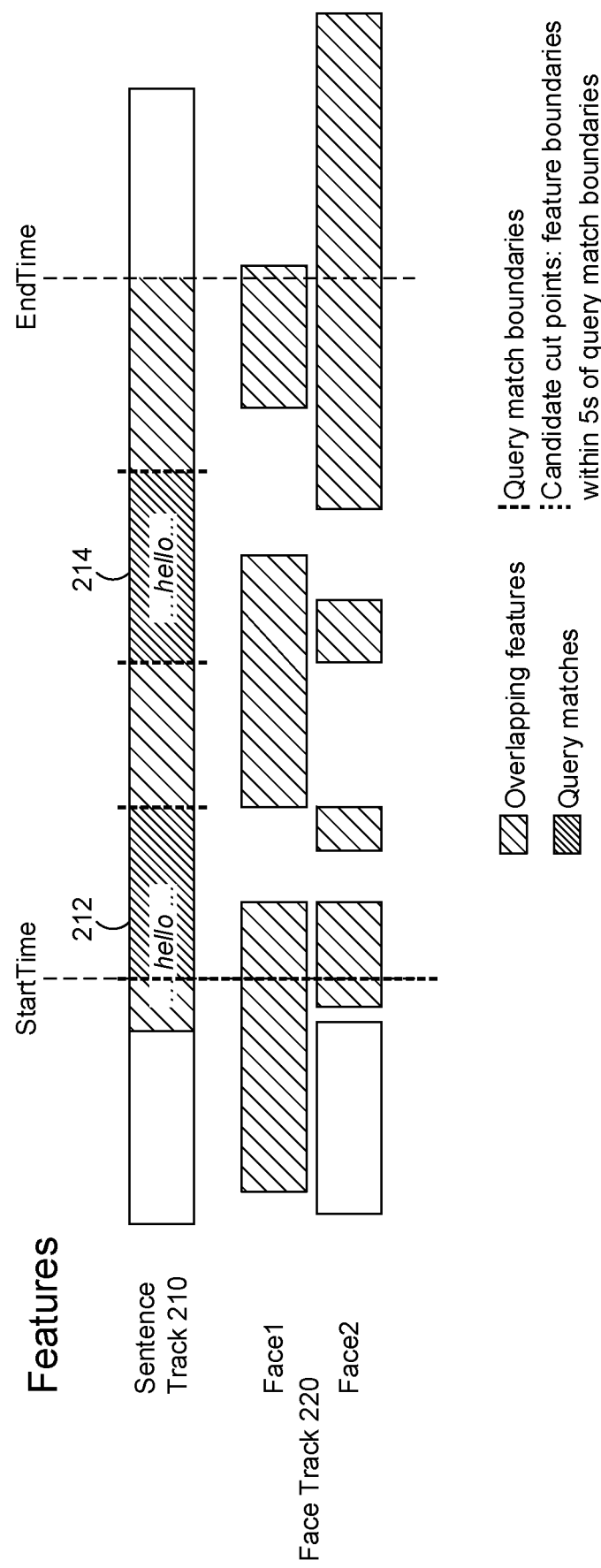
Figure 2F:
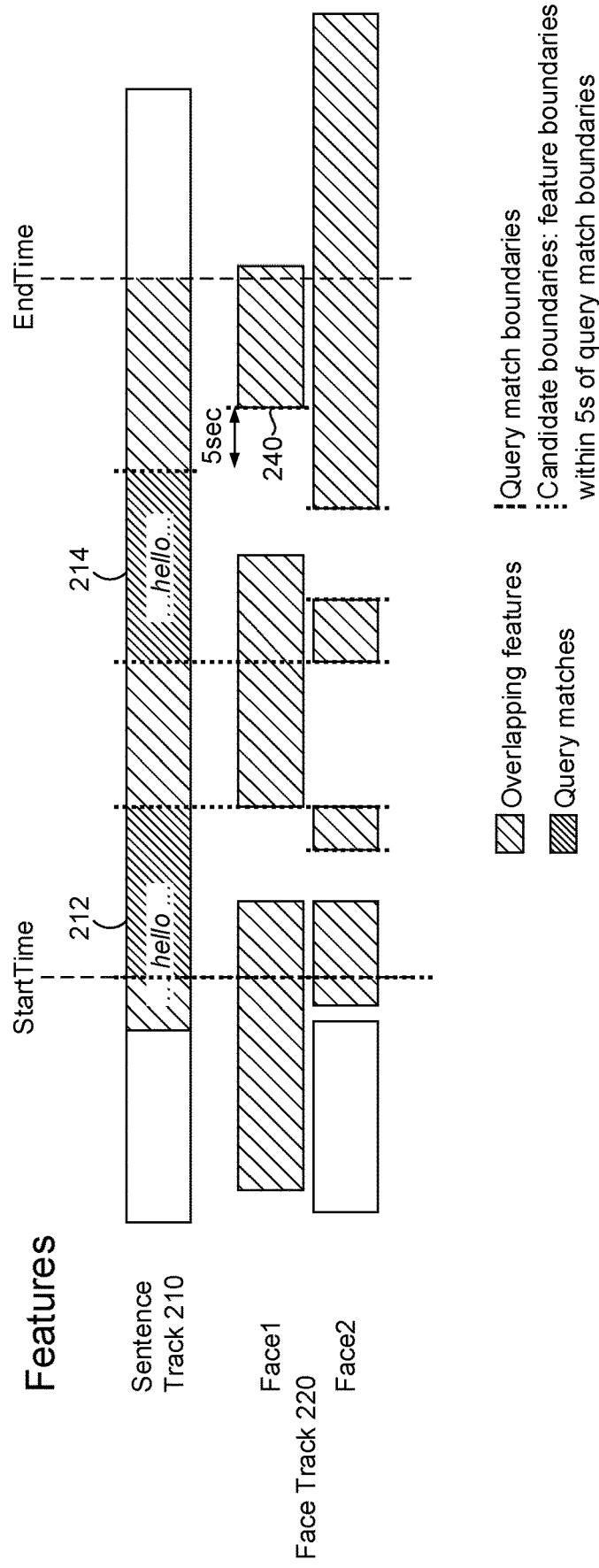

FIGS. 2E-2F are illustrations of an example technique for identifying candidate boundaries for a search segmentation from the remaining feature boundaries. In an example embodiment with search, a user enters a query comprising one or more keywords and/or selected facets (as described in more detail below). Candidate boundary selection component 182 searches for detected features with associated text or value (e.g., transcript, object or action tags, audio event tags, log event tags, etc.) that match the keyword(s), whether using exact matching and/or fuzzy matching. In an example facet search, a user selects a particular face, speaker, audio class (e.g., music, speech, other), visual scene, visual artifact, and/or other facet, and candidate boundary selection component 182 searches for detected instances of the selected facet(s). FIG. 2F illustrates an example query ("hello") with matching features 212 and 214 from sentence track 210. In an example implementation, candidate boundary selection component 182 selects candidate boundaries as those remaining feature boundaries located within some threshold distance (e.g., 5 seconds) of a boundary of a matching feature (a query match boundary).

Figure 3A:
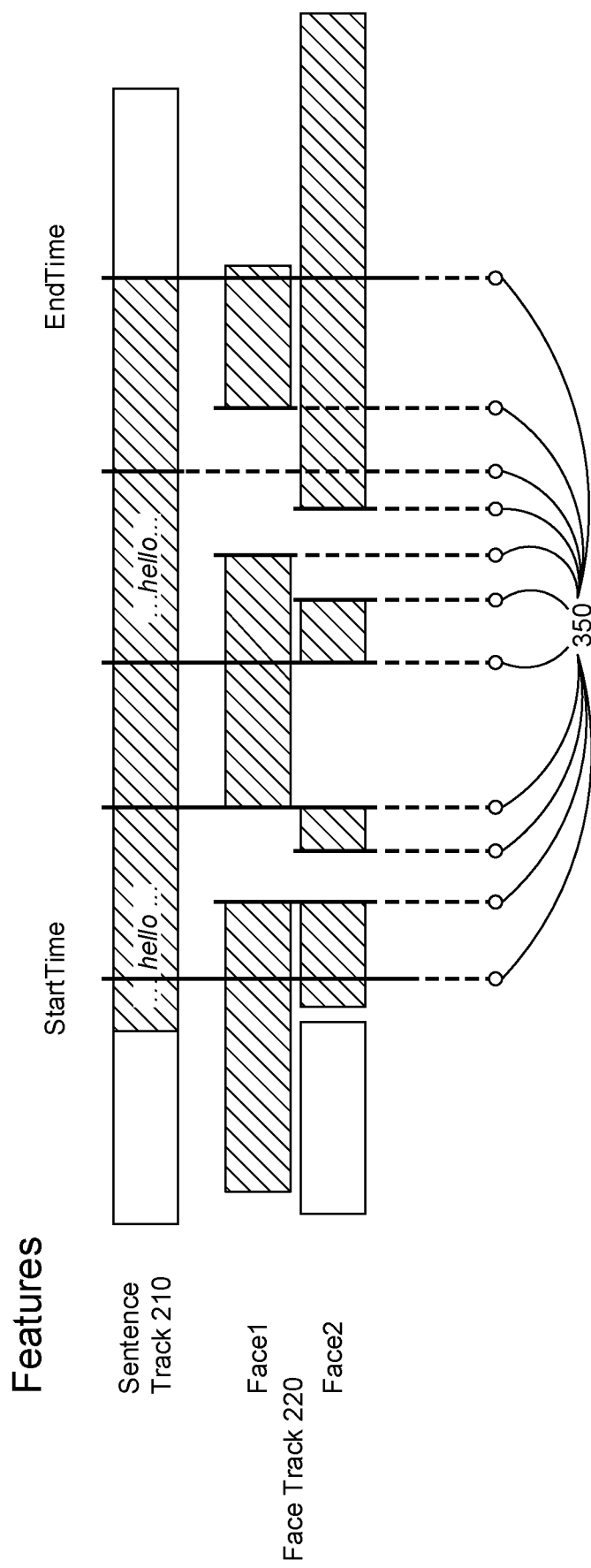
FIGS. 3A-3C are illustrations of an example technique for constructing a graph with paths that represent different candidate segmentations, in accordance with embodiments of the present invention.
Figure 3B:
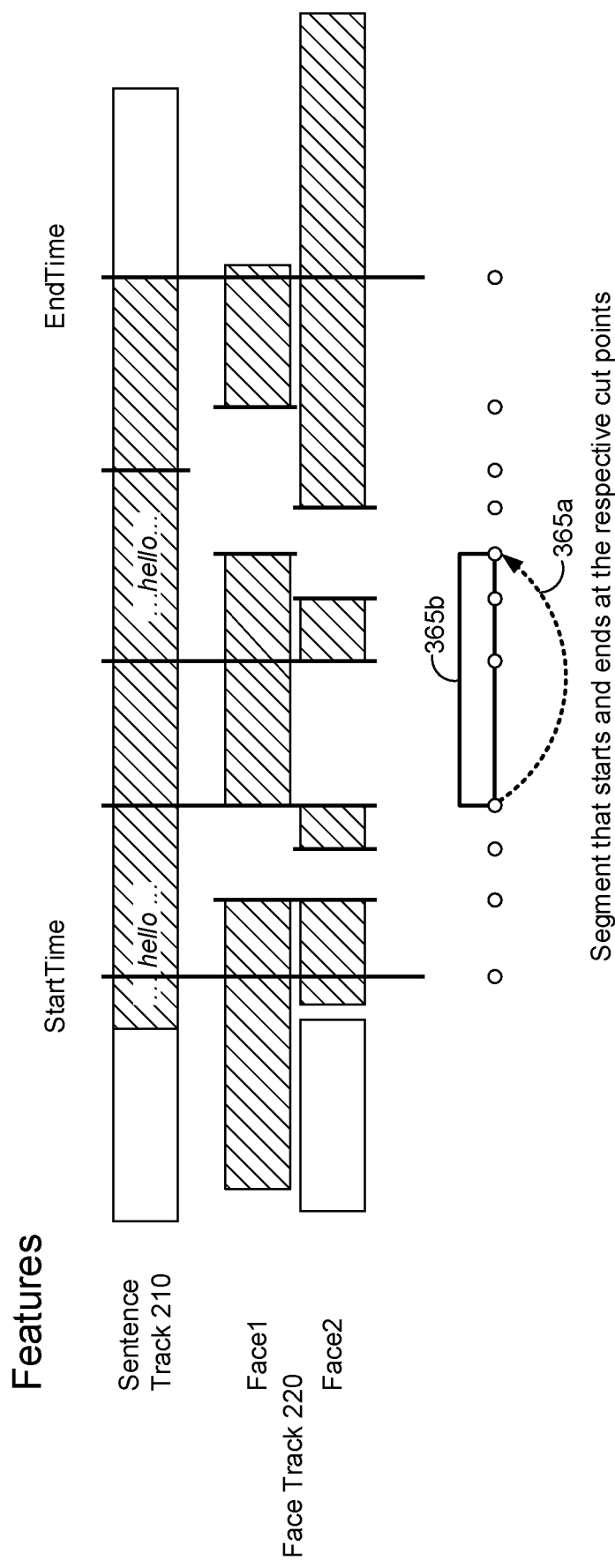
Figure 3C:
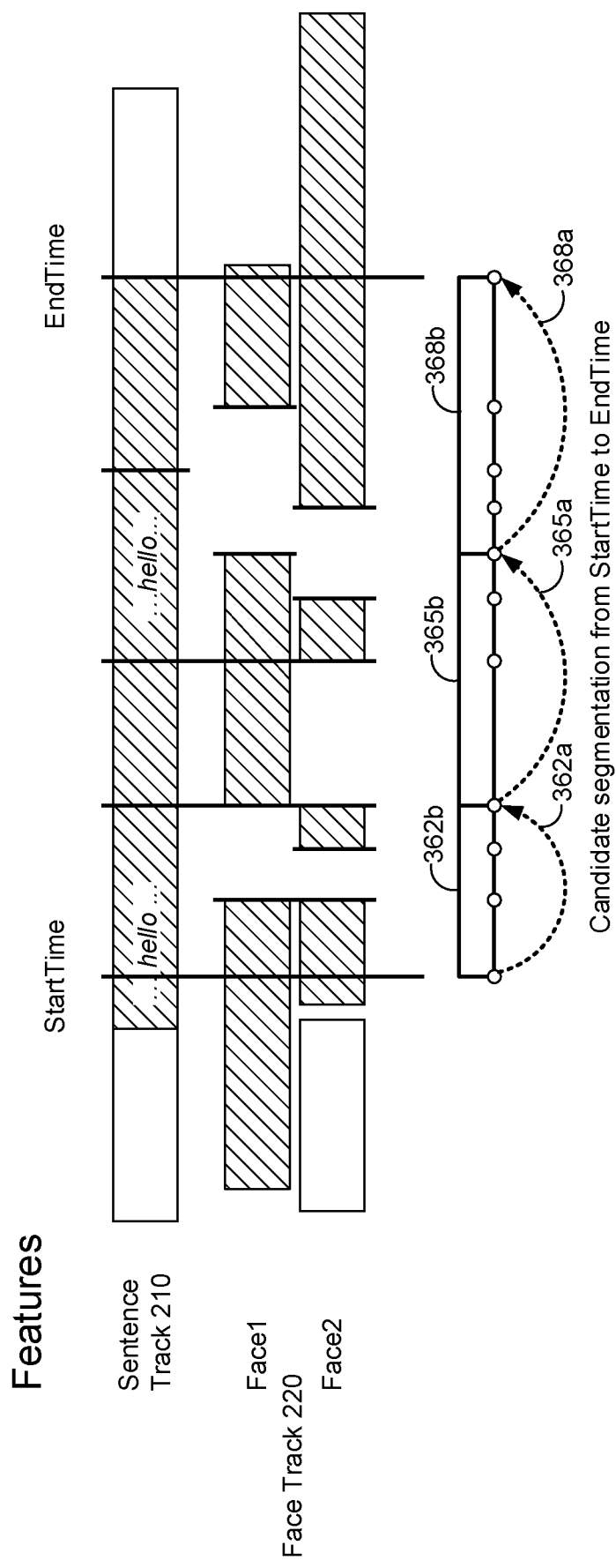

Returning to FIG. 1A, graph construction component 184 constructs a graph with paths that represent different candidate segmentations. FIGS. 3A-3C are illustrations of an example technique for constructing a graph with paths that represent different candidate segmentations. In an example implementation, candidate boundaries are represented by nodes (e.g., nodes 350 in FIG. 3A) connected with edges (e.g., edge 365*a* in FIG. 3B) that represent candidate segments (e.g., video segment 365*a* in FIG. 3B). The different paths through the graph from startTime to endTime represent different candidate segmentations. For example, in FIG. 3C, edges 362*a*, 365*a*, and 368*a* form a path that represents segments 362*b*, 365*b*, and 368*b*. In some embodiments, to enforce generating a non-overlapping segmentation (e.g., paths that move forward in time), the graph is constructed as a directed graph with edges that only connect nodes moving forward in time, or with infinite edge weights moving backwards in time.

In some embodiments, cut cost computation component 186 of FIG. 1A computes edge weights for the edges in the graph. In an example embodiment, edge weight for an edge that represents a candidate segment quantifies a penalty or cut cost for the candidate segment (e.g., on some normalized range, such as 0 to 1 or −1 to +1). By way of nonlimiting example, cut cost computation component 186 determines the edge weight between two nodes as the (e.g., normalized) sum of a boundary cut cost and an interval cut cost for the candidate segment. In some embodiments, a boundary cut cost penalizes a candidate boundary for being at a "bad" cut point (e.g., within a detected feature from another feature track), and an interval cut cost penalizes a candidate segment based on negative characteristics of the candidate segment's span (e.g., having a length outside the target minimum or maximum length, incoherence of overlapping features from other feature tracks, overlapping both query ON and OFF features). In some embodiments, the boundary cut cost for the candidate segment is the boundary cut cost for the leading boundary of the candidate segment (e.g., when candidate segmentations are complete, candidate segments in a candidate segmentation are therefore adjacent, and the trailing boundary is therefore counted in the next segment).

In an example default segmentation, cut cost computation component 186 penalizes cutting in the middle of detected feature ranges (e.g., sentences, face appearances, visual scenes), determines a boundary cut cost differently relative to different feature tracks, and/or computes an overall boundary cut cost as a combination (e.g., sum, weighted sum) of separate contributions from each feature track. By way of nonlimiting example with designated features including transcript features, visual scenes, and faces, a boundary cut cost for a boundary is computed as:

$$\text{boundaryCutCost} = (3.0 * \text{transcriptBoundaryCutCost} + 2.0 * \text{visualSceneBoundaryCutCost} + \text{faceBoundaryCutCost})/6.0. \quad \text{(Eq. 1)}$$

Figure 4A:
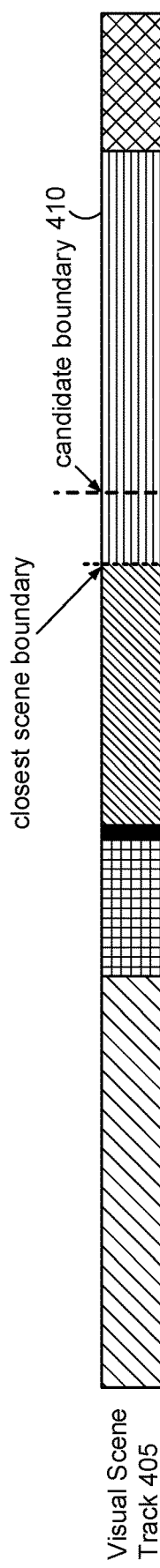
FIGS. 4A-4C are illustrations of an example technique for computing a boundary cut cost based on visual scenes, in accordance with embodiments of the present invention.
Figure 4B:
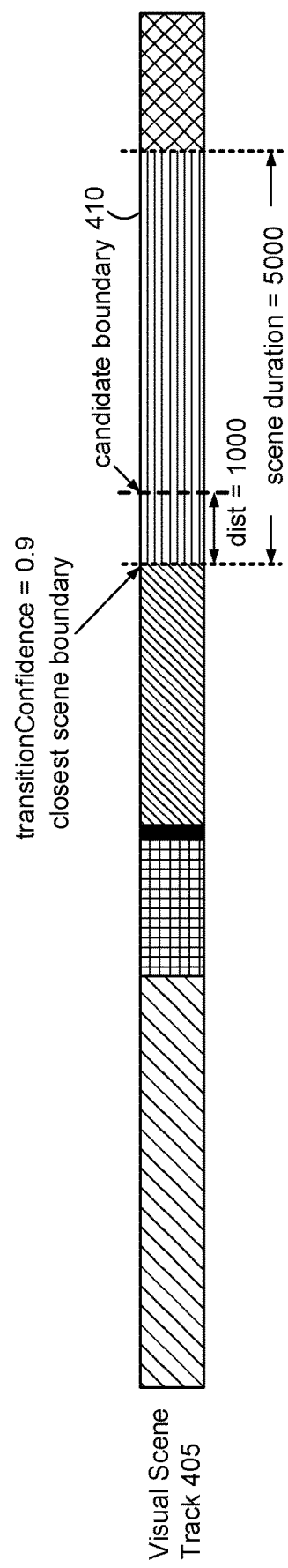
Figure 4C:
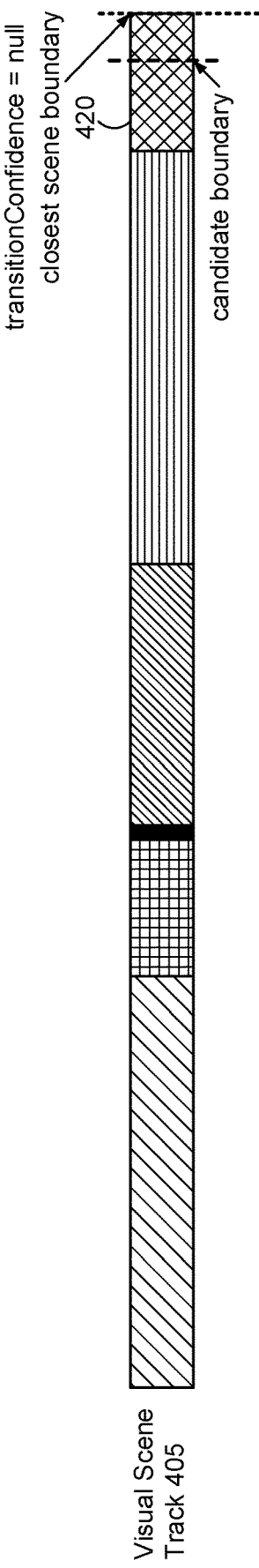

FIGS. 4A-4C are illustrations of an example technique for computing a boundary cut cost based on visual scenes. FIGS. 4A-4C illustrate example visual scene track 405 with different visual scenes represented with different patterns. In some embodiments, a good candidate boundary is (1) close to a visual scene boundary, and/or (2) that visual scene boundary has a high transition confidence. In an example implementation considering a candidate boundary with respect to visual scene track 405, cut cost computation component 186 identifies the closest visual scene boundary from visual scene track 405 (FIG. 4A), and computes the distance to the closest boundary relative to the duration of containing visual scene 410 (FIG. 4B). In the example illustrated in 4B, the distance to the closest boundary (1000 ms) relative to the duration of containing visual scene 410 (5000 ms) is 1000/5000=0.2. In some embodiments, cut cost computation component 186 retrieves the transition confidence of the closest boundary (0.9 in the example in FIG. 4B) and computes boundary cut cost based on the transition confidence of the closest boundary, for example, as:

$$\text{visualSceneBoundaryCutCost} = -\text{transitionConfidence} * (1.0 - 2 * \text{relative distance to boundary}) \quad \text{(Eq. 2)}$$

In the example illustrated in FIG. 4B, visualSceneBoundaryCutCost=0.9*(1.0−2*0.2)=−0.54.

FIG. 4C illustrates a corner case where containing scene 420 has a candidate boundary where the closest visual scene boundary is at an endpoint of the designated range of the video. In some embodiments, if the transition confidence of the closest visual scene boundary is undefined or null, cut cost computation component 186 computes boundary cut cost based on the distance to the closest boundary relative to the duration of the containing visual scene, for example, as:

$$\text{visualSceneBoundaryCutCost} = -(1.0 - 2.0 * (\text{relativeDistanceTo closest visual scene boundary})) \quad \text{(Eq. 3)}$$

When the relative distance to the closest visual scene boundary is zero (the boundary is on the end point of the designated range), equation 3 resolves to −1.0. When the relative distance to the closest visual scene boundary is 0.5 (the candidate boundary is in the middle of the candidate segment), equation 3 resolves to +1.0.

Figure 5:
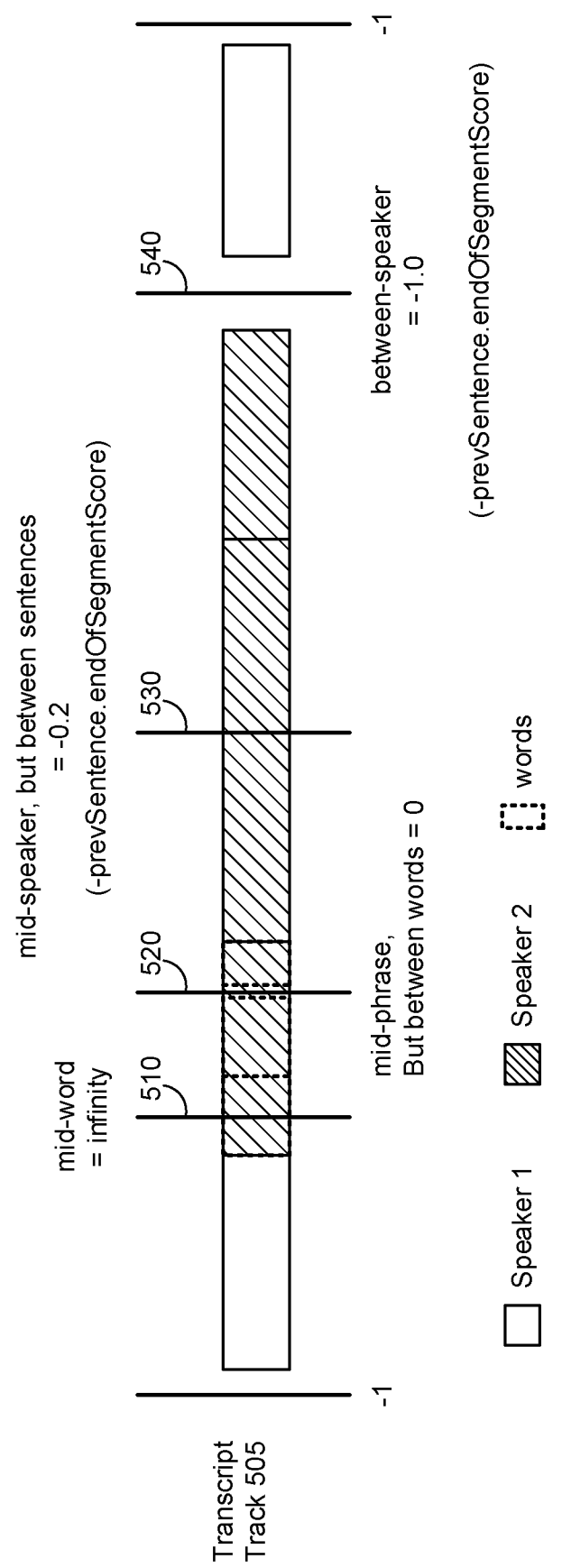
FIG. 5 is an illustration of an example technique for computing a boundary cut cost based on diarized transcript features, in accordance with embodiments of the present invention.

FIG. 5 is an illustration of an example technique for computing a boundary cut cost based on diarized transcript features. FIG. 5 illustrates example transcript track 505 with different transcript features diarized by detected speaker (with different speakers represented with different patterns). In an example implementation, cut cost computation component 186 penalizes candidate boundaries located inside a speech segment (e.g., word segments, phrase segments), candidate boundaries located during a speaker appearance but between sentences, and/or candidate boundaries at the end of a speech segment that is unlikely to conclude a topical segment. In an embodiment, cut cost computation component 186 determines whether a transcript and/or a diarized transcript is available. If transcript features are unavailable, there is no contribution to boundary cut cost based on transcript features. In the example implementation illustrated in FIG. where cut costs are normalized between −1 (good) and +1 (bad), a candidate boundary 510 located mid-word is scored with a large cut cost (e.g., infinite), a candidate boundary 520 located mid-phrase but between words is scored with a moderate cut cost (e.g., 0), a candidate boundary 530 located mid-speaker but between sentences is scored with a cut cost equal to or proportional to a predicted likelihood that the preceding speech segment concludes a topical segment (e.g., −0.2), and/or a candidate boundary 540 located at a change of speakers is scored with a low cut cost (e.g., −1.0). Additionally or alternatively, a candidate boundary at the end of a speech segment (e.g., candidate boundaries 530, 540) is scored with a cut cost equal to or proportional to a predicted likelihood that the preceding speech segment concludes a topical segment (e.g., −endOfSegmentScore for the previous sentence in FIG. 5).

Figure 6:
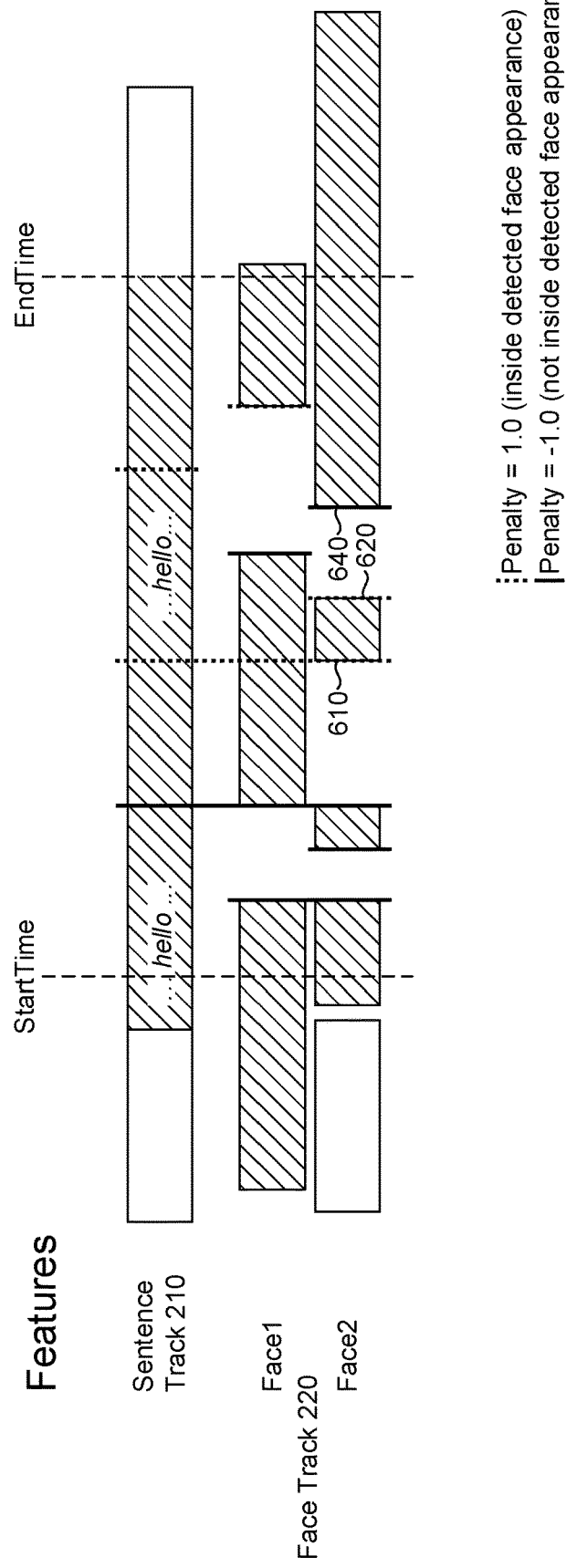
FIG. 6 is an illustration of an example technique for computing a boundary cut cost based on detected faces, in accordance with embodiments of the present invention.

FIG. 6 is an illustration of an example technique for computing a boundary cut cost based on detected faces. FIG. 6 illustrates example face track 220 with detected feature ranges for each detected face appearance. In an example implementation, cut cost computation component 186 penalizes candidate boundaries when the candidate boundaries are located within a feature range for a detected face appearance. By way of nonlimiting example, candidate boundaries that fall within a detected face appearance (e.g., boundaries 610 and 620) are scored with a high cut cost (e.g., +1.0), and candidate boundaries that do not fall within a detected face appearance (e.g., boundary 640) are scored with a low cut cost (e.g., −1.0).

Figure 7A:
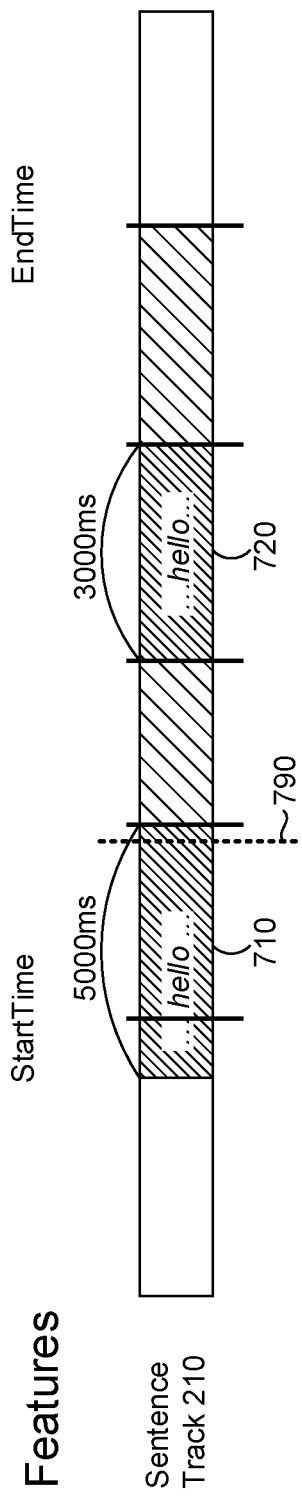
FIGS. 7A-7D are illustrations of an example technique for computing a boundary cut cost based on a query, in accordance with embodiments of the present invention.
Figure 7B:
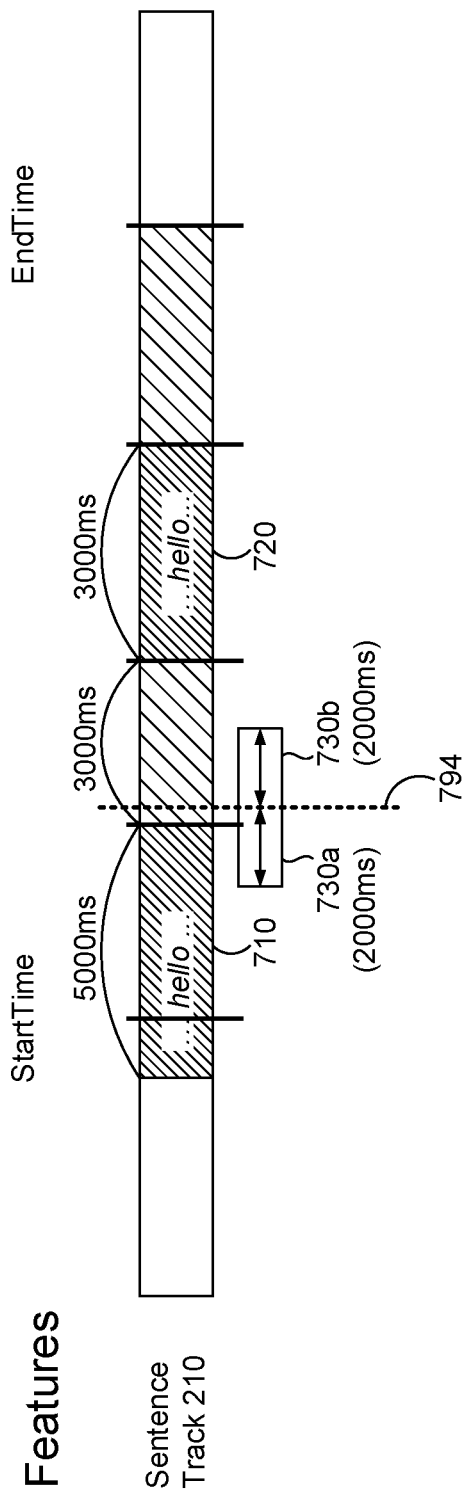

In an example search segmentation, a "good" boundary will be at a transition between a feature that matches a query (e.g., a query "ON" feature) and a feature that does not match the query (e.g., a query "OFF" feature). As such, in some embodiments, cut cost computation component 186 penalizes candidate boundaries located within a matching feature (e.g., a query ON feature) and/or candidate boundaries located far from a query ON/OFF transition. FIGS. 7A-7D are illustrations of an example technique for computing a boundary cut cost based on a query. FIGS. 7A-7D illustrate example matching (query ON) features 710 and 720. In an example implementation, if a candidate boundary is inside a matching (query ON) feature, cut cost computation component 186 scores the candidate boundary with a high cut cost (e.g., +1.0). In FIG. 7A, candidate boundary 790 is inside matching feature 710, so cut cost computation component 186 scores candidate boundary 790 with a high cut cost (e.g., +1.0).

Figure 7C:
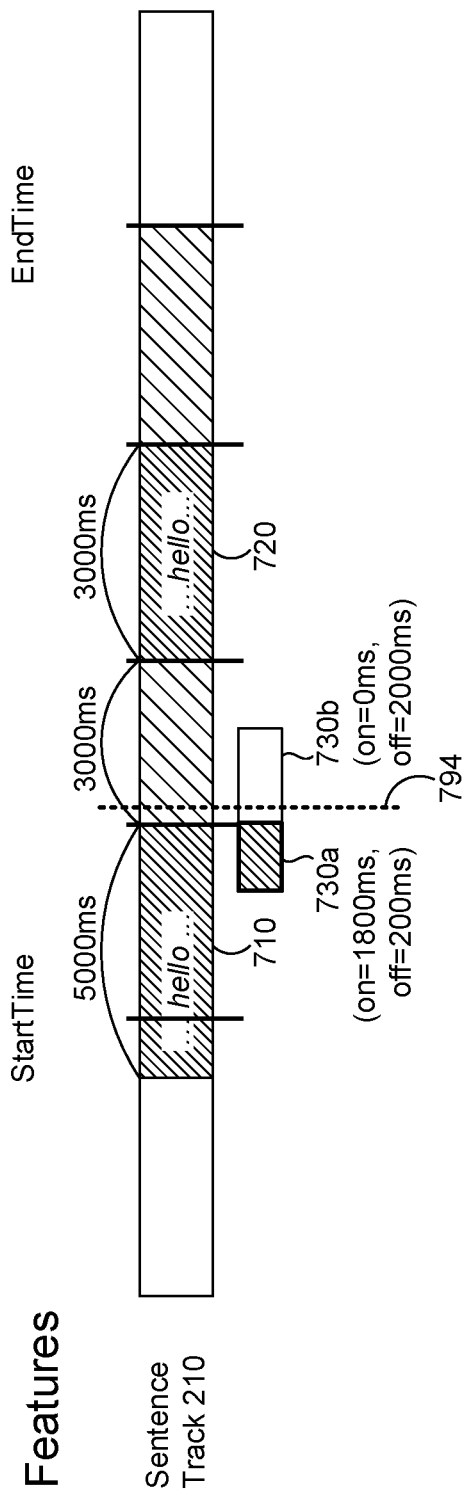

In some embodiments, if a candidate boundary is not located inside a matching feature, cut cost computation component 186 considers the two closest and/or adjacent matching features and their lengths. For example, in FIG. 7B, candidate boundary 794 is outside matching features 710 and 720. In an example implementation, cut cost computation component 186 considers a window on each side of candidate boundary 794 (e.g., a window of size corresponding to the half the average length of the adjacent query ON features). In the example illustrated in FIG. 7B, cut cost computation component 186 determines the size of windows 730a and 730b as 0.5*(5000 ms+3000 ms)/2=2000 ms, one 2000 ms window on either side of candidate boundary 794. Cost computation component 186 computes the amount of query ON time in windows 730a and 730b. In FIG. 7C, window 730a overlaps with matching (query ON) feature 710 for 1800 ms (query ON time=1800 ms), and window 730b does not overlap with matching (query ON) feature 720 (query ON time=0 ms). Finally, cost computation component 186 computes a cut cost based on the amount of time windows 730a and 730b overlap with a matching (query ON) feature, for example, as:

$$\text{QueryBoundaryCutCost} = \\ 1.0 - 2 * \left| \frac{\text{queryOnTimeBefore} - \text{queryOnTimeAfter}}{\text{windowSize}} \right| \quad \text{(Eq. 4)}$$

Figure 7D:
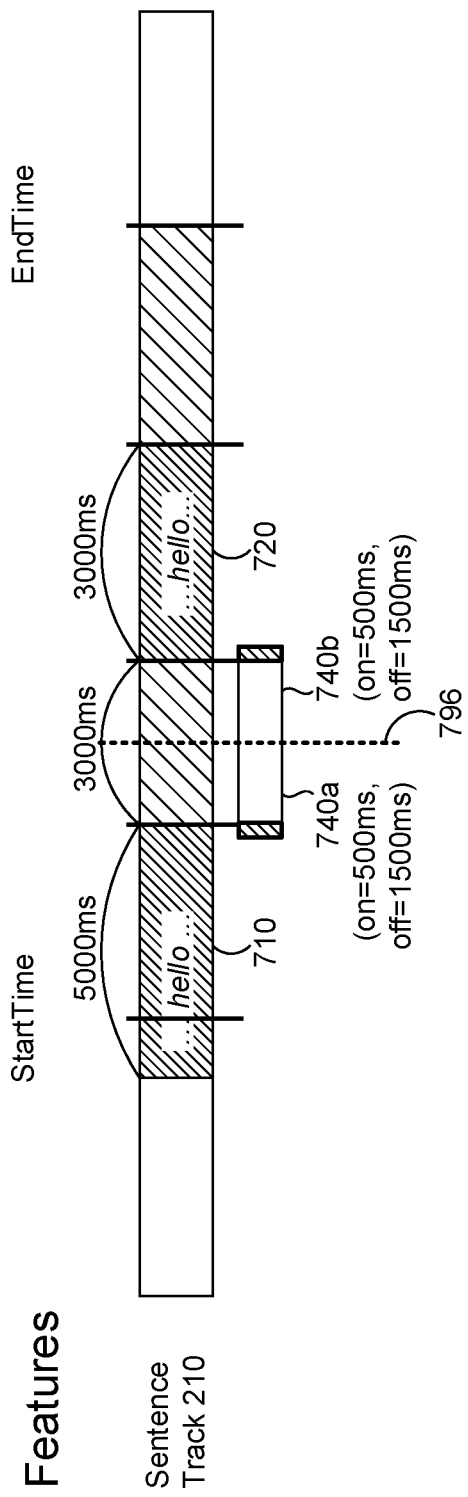

In the example illustrated in FIG. 7C, equation 4 resolves to 1.0−2*1800/2000=−0.8. FIG. 7D illustrates another example where candidate boundary 796 is not within a query ON feature. In this example, candidate boundary 796 is centered in a query OFF feature, windows 740a and 740b overlap with a matching (query ON) feature for 500 ms each, and equation 4 resolves to 1.0−2*0/2000=1.0.

Moving on now to an example interval cut cost, in some embodiments, cut cost computation component 186 assigns an interval cut cost that penalizes a candidate segment for having a length outside the target minimum or maximum length, incoherence of overlapping features from other feature tracks, overlapping both query ON and OFF features, and/or other characteristics. In an example implementation, cut cost computation component 186 computes an overall interval cut cost as combination (e.g., sum, weighted sum) of separate contributions from separate terms (e.g., based on target length, incoherence, partial query matching, etc.).

In some embodiments, cut cost computation component 186 computes an interval cut cost for candidate segments that have a length outside the target minimum or maximum length. In some embodiments, target minimum or maximum length are fixed for a particular type of segmentation (e.g., target segment length from 15 s to VideoDuration/5), proportional or otherwise dependent on an input zoom level (e.g., the zoom level for a composite timeline in an editor interface, discussed in more detail below), exposed by some interaction control element (e.g., a slider or button that allows a user to set or adjust the target minimum or maximum length), mapped to discrete or continuous values, and/or otherwise. In an example implementation, a search segmentation has fixed target minimum and maximum segment lengths that are not impacted by zoom level. In another example implementation, a snap point segmentation has target minimum and maximum segment lengths that are mapped to the zoom level, and as a user zooms in (e.g., to a composite timeline in an editor interface), the target minimum and maximum segment lengths are reduced, producing more snap points for smaller video segments.

Depending on designated and/or determined target minimum and maximum segment lengths, cut cost computation component 186 penalizes candidate segments outside the target length. In some embodiments, the cut cost computation component 186 uses a hard constraint, assigning an infinite cut cost for candidate segments outside the target length. In some embodiments, the cut cost computation component 186 uses a soft constraint, assigning large cut cost for candidate segments outside the target length (e.g., 10, 100, 1000, etc.).

In some embodiments, cut cost computation component 186 computes an interval cut cost for a candidate segment based on incoherence of overlapping features from other feature tracks. In some cases, a "good" video segment contains coherent or similar content with respect to each feature track. As such, in an example implementation, cut cost computation component 186 penalizes candidate segments that lack coherence in an overlapping region of another feature track (e.g., the detected features in the overlapping region change). In some embodiments, cut cost computation component 186 computes an interval cut cost based on incoherence for each feature track, computes interval incoherence cut cost differently for different feature tracks, and/or computes an overall interval incoherence cut cost by combining the contributions from each feature track (e.g., summing, weighted sum, etc.).

Figure 8:
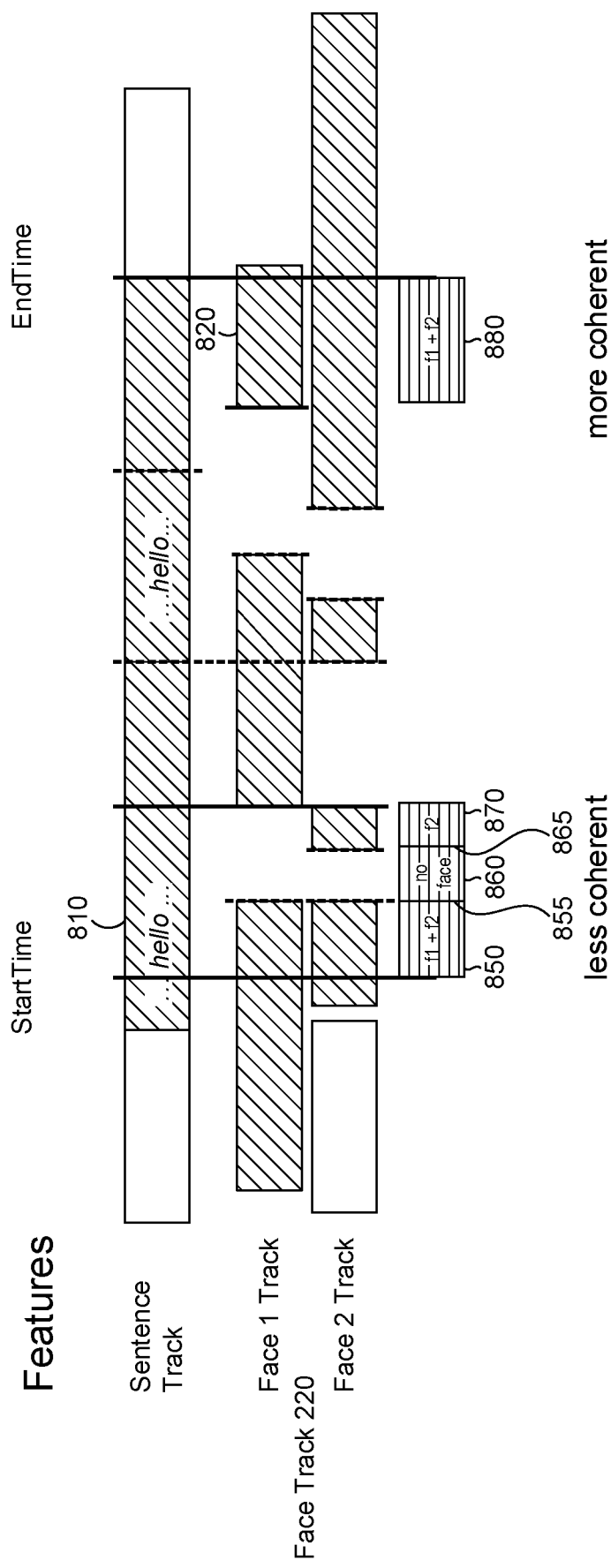
FIG. 8 is an illustration of an example technique for computing an interval cut cost based on incoherence of detected features, in accordance with embodiments of the present invention.

FIG. 8 is an illustration of an example technique for computing an interval cut cost based on incoherence of detected features. In an example implementation, cut cost computation component 186 computes an interval incoherence cut cost for a candidate segment with respect to a feature track based on a number of detected feature transitions in a region of the feature track that overlaps with the candidate segment. For example, in FIG. 8, candidate segment 810 overlaps with two transitions in face track 220 (feature boundaries 855 and 865), so candidate segment 810 would encompass sub-segment 850 (with face 1 and face 2), sub-segment 860 (with no faces), and sub-segment 870 (with face 2). By contrast, candidate segment 820 overlaps with zero transitions in face track 805, so candidate segment 820 would encompass only sub-segment 880 (with face 1 and face 2). In an example implementation, cut cost computation component 186 counts the number of detected feature transitions in the region of a feature track that overlaps with each candidate segment, normalizes the number of transitions (e.g., by the maximum number of transitions with respect to that feature track), and assigns the normalized number of transitions as the interval incoherence cut cost for a candidate segment.

In some embodiments, some transitions (e.g., feature boundaries) are associated with a measure of the strength of a transition (e.g., endOfSegmentScore quantifying a likelihood that a preceding speech segment concludes a topical segment, confidence level that a speech segment is spoken by a new speaker, a measure of similarity of frames in a visual scene). As such, in some cases, cut cost computation component 186 penalizes a candidate segment based on a count of overlapping feature transitions weighted by the strength of a transition. This can serve to reduce the incoherence cut cost based on incoherence of detected features, for example, where the sentence changes but the topics are similar, or the visual scene changes but nevertheless looks similar.

Figure 9A:
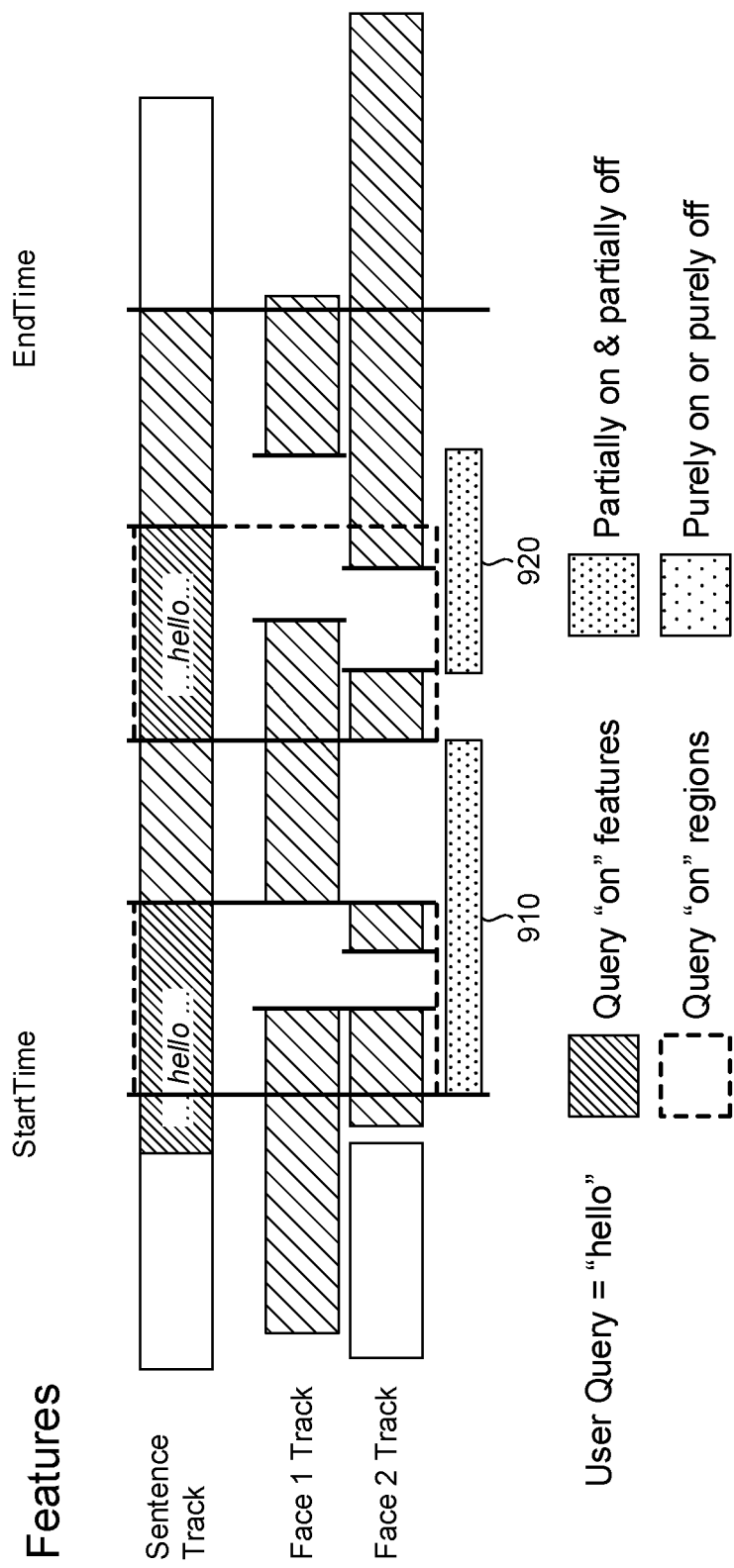
FIGS. 9A-9B are illustrations of an example technique for computing an interval cut cost based on a query, in accordance with embodiments of the present invention.
Figure 9B:
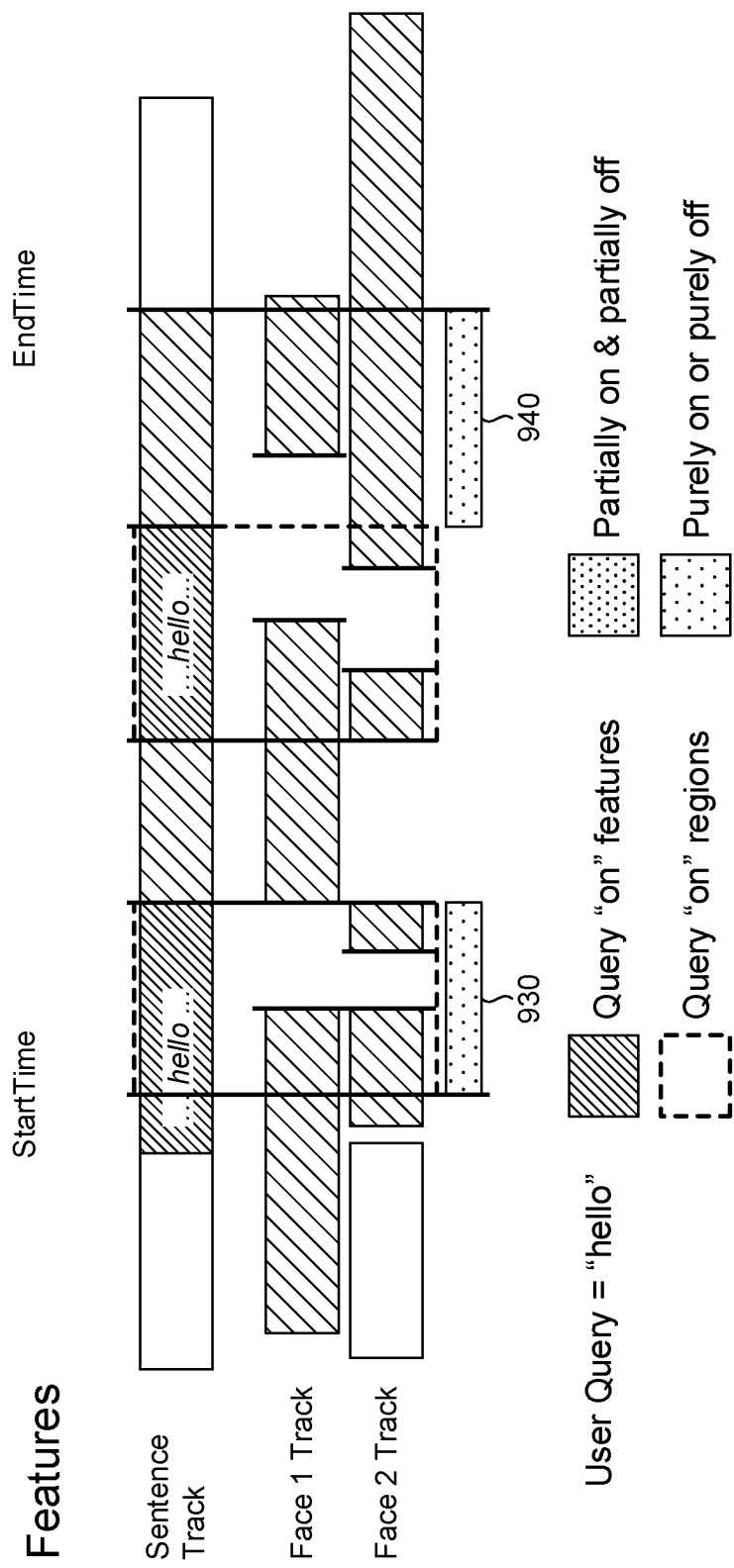

In some embodiments, cut cost computation component 186 computes an interval cut cost for a candidate segment based on a query. In some cases, a "good" video segment is either purely ON or purely OFF with respect to the query (e.g., to encourage clean search results). For example, in some implementations, if a user queries for "elephant," the segments that get returned ideally contain elephants the whole time or do not have elephants at all. As such, in an example implementation, cut cost computation component 186 only penalizes candidate segments that are partially ON and partially OFF (segments that have elephants some of the time). FIGS. 9A-9B are illustrations of an example technique for computing an interval cut cost based on a query. In FIG. 9A, candidate segments 910 and 920 are partially ON and partially OFF, and in FIG. 9B, candidate segments 930 and 940 are purely ON or purely OFF. In an example implementation, cut cost computation component 186 counts the number of transitions between ON and OFF segments and normalizes, as described above. In another example, cut cost computation component 186 computes the percentage of overlapping query ON time to total time in the candidate segment, overlapping query OFF time to total time in the candidate segment, and assigns a lower cut cost the closer the ratio is to zero or one.

In summary and returning to FIG. 1A, cut cost computation component 186 computes cut costs for different candidate segments based on boundary and/or interval contributions, and assigns the cut cost for a candidate segment as the edge weight for the edge that represents that candidate segment. Then, path optimization component 188 solves a shortest path problem along the graph to compute an optimal segmentation, for example, using dynamic programming. In an example implementation, candidate paths are selected to produce a complete and non-overlapping segmentation. For each candidate path, path optimization component 188 sums the edge weights and takes the path with the lowest sum as the optimal path, which represents the optimal segmentation.

The foregoing discussion involved an example implementation of video segmentation component 180 triggered by default segmentation component 164 to compute an example default segmentation, and triggered by search segmentation component 170 to compute an example search segmentation. Another example video segmentation is a snap point segmentation that identifies the locations of selection snap points for a video. As explained in more detail below, an example use for a snap point segmentation is in a user interface with a video timeline representing a video (e.g., a composite timeline representing selected video segments in an editor interface), where the snap points identified by the snap point segmentation are illustrated on the timeline and/or used to snap a selection of video segments as a user drags along the timeline or a corresponding portion of the transcript. In various embodiments, a snap point segmentation is computed at any suitable time (e.g., when displaying a video timeline, activing an editor interface, identifying the video segments to be represented by a composite timeline, and/or at some other time). In the example embodiment illustrated in FIGS. 1A and 1B, video interaction engine 108 (e.g., video editing tool 130) of video editing application 105 communicates with snap point segmentation component 172 to trigger video segmentation component 180 to compute a snap point segmentation.

In an example implementation of a snap point segmentation, video segmentation component 180 executes a segmentation routine that accepts different input parameters, such as designated feature tracks (e.g., predetermined, user-selected, etc.), target minimum or maximum length of a video segment (which in some cases depends on zoom level, some interaction control element exposed to the user, etc.), range of a video to segment (e.g., each video segment designated for editing, represented by the composite timeline, etc.), and/or others. In some embodiments, video segmentation component 180 computes a separate snap point segmentation for each video segment represented by a composite timeline or otherwise designated for editing.

In an example implementation of a snap point segmentation, video segmentation component 180 executes a segmentation routine using any of the techniques described herein. For example, candidate boundary selection component 182 of video segmentation component 180 identifies candidate boundaries as candidate snap points from the boundaries of feature ranges in designated feature tracks. In an example embodiment, if there are no detected features or feature ranges available, candidate boundary selection component 182 returns regularly spaced candidate snap points. If there are detected features and feature ranges available, candidate boundary selection component 182 considers whether transcript features are available. If transcript features are not available, candidate boundary selection component 182 computes candidate snap points that are regularly spaced (e.g., ~500 ms apart) and then snaps those points to a closest feature boundary from one of the designated feature tracks located within a snapping threshold (e.g., 250 ms).

In an example embodiment where transcript features are available, candidate boundary selection component 182 iterates through feature boundaries for transcript features (e.g., words) in order, adding the transcript feature boundaries (e.g., word boundaries) as candidate snap points. Additionally or alternatively, when a gap between consecutive transcript feature boundaries (e.g., representing word duration and/or gaps between words) is larger than some threshold (e.g., 500 ms), candidate boundary selection component 182 adds regularly spaced candidate snap points (e.g., ~500 ms apart) into the gap. In some embodiments, candidate boundary selection component 182 snaps the added points to a closest non-transcript feature boundary from one of the designated feature tracks located within a snapping threshold (e.g., 250 ms). These are just a few ways to designate candidate boundaries as candidate snap points, and any other technique for identifying candidate snap points additionally or alternatively can be implemented, including the other techniques for identifying candidate boundaries described herein.

In some embodiments, graph construction component 184 of video segmentation component 180 constructs a graph with nodes that represent the candidate snap points, edges that represent candidate separations between snap points (e.g., candidate segments), and edge weights computed by cut cost computation component 186 of video segmentation component 180. In an example implementation, cut cost computation component 186 assigns a cut cost for a candidate segment that encourages snapping at "good" points and/or discourages snapping at "bad" points. By way of nonlimiting example, cut cost computation component 186 determines the edge weight between two nodes as the (e.g., normalized) sum of a boundary cut cost (e.g., as described above) and an interval cut cost for the candidate segment. With respect to interval cut cost, in some cases, snap points that are too close may not be helpful. As such, in an example embodiment, a target minimum length between snap points (e.g., represented by a target minimum video segment length) is determined based on a minimum pixel separation, which in some cases depends on a zoom level viewing a video timeline. For example, a designated minimum pixel separation (e.g., 15 pixels) is mapped to a corresponding duration on the timeline (e.g., based on an active zoom level), and that duration is used as a target minimum interval between snap points. In some cases, the target minimum interval is used as a hard constraint (e.g., candidate segments that are shorter than the minimum interval are assigned an infinite interval cut cost), a soft constraint (e.g., candidate segments that are shorter than the minimum interval are assigned a large interval cut cost, such as 10, 100, 1000, etc.), or otherwise.

As such, cut cost computation component 186 of video segmentation component 180 computes edges weights for edges between nodes in the graph, and path optimization component 188 of video segmentation component 180 solves a shortest path problem along the graph to compute an optimal segmentation with resulting segment boundaries that represent optimal snap points based on the cut costs.

Another example video segmentation is a thumbnail segmentation that identifies locations on a video timeline to illustrate with different thumbnails. In the example embodiment illustrated in FIG. 1A, thumbnail segmentation component 174 triggers video segmentation component 180 to compute a thumbnail segmentation. As explained in more detail below, an example use for a thumbnail segmentation is in a user interface with a video timeline representing a video (e.g., a composite timeline representing selected video segments in an editor interface), where the thumbnail locations identified by the thumbnail segmentation are illustrated with corresponding video frames (thumbnails) on the timeline. In various embodiments, a thumbnail segmentation is computed at any suitable time (e.g., when displaying a video timeline, activating an editor interface, identifying the video segments to be represented by a composite timeline, and/or at some other time). In the example embodiment illustrated in FIGS. 1A and 1B, video interaction engine 108 (e.g., video editing tool 130) of video editing application 105 communicates with thumbnail segmentation component 174 to trigger video segmentation component 180 to compute a thumbnail segmentation.

In an example implementation of a thumbnail segmentation, video segmentation component 180 executes a segmentation routine using any of the techniques described herein. In some embodiments, video segmentation component 180 executes a segmentation routine similar to the example implementation of a snap point segmentation described above with the following additional or alternative aspects. For example, candidate boundary selection component 182 of video segmentation component 180 identifies candidate boundaries as candidate thumbnail locations from the boundaries of feature ranges in designated feature tracks, graph construction component 184 of video segmentation component 180 constructs a graph with nodes that represent the candidate thumbnail locations, edges that represent candidate separations between thumbnail locations (e.g., candidate segments), and edge weights computed by cut cost computation component 186 of video segmentation component 180.

In an example implementation, cut cost computation component 186 assigns a cut cost for a candidate segment that encourages placing thumbnails at "good" locations. By way of nonlimiting example, cut cost computation component 186 determines the edge weight between two nodes as the (e.g., normalized) sum of a boundary cut cost (e.g., penalizing candidate thumbnail locations that fall within a detected feature range, or within a portion of the video with detected high-movement, etc.) and an interval cut cost for the candidate segment (e.g., penalizing candidate thumbnail locations where the visual difference between two consecutive thumbnails is small, penalizing thumbnail separations corresponding to a minimum pixel separation for a thumbnail, based on zoom level, etc.).

With respect to boundary cut cost, in some cases, to discourage displaying thumbnails at "bad" cut points (e.g., within a detected visual feature from another feature track), cut cost computation component 186 assigns a low boundary cut cost to candidate thumbnail locations based on proximity to a visual feature boundary (e.g., face, scene), assigns a high boundary cut cost to candidate thumbnail locations that fall within a detected feature range, and/or assigns a high boundary cut cost to candidate thumbnail locations that fall within a portion of the video with detected high-movement (e.g., detected using one or more machine learning models of feature extraction component(s) 162).

With respect to interval cut cost, in some cases, to encourage displaying thumbnails with different visual content, cut cost computation component 186 determines an interval cut cost for a candidate thumbnail location based on visual similarity and/or differences in visual content between two consecutive candidate thumbnails corresponding to the start and end boundaries of a candidate separation/segment. In an example involving face or visual scene transitions, cut cost computation component 186 computes a measure of the similarity or difference between candidate thumbnails/video frames at thumbnail locations corresponding to the start and end boundaries of a candidate separation/segment, and penalizes thumbnail locations where consecutive thumbnails are within a threshold similarity. Additionally or alternatively, in some cases, thumbnails cannot be spaced closer than the width of a thumbnail. As such, in an example embodiment, a target minimum thumbnail separation (e.g., represented by a target minimum video segment length) is determined based on a minimum pixel separation (e.g., a desired thumbnail width), which in some cases depends on a zoom level viewing a video timeline. For example, a designated minimum thumbnail separation is mapped to a corresponding duration on the timeline (e.g., based on an active zoom level), and that duration is used as a target minimum interval between thumbnails. In some cases, the target minimum interval is used as a hard constraint (e.g., candidate separations/segments that are shorter than the minimum interval are assigned an infinite interval cut cost), a soft constraint (e.g., candidate separations/segments that are shorter than the minimum interval are assigned a large interval cut cost, such as 10, 100, 1000, etc.), or otherwise.

As such, cut cost computation component 186 of video segmentation component 180 computes edges weights for edges between nodes in the graph, and path optimization component 188 of video segmentation component 180 solves a shortest path problem along the graph to compute an optimal segmentation with resulting segment boundaries that represent optimal thumbnail locations based on the cut costs.

Additionally or alternatively, in some embodiments, video segmentation component 180 computes multiple levels of snap point segmentations corresponding to different target video segment lengths (e.g., corresponding to different zoom levels, different input levels set by an interaction control element exposed to the user, etc.). In some embodiments, lower levels of a snap point segmentation include snap points from higher levels plus additional snap points (e.g., the input to a lower level snap point segmentation is a higher level snap segmentation, the snap point segmentation is run on each video segment from the next level up, etc.). These are just a few examples, and other implementations are contemplated within the scope of the present disclosure.

In some embodiments, video segmentation component 180 computes multiple levels of segmentations for a particular type of segmentation (e.g., snap point segmentation, thumbnail segmentation) corresponding to different zoom levels. For example, when a user zooms in on a video timeline, in some cases, existing snap points or thumbnails from a higher level segmentation are included in a lower level segmentation. Similarly, when a user zooms out on a video timeline, snap points or thumbnails from the higher level segmentation are a subset of the snap points or thumbnails from a lower level segmentation. In some embodiments, graph construction component 184 of video segmentation component 180 constructs a graph to enforce such a hierarchy, and different target video segment lengths are determined for different levels of the hierarchy (e.g., corresponding to different zoom levels, different input levels set by an interaction control element exposed to the user, etc.). As such, in some embodiments, one or more video segmentations are hierarchical in nature.

In some embodiments, video segmentation component 180 (or some other component) generates a representation of a computed video segmentation(s) 196 using one or more data structures. In an example implementation, video segments of a video segmentation(s) 196 are identified by values that represent, or references to, timeline locations (e.g., boundary locations, IDs, etc.), segment durations, separations between snap points or thumbnails, and/or other representations. In an example implementation involving a hierarchical segmentation, a hierarchical segmentation is represented using a two dimension array, where the dimensions of the array correspond to different levels of the segmentation, and the values stored in each dimension of the array represent the video segments in a corresponding hierarchy level.

In some cases, a single copy of a video and a representation of boundary locations for one or more segmentations are maintained. Additionally or alternatively, in an example embodiment involving a particular type of video segmentation of a video file (e.g., a default video segmentation), the video file is broken up into fragments at boundary locations of video segments from the (e.g., default) video segmentation and/or feature boundaries from a feature track (e.g., visual scene boundaries) for efficiency purposes. By way of motivation, users are likely to start or stop playback at the boundaries of the video segments from a default video segmentation, for example. Conventional techniques that generate fragments with uniform spacing are likely to require starting or stopping videos in the middle of a fragment, which in turn results in codec and/or playback inefficiencies. Similarly, uniformly spaced fragments are likely to require re-encoding and are therefore more expensive to export. As such, in many cases, using boundaries from one or more video segmentations (e.g., a default segmentation) and/or feature boundaries from a feature track (e.g., visual scene boundaries) as keyframes to start a new fragment will make playback, splicing, and/or export operations more computationally efficient.

Interacting with Video Segmentations

The prior section described example techniques for segmenting a video, for example, to prepare for video editing or other video interactions. By identifying semantically meaningful locations of the video, video segmentation tool 155 generates a structured representation of the video that provides an efficient and intuitive structure for interacting with the video, for example, via video interaction engine 108 of video editing application 105 in FIGS. 1A and 1B.

Video interaction engine 108 provides interface functionality that allows a user to select, navigate, play, and/or edit a video through interactions with one or more segmentations of the video and/or detected features of the video. In the example implementation in FIG. 1B, video interaction engine 108 includes video browsing tool 110 that provides a finder interface and video editing tool 130 that provides an editor interface. Video browsing tool 110 (e.g., the finder interface) and/or video editing tool 130 (e.g., the editor interface) present one or more interaction elements that provide various interaction modalities for selecting, navigating, playing, and/or editing a video based on one or more video segmentation(s) 196. In FIG. 1B, video browsing tool 110 (e.g., the finder interface) includes various tools, such as interactive tiles 112, selected clips panel 114, default re-segmentation tool 116, search re-segmentation tool 118, transcript tool 120, segmented timeline tool 122, and video playback tool 124. In FIG. 1B, video editing tool 130 (e.g., the editor interface) includes various tools, such as composite clip timeline tool 132, search re-segmentation tool 142, and video playback tool 144. In various embodiments, these tools are implemented using code that causes a presentation of a corresponding interaction element(s), and detects and interprets inputs interacting with the interaction element(s).

With respect to video browsing tool 110 (e.g., the finder interface), interactive tiles 112 represent the video segments in a default segmentation and detected features (e.g., detected features 194 of FIG. 1A) in each video segment. Users can select video segments represented by interactive tiles 112 and/or detected features 194 in interactive tiles 112, jump to corresponding parts of the video, and/or add corresponding video segments to selected clips panel 114. Default re-segmentation tool 116 re-computes the default segmentation based on selected feature categories (e.g., feature tracks) and updates interactive tiles 112 to represent the updated default segmentation. Search re-segmentation tool 118 triggers a search segmentation that re-segments the default segmentation based on a query. Transcript tool 120 presents the portion of the transcript corresponding to the part of a video being displayed in video playback tool 124. In some embodiments, users can select a portion of the transcript and add a corresponding video segment to selected clips panel 114. Segmented timeline tool 122 provides a video timeline of a video segmented based on an active segmentation, and video playback tool 124 plays back a selected portion of a video.

With respect to video editing tool 130 (e.g., the editor interface), composite clip timeline tool 132 presents a composite video timeline representing a composite video formed by the video segments selected in the finder interface. In this example, composite clip timeline tool 132 includes feature visualization tool 134 which represents detected features on the timeline, marquee selection and snapping tool 136 which represents snap points on the timeline and/or snaps a selection to the snap points, thumbnail preview tool 138 which represents thumbnails on the timeline, and zoom/scroll bar tool 140 which controls the zoom level and position of the timeline. Search re-segmentation tool 142 triggers a search segmentation that re-segments the video segments in the composite video based on a query. Video playback tool 144 plays back a selected portion of a video. Editor panel 146 provides any number of editing functions for a selected video segment(s), such as stylistic refinements that transform content, duration-impacting refinements that elide content, and/or contextual functions that depend on selected content. The functionality of video browsing tool 110, video editing tool 130, and other example video interaction tools is described in more detail below with respect to FIGS. 10-15.

Figure 10:
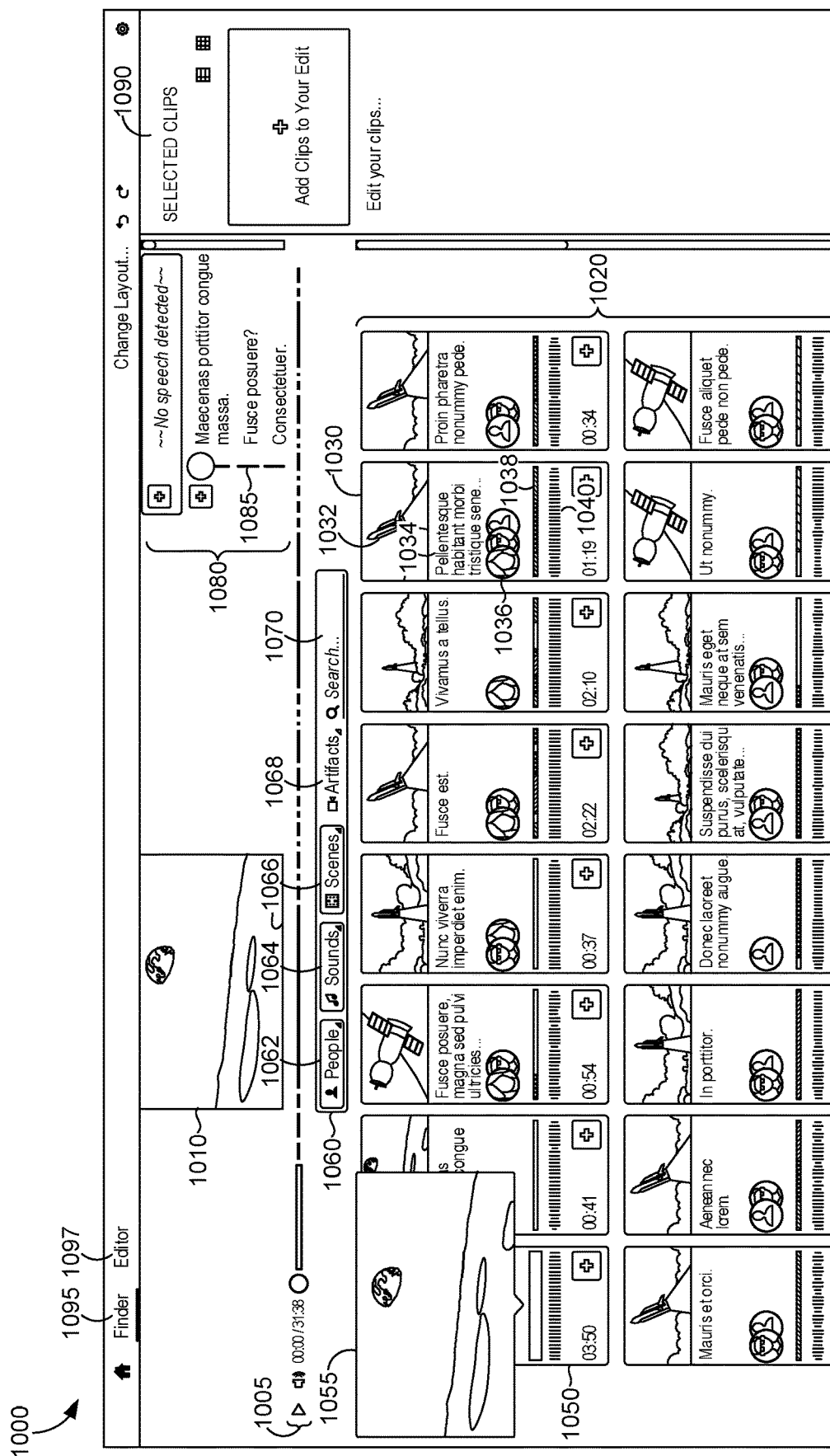
FIG. 10 is an illustration of an example finder interface for browsing default and/or search segmentations, in accordance with embodiments of the present invention.

Turning now to FIG. 10, FIG. 10 is an illustration of an example finder interface 1000 for browsing default and/or search segmentations. In the example illustrated in FIG. 10, finder interface 1000 includes video timeline 1005 (e.g., controlled by segmented timeline tool 122 of FIG. 1B), video frame 1010 (e.g., controlled by video playback tool 124 of FIG. 1B), interactive tiles 1020 (e.g., controlled by interactive tiles 112 of FIG. 1B), search bar 1060 (e.g., controlled by search re-segmentation tool 118 of FIG. 1B), transcript 1080 (e.g., controlled by transcript tool 120 of FIG. 1B), and selected clips panel 1090 (e.g., controlled by selected clips panel 114 of FIG. 1B).

In an example use case, a user loads a video for editing, for example, using a file explorer to identify the location of the video (not depicted). In some cases, upon receiving a command to load the video, the video is ingested to generate one or more segmentations (e.g., by video ingestion tool 160 and/or video segmentation component 180 of FIG. 1A), and a default segmentation is loaded. In an example implementation, when a video is loaded and/or a user opens finder interface 1000, finder interface 1000 presents video timeline 1005 which represents an active video segmentation such as a default segmentation (e.g., by displaying segment boundaries as an underlay), and/or finder interface 1000 presents a visual overview of a video using interactive tiles 1020 (e.g., interactive tiles 112 of FIG. 1) that represent video segments in an active video segmentation such as a default segmentation. In an example implementation, a default segmentation is computed from detected sentences, faces, and visual scenes, and interactive tiles 1020 are arranged in a grid of rows and columns.

In some embodiments, finder interface 1000 includes one or more interaction elements (e.g., controlled by default re-segmentation tool 116 of FIG. 1B) that expose one or more input parameters for the default segmentation, which allow a user to change the visual overview (e.g., by designating one or more feature tracks for the default segmentation). Example visual overviews include a people-focused overview (e.g., based on detected faces, detected speakers, and/or detected transcript features), a visual scene-focused overview (e.g., based on detected visual scenes and/or detected transcript features), a sound-focused overview (e.g., based on detected audio classifications and/or detected transcript features). Based on one or more designated feature tracks and/or overviews, the default segmentation is re-computed, and interactive tiles 1020 are updated to represent the updated default segmentation. As such, re-segmenting the default segmentation allows a user to quickly visualize a video in different ways.

In finder interface 1000, a user can scrub video timeline 1005 (which updates video frame 1010 of the video), scan transcript 1080, or look through interactive tiles 1020. Each of the interactive tiles 1020 (e.g., interactive tile 1030) includes a thumbnail (e.g., thumbnail 1032 of the first video frame of the video segment represented by interactive tile 1030) and a representation of one or more detected features and/or a corresponding feature range, such as some transcript (e.g., transcript 1034) from the beginning of that video segment, detected faces (e.g., faces 1036) from that video segment, and one or more of its own faceted timelines (e.g., visual scene timeline 1038, faceted audio timeline 1040). In some embodiments, a faceted timeline represents the detected facets in a particular category of detected features (e.g., visual scenes, audio classifications) and their respective locations in that video segment. Each of the interactive tiles 1020 allows the user to navigate the video by clicking on one of the facets on a faceted timeline, which jumps video frame 1010 to a corresponding part of the video. In some embodiments, a user can customize the visualized features in interactive tiles 1020 by turning on/off the visualizations for a particular category of feature (e.g., by clicking on buttons 1062, 1064, 1066, or 1068 to control the visualizations for people, sounds, visual scenes, and visual artifacts, respectively).

Figures 11A, 11B:
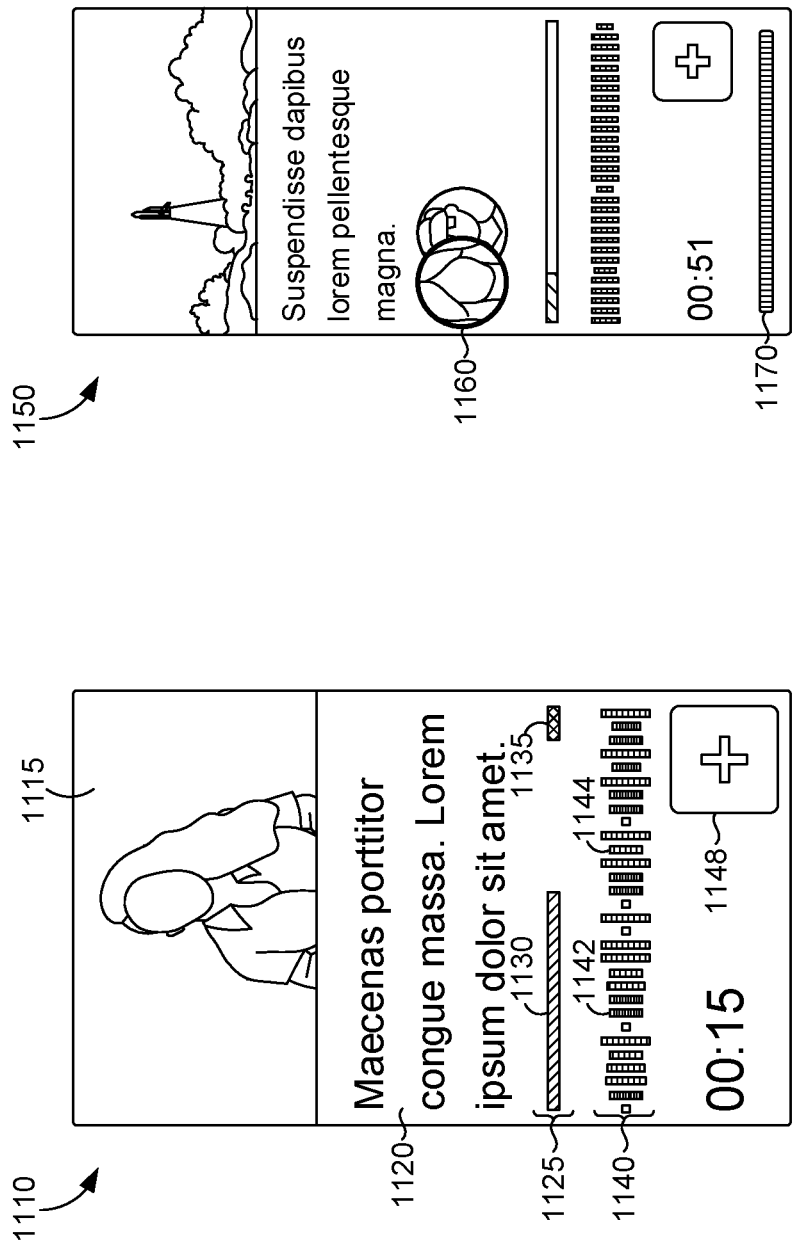
FIGS. 11A-11B are illustrations of example interactive tiles, in accordance with embodiments of the present invention.

FIGS. 11A-11B are illustrations of example interactive tiles 1110 and 1150. Interactive tile 1110 includes thumbnail 1115 of the first video frame of the video segment represented by interactive tile 1110, some transcript 1120 from the beginning of that video segment (represented with dummy text), visual scene timeline 1125, faceted audio timeline 1140, clip duration, and add button 1148 to add the video segment represented by interactive tile 1110 to a selection. In this example, visual scene timeline 1125 is faceted based on the instances of detected visual scenes appearing in the video segment represented by interactive tile 1110. More specifically, segment 1130 represents one visual scene, and segment 1135 represents another. Furthermore, faceted audio timeline 1140 is faceted based on the instances of detected audio classifications (e.g., music speech other) appearing in the video segment represented by interactive tile 1110. More specifically, segments 1144 represent one audio classification (e.g., speech) and segments 1142 represent another (e.g., music). In this example, a user can click on one of the facets from a faceted timeline (e.g., segments 1130, 1135, 1142, 1144) to jump to that part of the video. In another example, interactive tile 1150 includes a representation of detected faces 1160 in the video segment represented by interactive tile 1160. Visualizations of detected features such as these help the user browse the video without playing the video back.

In some embodiments, hovering over a part of an interactive tile, such as a faceted timeline, a thumbnail, and/or anywhere in the interactive tile updates the thumbnail in the interactive tile, or presents a popup with a thumbnail (e.g., popup thumbnail 1055 of FIG. 10) from a corresponding part of the video. For example, the horizontal input position (e.g., x position of a mouse or click input) relative to a total width (e.g., of a faceted timeline, a thumbnail, an interactive tile being hovered over) is mapped to percent offset into the video segment represented by the interactive tile, and a corresponding thumbnail is looked up and displayed. In some embodiments, uniformly sampled video frames are available as thumbnails. In other embodiments, the available thumbnails are identified by a thumbnail segmentation (e.g., and closest available thumbnails or available thumbnails within a threshold distance of the horizontal input position are returned). As such, the user can scrub through a set of thumbnails by hovering over one or more parts of an interactive tile.

Figure 12A:
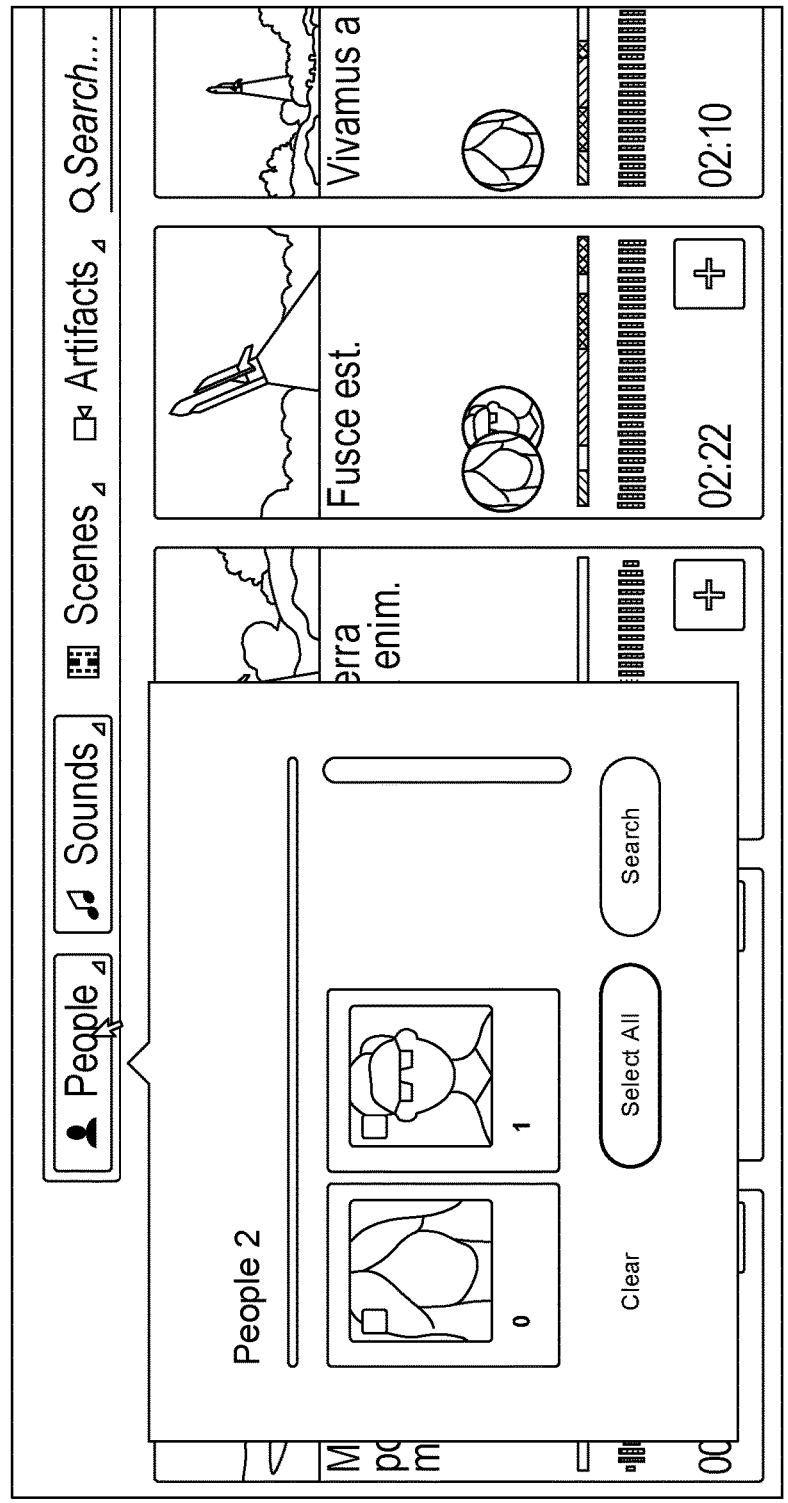
FIGS. 12A-12D are illustrations of example faceted search menus, in accordance with embodiments of the present invention.
Figure 12B:
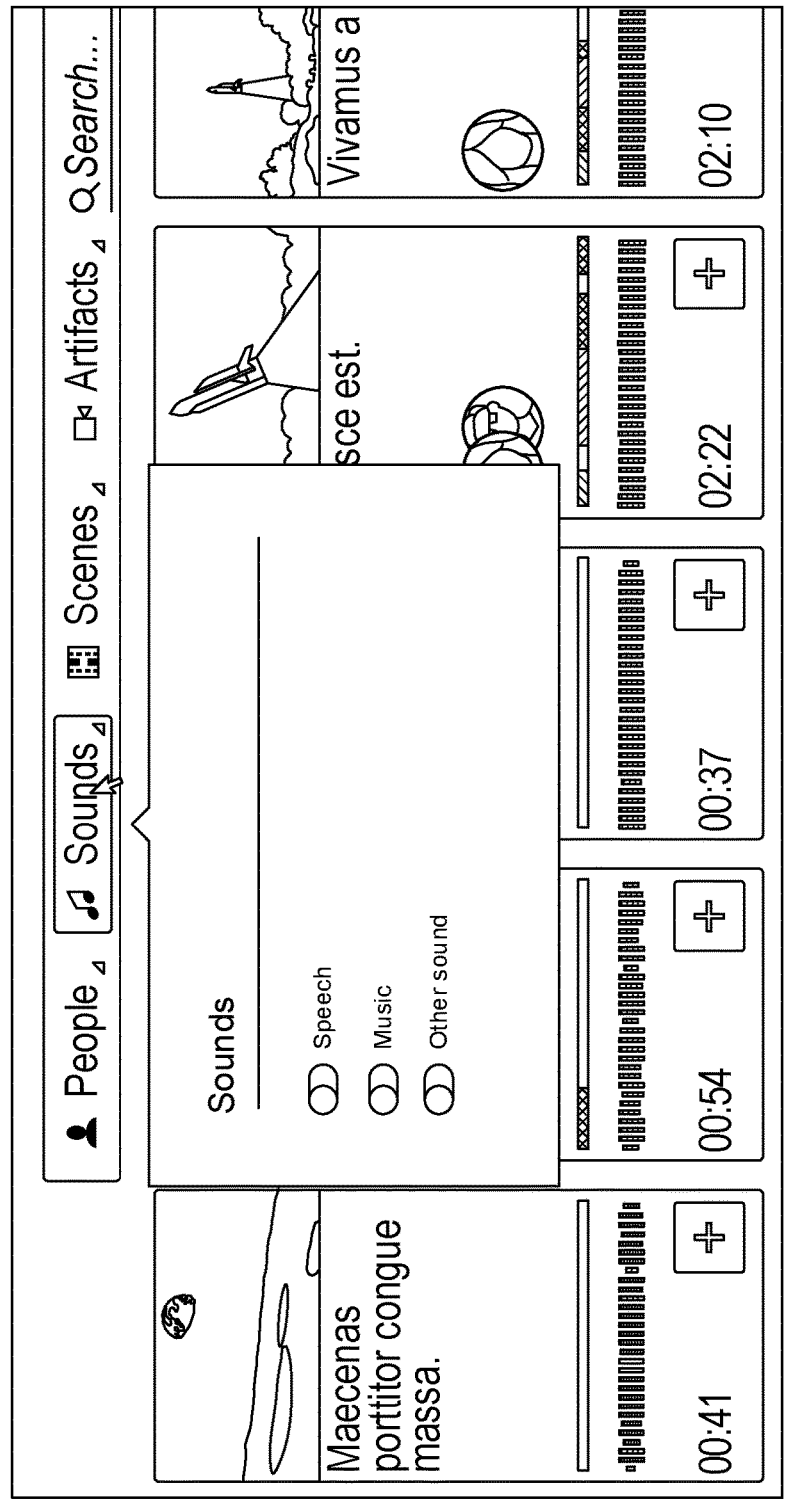
Figure 12C:
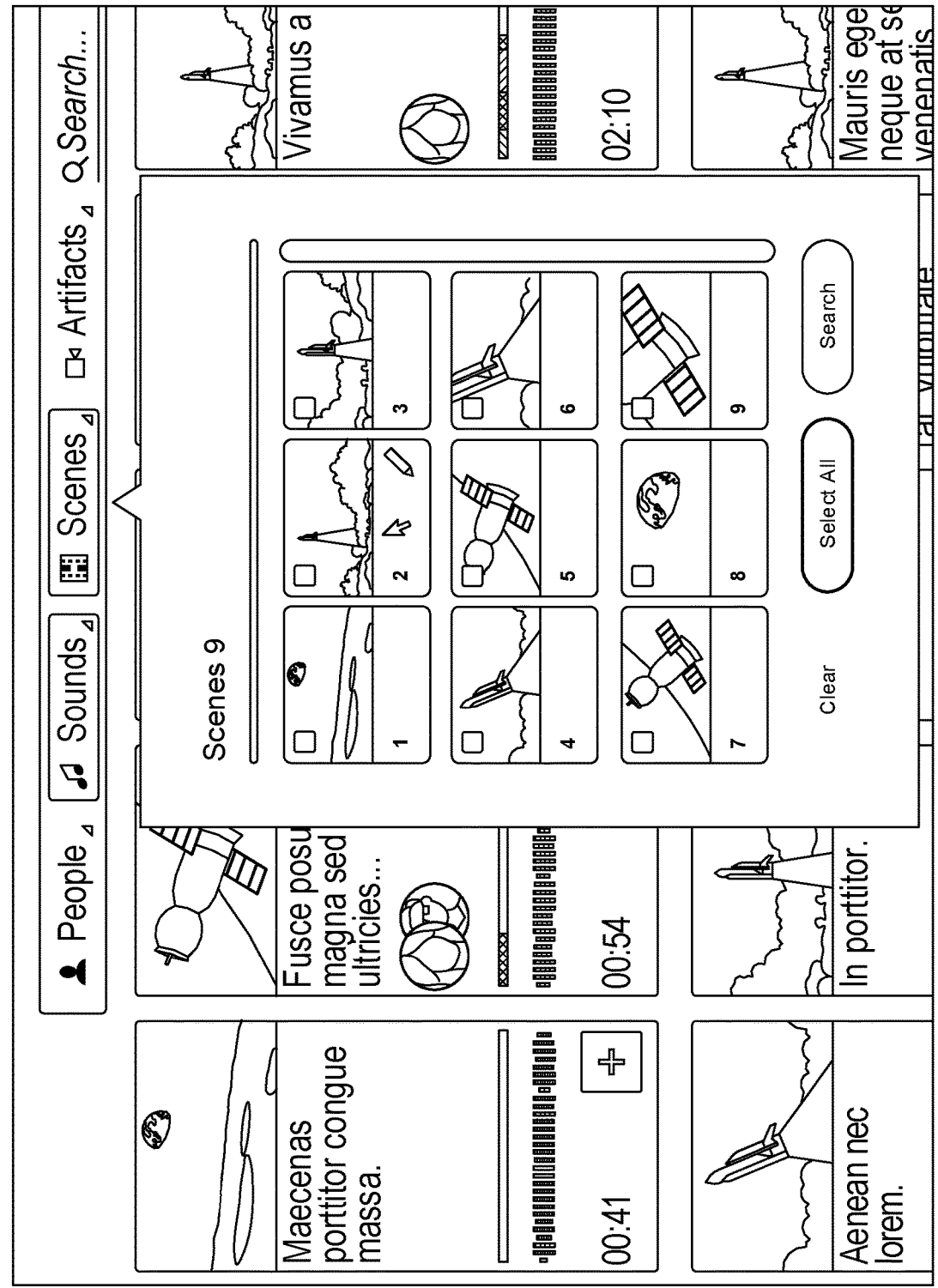
Figure 12D:
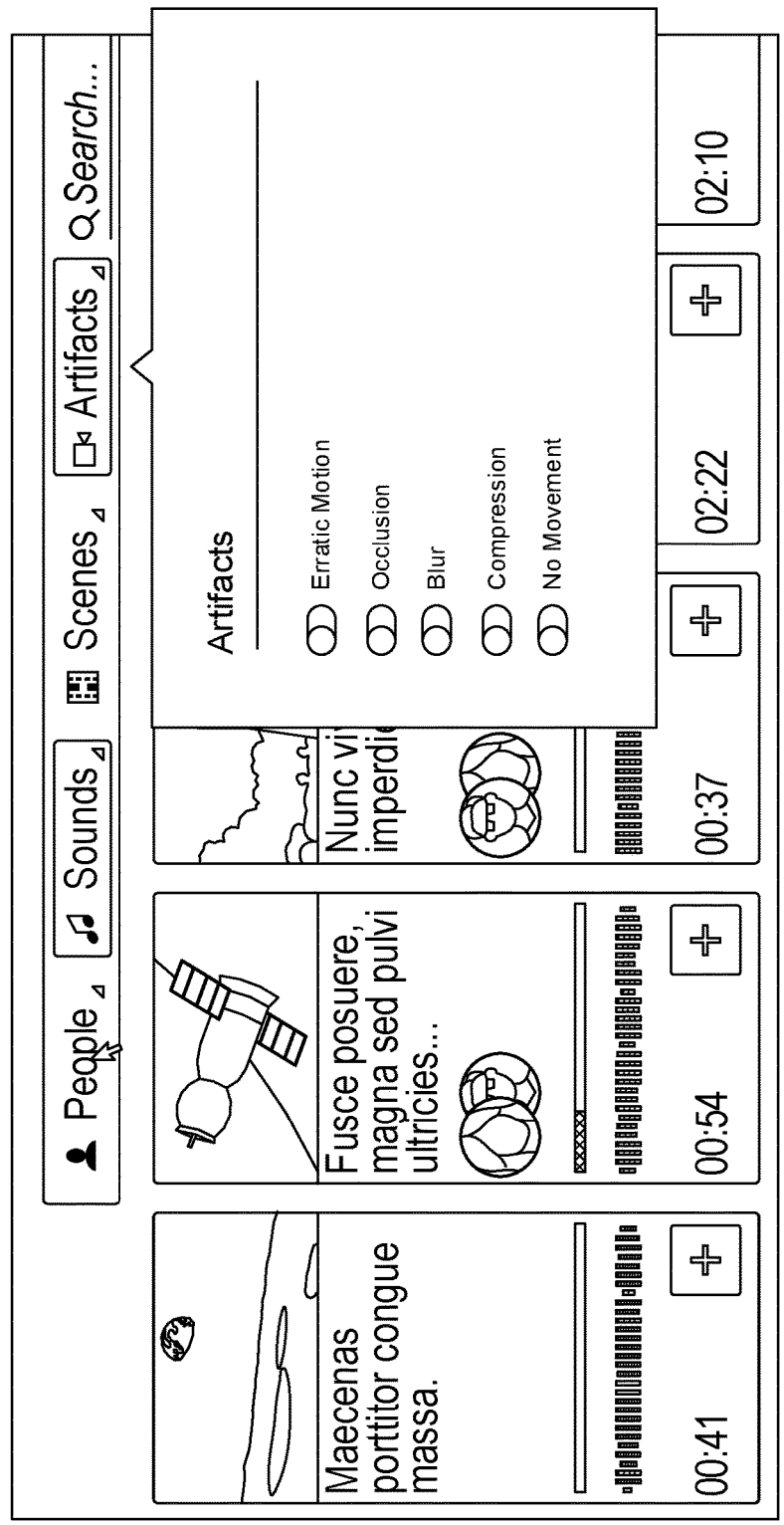

In the embodiment illustrated in FIG. 10, finder interface 1000 includes search bar 1060. In this example, search bar 1060 accepts a query in the form of one or more keywords (e.g., entered in search field 1070) and/or one or more selected facets (e.g., entered through corresponding menus accessible via buttons 1062, 1064, 1066, and 1068), and triggers a search segmentation that re-segments the default segmentation based on the query. In an example implementation, a user types in one or more keywords into search field 1070 and/or selects one or more facets through menus or other interaction elements that represent feature categories (feature tracks) and/or corresponding facets (detected features). In FIG. 10, interacting with buttons 1062, 1064, 1066, and 1068 (e.g., by hovering over the menu, left clicking on a button corner, right clicking) activates a corresponding menu showing detected people (button 1062), detected sounds (button 1064), detected visual scenes (button 1066), and detected visual artifacts (button 1068). FIGS. 12A-12D are illustrations of example faceted search menus. FIG. 12A shows an example menu with detected faces (e.g., activated by button 1062 of FIG. 10), FIG. 12B shows an example menu with detected sounds (e.g., activated by button 1064 of FIG. 10), FIG. 12C shows an example menu with detected visual scenes (e.g., activated by button 1066 of FIG. 10), and FIG. 12D shows an example menu with detected visual artifacts (e.g., activated by button 1068 of FIG. 10). As such, a user can navigate the faceted search menus illustrated in FIGS. 12A-12D, select one or more facets (e.g., a particular face, sound classification, visual scene, and/or visual artifact), enter one or more keywords into search field 1070, and run a search (e.g., by clicking on a facet, existing a faceted search menu, clicking on a search button, etc.).

In some embodiments, a typed keyword search triggers a search of detected features with associated text or value (e.g., transcript, object or action tags, audio event tags, log event tags, etc.) that matches the keyword, and/or a selected facet triggers a search for detected instances of the selected facet(s). In an example implementation, search bar 1060 triggers search segmentation component 170 and/or video segmentation component 180 of FIG. 1A to compute a search segmentation that re-segments the default segmentation represented by interactive tiles 1020 of FIG. 10, thereby updating interactive tiles 1020 to represent the video segments of the resulting search segmentation. In this example, searching serves to break down the interactive tiles that match the query to represent smaller units of the video based on a query. In other words, tiles that match the query break into smaller video segments, and tiles that do not match stay as they are. In some embodiments, tiles that match the query and break into smaller video segments are animated, for example, illustrating the tile being broken up.

In some embodiments, finder interface 1000 emphasizes interactive tiles that represent matching video segments (query ON segments). For example, interactive tile 1150 of FIG. 11B is illustrated with segment 1170 indicating the tile is a match for the query. Other examples of emphasis include outlining, adding a fill (e.g., a transparent fill), and/or others. In some embodiments, a matching tile additionally or alternatively represents why the tile was a match, such as by presenting or emphasizing a representation of the feature(s) that matched the query (e.g., a matched face, visual scene, sound classification, object, keyword, etc.). For example, interactive tile 1150 of FIG. 11B emphasizes one the faces 1160, indicating that face matched the query. In another example, a match with the transcript serves to highlight, underline, or otherwise emphasize a matching word in the tile. This way, a user can easily tell which interactive tiles match a query and why.

In some cases, when a user searches for content, the size of the video segments that the user wants can vary by task. For example, if a user wants to find clips of kids giggling, the user may only want short few second search results, but if the user wants to find clips of a rocket launch, the user may want longer search results. As such, in some embodiments, finder interface 1000 provides a slider or other interaction element (not illustrated) that exposes an input parameter for a segmentation (e.g., target minimum and maximum length of video segment) that lets the user interactively control the size of video segments generated by the segmentation and represented by interactive tiles 1020. In some embodiments, one or more of the interactive tiles (e.g., each tile) provides its own slider or other interaction element (e.g., a handle) that exposes an input parameter that lets the user interactively control the size of video segment(s) represented by a particular tile. Thus, various embodiments provide one or more interaction elements that allow a user to break up tiles into smaller parts locally (per-tile) and/or globally (all tiles).

Transcript 1080 presents the transcript for the video and highlights an active portion 1085 of the transcript. In some embodiments, transcript 1080 provides a diarized transcript that represents a detected speaker of the portion of the active portion of the transcript 1085.

Selected clips panel 1090 represents video segments that are added to a selection by a user. In an example implementation, a user can add video segments to the selection by dragging an interactive tile into selected clips panel 1090, clicking on the +button in an interactive tile (e.g., button 1148 in interactive tile 1110 of FIG. 11A), interacting with a visualization of a detected feature or facet in an interactive tile (e.g., right clicking on a visualization such as one of segments 1130, 1135, 1142, 1144 or faces 1160 of FIG. 11A to activate a contextual menu and adding a corresponding subset of a video segment to selection from the contextual menu, by highlighting a part of transcript 1080, right clicking to activate a contextual menu, and adding to selection from the contextual menu), and/or other ways. In FIG. 10, selected clips panel 1090 displays thumbnails or a list of selected video segments.

Once a set of video segments are selected, a user can switch to an editor interface to perform one or more editing functions. In the example illustrated in FIG. 10, finder interface 1000 provides one or more navigational elements that navigate between finder and editor interfaces (e.g., finder button 1095, editor button 1097, an edit button in selected clips panel 1090, etc.).

Figure 13:
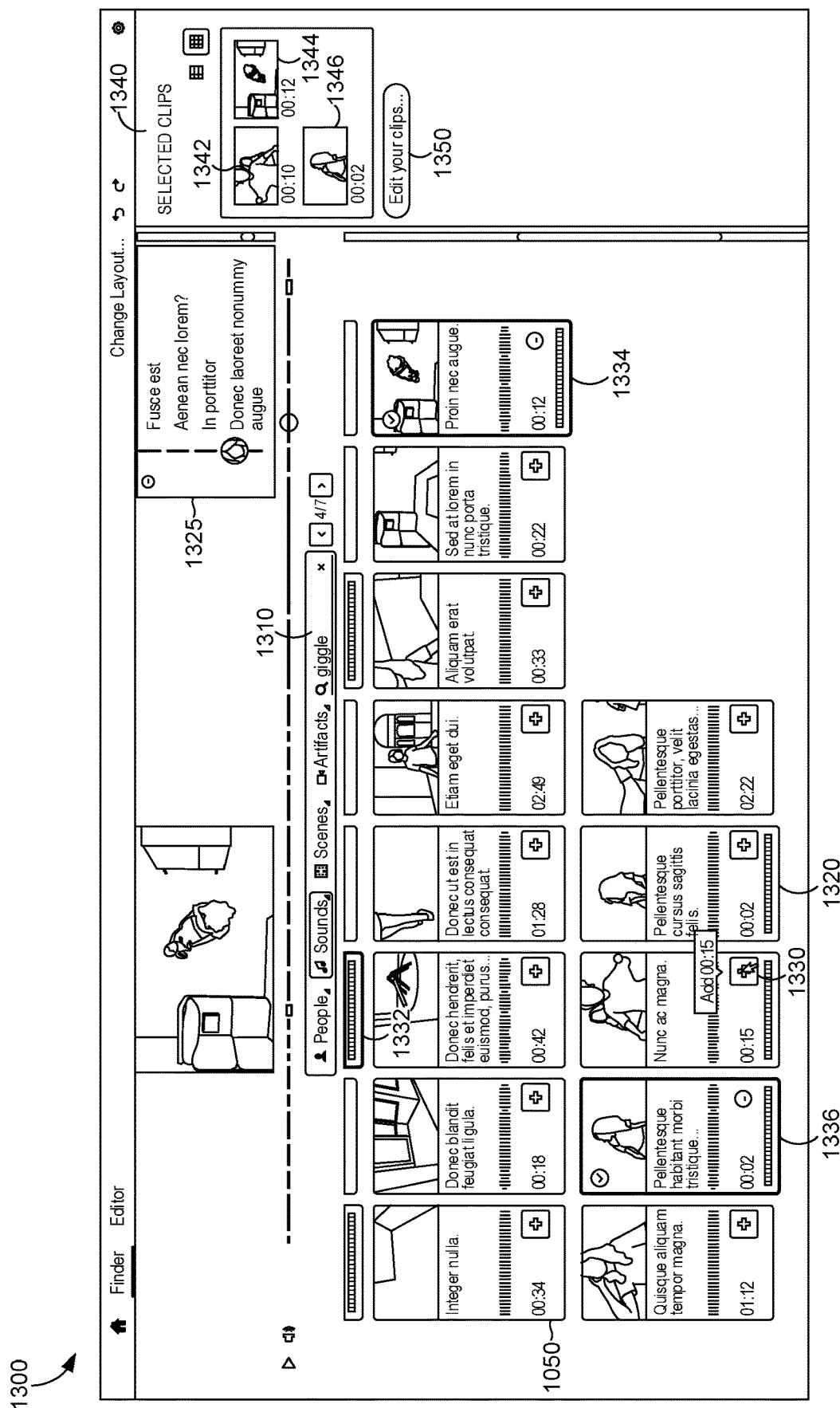
FIG. 13 is an illustration of an example search in a finder interface, in accordance with embodiments of the present invention.

FIG. 13 is an illustration of an example search in a finder interface. In this example, a user enters the query "giggle" into search field 1310, which triggers a search segmentation that highlights matching tiles (e.g., matching tile 1320) and matching portions of the transcript (e.g., transcript region 1325). In this example, the user adds matching video segments represented by tiles 1332, 1334, 1336 to selected clips panel 1340, which represents the added video segments with thumbnails 1342, 1344, 1346. In FIG. 13, the user is the process of adding another matching video segment by clicking on add button 1330 in a corresponding interactive tile. Once the user is finished adding video segments to the selection in selected clips panel 1340, the user clicks on button 1350 (edit your clips) to switch to an editor interface, such as the one illustrated in FIG. 14.

Figure 14:
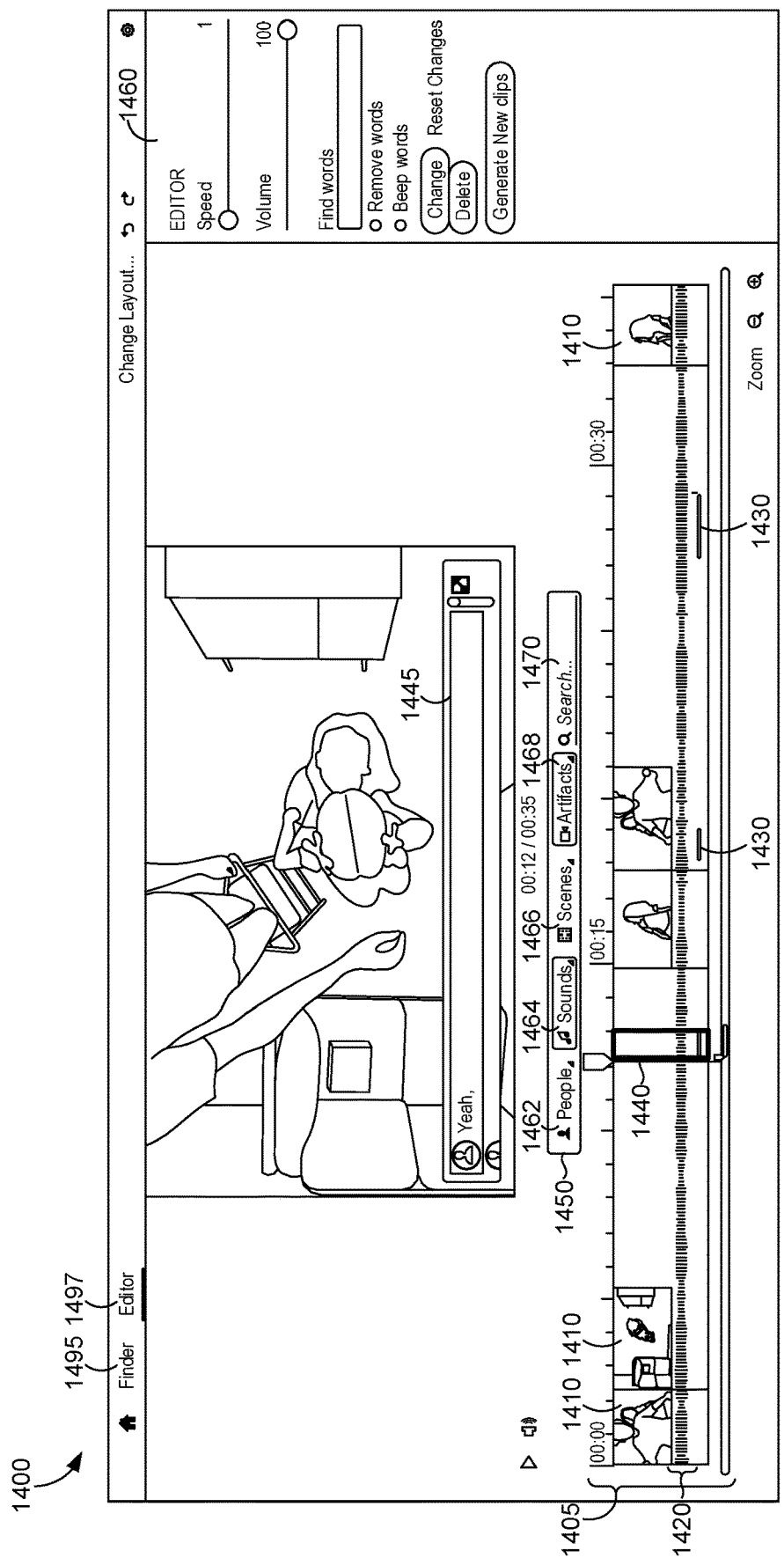
FIG. 14 is an illustration of an example editor interface for video editing, in accordance with embodiments of the present invention.

FIG. 14 is an illustration of an example editor interface 1400 for video editing. In the example illustrated in FIG. 14, editor interface 1400 includes video timeline 1405 (e.g., controlled by composite clip timeline tool 132 of FIG. 1B), search bar 1450 (e.g., controlled by search re-segmentation tool 142 of FIG. 1B), and editor panel 1460 (e.g., controlled by editor panel 146 of FIG. 1B). Video timeline 1405 includes thumbnails 1410 (e.g., controlled by thumbnail preview tool 138 of FIG. 1B), faceted audio timeline 1420 and faceted artifacts timeline 1430 (e.g., controlled by feature visualization tool 134 of FIG. 1B), and marquee selection 1440 (e.g., controlled by marquee selection and snapping tool 136 of FIG. 1B).

In an example implementation, editor interface 1400 presents video timeline 1405 which represents an active video segmentation (e.g., by displaying segment boundaries as an underlay). In an example use case, a user loads a video for editing, for example, using a file explorer to identify the location of the video (not depicted), the video is ingested to generate one or more segmentations (e.g., by video ingestion tool 160 and/or video segmentation component 180 of FIG. 1A), and/or editor interface 1400 initializes video timeline 1405 with a segmentation of the entire video (e.g., a default segmentation). In another example use case, a subset of the video segments in a video has previously been selected or otherwise designated for editing (e.g., when switching from a finder interface where one or more video segments have been added to a selected clips panel, when loading an existing editing project). When editor interface 1400 is opened and/or the existing editing project is loaded, editor interface 1400 initializes video timeline 1405 with the designated video segments. In some cases, video timeline 1405 represents a composite video formed by those video segments that were designated for editing and/or a re-segmentation of those video segments (e.g., a search segmentation). At a high level, a user can select, edit, move, delete, or otherwise manipulate video segments from video timeline 1405.

In an example implementation, finder and editor interfaces are linked by one or more navigational elements (e.g., finder and editor buttons 1095 of 1097 of FIG. 10, finder and editor buttons 1495 of 1497 of FIG. 14) which switch back and forth between the finder and editor interfaces. In this implementation, a user can use the finder interface to browse a video and add video segments to a selection, switch to the editor interface, and perform one or more refinements or other editing operations. In some embodiments, when a user designates video segments for editing from the finder and switches to the editor interface, the editor interface creates a representation of a composite video that arranges the selected video segments in chronological order, in the order they were added to the selection, in some designated order (e.g., the order they were arranged in a selected clips panels), and/or otherwise. In some embodiments, editor interface 1400 (e.g., video timeline 1405) represents the boundaries of the designated video segments and/or represents detected features in the designated video segments. In an example implementation of editor interface 1400, a user can only browse content that has already been added to a composite video; the user can prune away content that is no longer desired, but to add new content to the composite video, the user returns to the finder interface.

In some embodiments of editor interface 1400, a user can scrub through video timeline 1405 and skip to different parts of a composite video by clicking on the timeline. Additionally or alternatively, a user can skip to different parts of a composite video by scanning transcript 1445 and clicking on a particular portion (e.g., a word). In some embodiments, a transcript is presented side-by-side with the video, on top of the video (e.g., as in FIG. 14), and/or otherwise.

In some embodiments, to help identify particular parts of the composite video, video timeline 1405 represents one or more detected features and/or where they are located in the composite video (e.g., corresponding feature ranges). In some embodiments, video timeline 1405 represents each category of detected feature with a corresponding faceted timeline that represents detected facets (e.g., faces, audio classifications, visual scenes, visual artifacts, objects or actions, etc.) and their respective locations in that video segment. In some embodiments, a user can customize the visualized features on video timeline 1405 by turning on/off the visualizations for a particular category of feature (e.g., by clicking on buttons 1462, 1464, 1466, 1468 to control the visualizations for people, sounds, visual scenes, and visual artifacts, respectively). In the embodiment illustrated in FIG. 14, a user has activated visualizations for sounds (e.g., via button 1464) and visual artifacts (e.g., via button 1468), so video timeline 1405 includes faceted audio timeline 1420 and faceted artifacts timeline 1430. In some embodiments, clicking on a particular facet from a faceted timeline serves to select a corresponding part of the video (e.g., as illustrated by marquee selection 1440 of a portion of the video with a selected visual artifact). This way, for example, a user can easily select the parts of the video with detected visual artifacts and delete them. Generally, snapping to semantically meaningful snap points helps users trim quickly.

In some embodiments, a portion of the composite video represented by video timeline 1405 is selectable through interactions with video timeline 1405 and/or transcript 1445. Generally, the selection is emphasized in any suitable way, such as outlining (e.g., with a dashed line), adding a fill to a selected region (e.g., a transparent fill), and/or other ways. In an example implementation, a selection (e.g., a marquee selection, such as marquee selection 1440) is created by clicking or tapping and dragging across the video segments represented in video timeline 1405 or across transcript 1445. In some embodiments, a selection made in one element (video timeline 1405 or transcript 1445) additionally emphasizes (e.g., highlights) a corresponding portion of the other element (not illustrated). In some cases, a selection can be edited after it is drawn by clicking and dragging the start and/or end point of the selection. In an example implementation, a selection drag operation (e.g., along video timeline 1405, transcript 1445) snaps selection boundaries to snap points defined by a snap point segmentation and/or a current zoom level (e.g., computed as described above). In some embodiments, video timeline 1405 presents a visualization of the snap points defined by a snap point segmentation and/or a current zoom level. In some cases, the snap points are displayed only during a drag operation (e.g., on video timeline 1405), such that the displayed snap points on video timeline 1405 disappear when the drag operation is released.

Figure 15A:
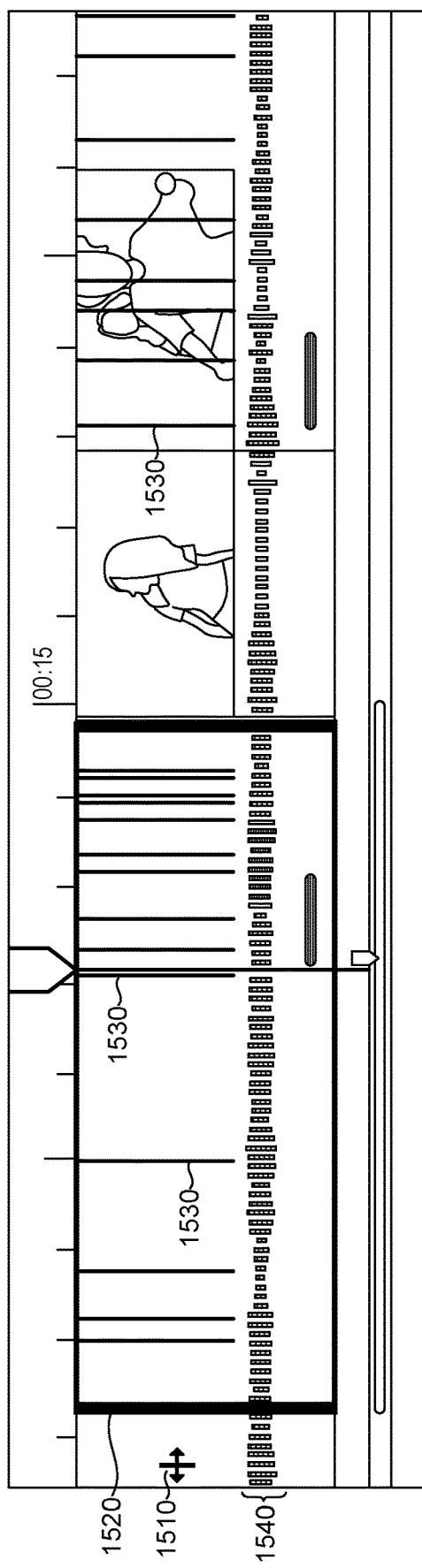
FIGS. 15A-15B are illustrations of an example marquee selection with snapping, in accordance with embodiments of the present invention.
Figure 15B:
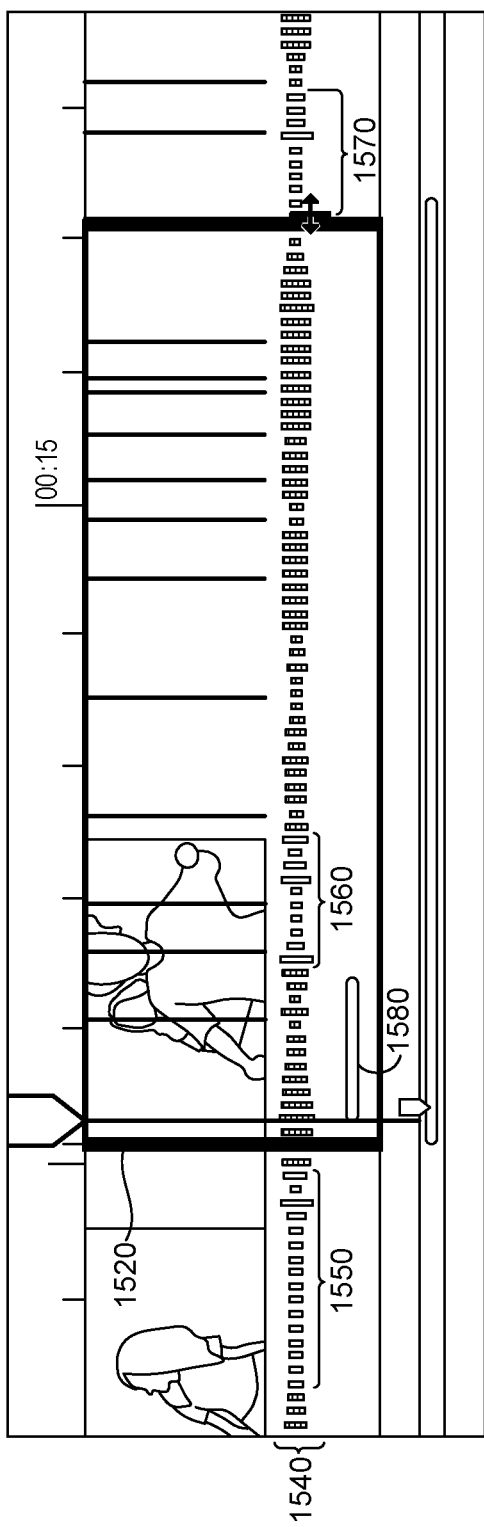

FIGS. 15A-15B are illustrations of an example marquee selection with snapping. In FIG. 15A, a user has clicked with cursor 1510 and is dragging to the left, creating marquee selection 1520, which snaps to the snap points illustrated with vertical bars (e.g., snap points 1530). In this example the user had previously added video segments that included matches for the query "giggle," so some of the video segments matched based on detected giggles in the audio track. In FIGS. 15A-15B, faceted audio timeline 1540 represents different detected audio classifications in different ways (e.g., by representing detected music with one color, detected speech with a second color, and other sounds with a third color), as well as the volume levels of the audio track. In FIG. faceted audio timeline 1540 represents detected giggles 1550, 1560, 1570 as other sounds. However, detected giggle 1560 is from a video segment with a detected visual artifact 1580. To remove that clip, the user moves marquee selection 1520 to the updated location illustrated in FIG. making sure to omit the parts of the video with the other detected giggles 1550 and 1570. As such, the user can delete the video segment inside marquee selection 1520 in FIG. 15B to remove the video segment with detected visual artifact 1580 from the composite video.

Returning to FIG. 14, in some embodiments, video timeline 1405 presents one or more thumbnails (e.g., thumbnails 1410). In an example implementation, when a user first opens editor interface 1400, editor interface 1400 (e.g., video timeline 1405) represents each video segment in the video with a thumbnail at the start of each video segment. Additionally or alternatively, editor interface 1400 (e.g., video timeline 1405) represents thumbnails at locations of the video identified by a thumbnail segmentation (e.g., computed as described above). In an example implementation, each video segment has at least one thumbnail, with longer video segments more likely to include multiple thumbnails. In some embodiments, when a user zooms into video timeline 1405, more thumbnails appear (e.g., based on a thumbnail segmentation computed at that zoom level), and/or thumbnails visible at higher zoom level remain in place. As such, thumbnails on video timeline 1405 serve as landmarks to help navigate a video and select video segments.

In some embodiments, video timeline 1405 includes a zoom/scroll bar tool (e.g., controlled by zoom/scroll bar tool 140 of FIG. 1B), which allows the user to change the zoom level and scroll to different positions on the video timeline 1405. In some cases, snap points, thumbnails, and/or visualized features are dependent on zoom level. In an example implementation, when a user zooms in on a video timeline, different snap point segmentations and/or thumbnail segmentations are computed or looked up based on the zoom level (e.g., different zoom levels are mapped to different values of one or more segmentation parameters, such as target video segment lengths, target minimum interval between snap points, target minimum interval between thumbnails). Additionally or alternatively, editor interface 1400 provides one or more interaction elements that expose one or more segmentation parameters for a snap point segmentation and/or a thumbnail segmentation, giving the user the ability to control the granularity of a snap point segmentation and/or a thumbnail segmentation. In some embodiments, zooming in and out of video timeline 1405 expands and reduce the details of visualized features on video timeline 1405. In an example implementation, a high zoom level displays an audio facet timeline representing MSO (music/speech/other) audio classifications, and zooming in adds a representation of detected audio events to video timeline 1405. Additionally or alternatively, higher zoom levels consolidate feature ranges or other feature visualizations, which are expanded to show more detail at lower zoom levels.

In some embodiments, editor interface 1400 accepts a query (e.g., keyword and/or facet), triggers a temporary search segmentation that segments the video segments in the composite video based on the query, and presents a visualization of the search segmentation (e.g., by illustrating the boundaries of its video segments as an underlay to video timeline 1405). In the embodiment illustrated in FIG. 14, editor interface 1400 includes search bar 1450. In this example, search bar 1450 accepts a query in the form of one or more keywords (e.g., entered in search field 1470) and/or one or more selected facets (e.g., entered through corresponding menus accessible via buttons 1462, 1464, 1466, and 1468), and triggers a search segmentation that re-segments the video segments in the composite video based on the query. In an example implementation, a user types in one or more keywords into search field 1470 and/or selects one or more facets through menus or other interaction elements that represent feature categories (feature tracks) and/or corresponding facets (detected features). In FIG. 14, interacting with buttons 1462, 1464, 1466, and 1468 (e.g., by hovering over the menu, left clicking on a button corner, right clicking) activates a corresponding menu showing detected people (button 1462), detected sounds (button 1464), detected visual scenes (button 1466), and detected visual artifacts (button 1468). As such, a user can navigate faceted search menus, select one or more facets (e.g., a particular face, sound classification, visual scene, and/or visual artifact), enter one or more keywords into search field 1470, and run a search (e.g., by clicking on a facet, existing a faceted search menu, clicking on a search button, etc.).

In some embodiments, when a user makes a query through a facet or keyword, search bar 1450 triggers a temporary search segmentation and highlights the matching video segments in video timeline 1405. In this example, the search segmentation is considered temporary because it does not perform any destructive operations on the video segments in the composite video. If the user makes another query by adding or removing keywords or facets, search bar 1450 triggers a new temporary search segmentation. If the user deletes or removes the query, the search segmentation disappears, and video timeline 1405 recalls the representation of the composite video as it was before searching. In some embodiments, keyword and facet queries persist until a user deletes or removes them, clearing any search result highlighting. In an example implementation, search state does not persist as a user switches back and forth between finder and editor interfaces.

In some embodiments, a search segmentation in editor interface 1400 respects any existing video segments in the composite video without changing any of its boundaries (e.g., the search segmentation is run separately on each video segment in the composite video). If a user performs an action on a search result (e.g. deletes a matching video segment), new edit boundaries are created to reflect the action. In other words, if a user searches for "tree" and deletes a video segment showing a tree in one part of the composite video but not in another, the part where the user performed the operation (in this case, a deletion) will have new segment boundaries, but the other parts will not. In some embodiments, search results are impacted by zoom level (e.g., shown with more precision or detail with zoom level) and/or corresponding regions on video timeline 1405 are illustrated to show where in the composite video the query is ON.

Thus, various embodiments of video timeline 1405 present a high-level overview of visual and audio content contained within a composite video, depending on feature categories that are toggled on, search criteria zoom level, and screen size. As such, in various embodiments, a user can simultaneously view detected features, snap points, video thumbnails, and/or search results to help user choose good cut points.

In an example implementation, after selecting one or more video segments, one or more editing functions provided by editor interface 1400 are used to edit the selected video segments. For example, editor panel 1460 provides any number of editing functions for a selected video segment. Depending on the implementation, available editing functions include stylistic refinements that transform content (e.g., wind noise reduction), duration-impacting refinements that elide content (e.g., "hiding" regions of footage, removing swear words, make a time lapse, shorten to n seconds), and/or contextual functions that depend on selected content (e.g., remove or beep words from content with a corresponding transcript). In some embodiments, refinement of video properties are declarative and non-destructive. For example, if a marquee selection is made and overlaps portions of the composite video that have previously applied properties, any newly applied properties will overwrite conflicting properties with the new value. In various embodiments, editor panel 1460 provides any suitable editing functionality, including rearranging, cropping, applying transitions or effects (e.g., change speed, volume), adjusting color, adding titles or graphics, and/or others.

As such, the resulting composite video can be played back, saved, exported, or other operations are performed. In one example, the video segments in the composite video are played back (e.g., upon clicking a play button), skipping video segments that are not in the composite video. In another example, the video segments in the composite video are exported. Depending on the implementation, any known tool or technique is used to perform any type of operation on the video segments in the composite video.

The foregoing video segmentation and interaction techniques are meant simply as examples. Other variations, combination, and subcombinations are contemplated within the scope of the present disclosure.

Example Flow Diagrams

With reference now to FIGS. 16-22, flow diagrams are provided illustrating various methods. Each block of the methods 1600 through 2200 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Figure 16A:
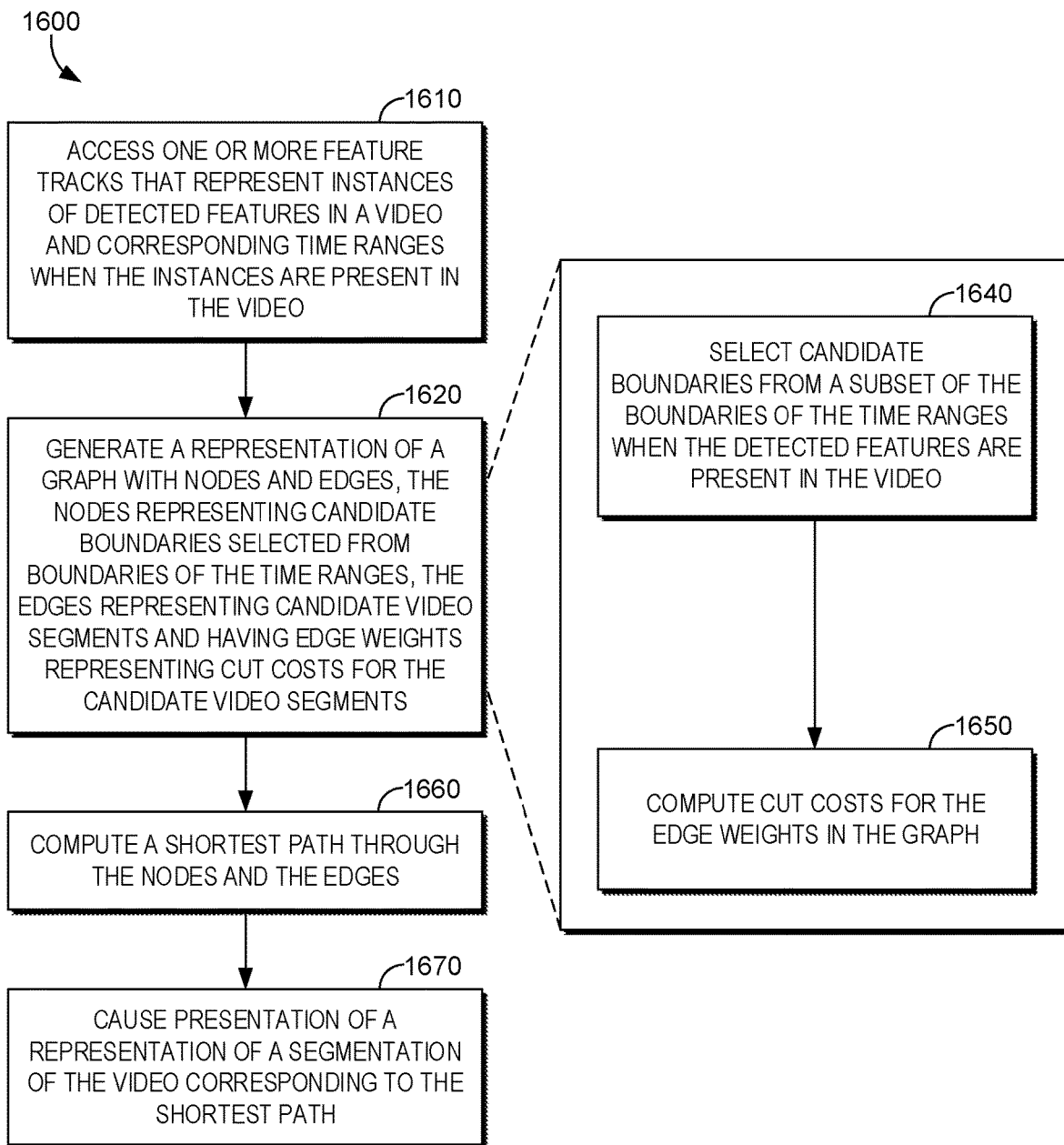
FIGS. 16A-16B are flow diagrams showing a method for generating a video segmentation using a graphical model, in accordance with embodiments of the present invention.
Figure 16B:
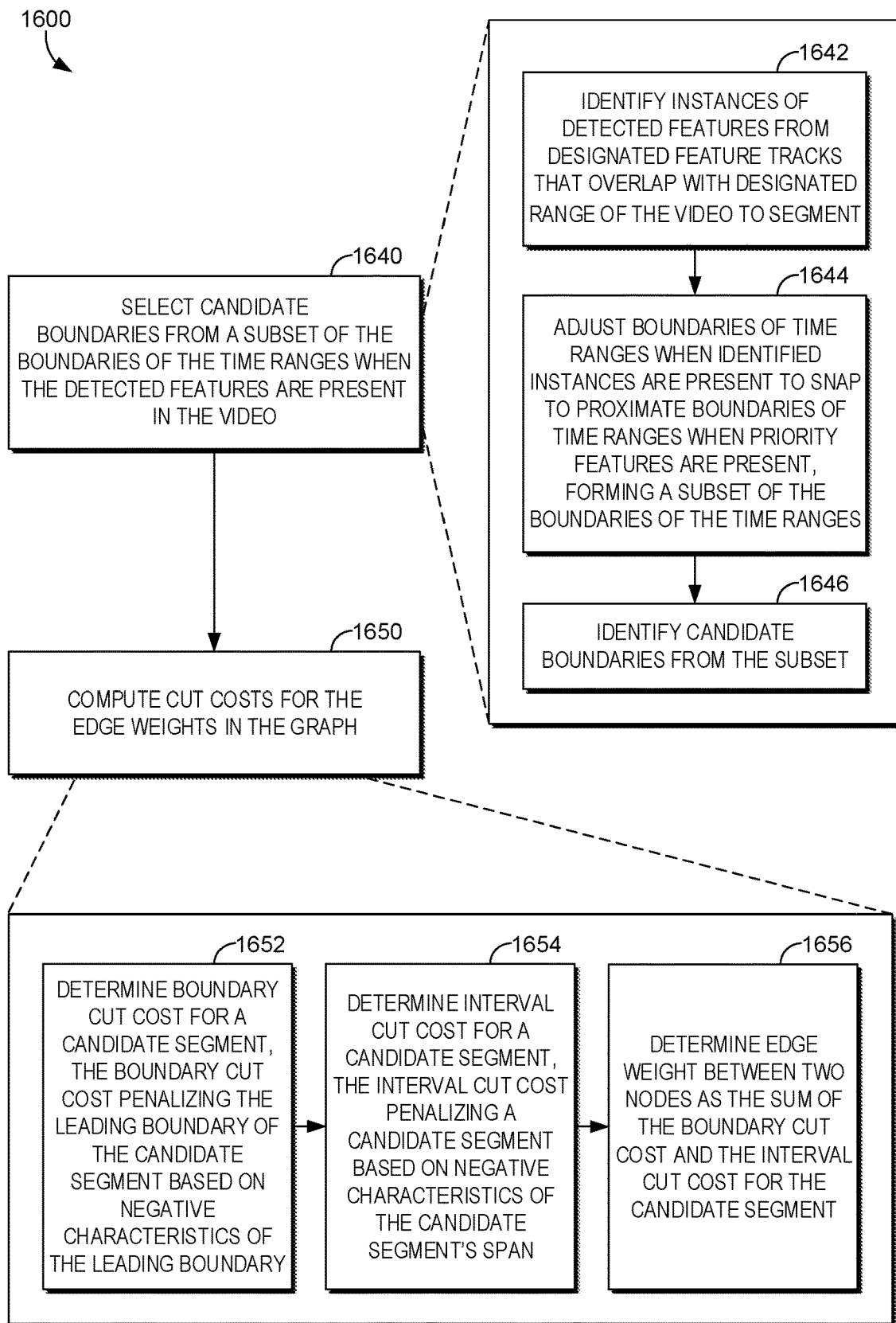

Turning initially to FIGS. 16A-16B, these figures illustrate a method 1600 for generating a video segmentation using a graphical model, in accordance with embodiments described herein. Initially at block 1610, one or more feature tracks are accessed. The one or more feature tracks represent instances of detected features in a video and corresponding time ranges when the instances are present in the video. In order to generate an optimal video segmentation, candidate segmentations are evaluated using a graphical model. More specifically, at block 1620, a representation of a graph is generated with nodes and edges, such that the nodes represent candidate boundaries selected from boundaries of the time ranges, and the edges represent candidate video segments and have edge weights that represent cut costs for the candidate video segments. Blocks 1640 and 1650 illustrate a possible way of performing at least a portion of block 1620.

At block 1640, candidate boundaries are selected from a subset of the boundaries of the time ranges when the detected features are present in the video. Blocks 1642-1646 of FIG. 16B illustrate a possible way of performing at least a portion of block 1640. At block 1642, instances of detected features are identified from designated feature tracks that overlap with a designated range of the video to segment. These identified features can be thought of as "overlapping features" because they are present in the video during time ranges that overlap with the designated range of the video to segment (e.g., the entire video, a particular video segment). At block 1644, boundaries of time ranges when the identified instances (the overlapping features) are present are adjusted to snap to proximate boundaries of time ranges when priority features are present, forming a subset of the boundaries of the time ranges. In an example implementation, a prioritized list of features includes transcript features (e.g., sentences), then visual scenes, then faces. At block 1646, candidate boundaries are identified from the subset.

At block 1650, cut costs are computed for the edge weights in the graph. Blocks 1652-1656 of FIG. 16B illustrate a possible way of performing at least a portion of block 1650. At block 1652, boundary cut cost for a candidate segment is determined. In an example embodiment, the boundary cut cost penalizes the leading boundary of the candidate segment based on negative characteristics of the leading boundary. In some embodiments, boundary cut cost penalizes the leading boundary of the candidate segment for being within a detected feature from another feature track (e.g., a detected word), based on distance to a detected visual scene boundary of the boundaries of the time ranges, or in other scenarios. In some embodiments, boundary cut cost is computed using equation 1. At block 1654, interval cut cost for a candidate segment is determined. In an example embodiment, the interval cut cost penalizes a candidate segment based on negative characteristics of the candidate segment's span. In some embodiments, interval cut cost penalizes candidate segments that have a length outside a target minimum or maximum length, candidate segments that have incoherence of overlapping features from other feature tracks, and/or candidate segments that overlap both query ON and OFF features. At block 1656, edge weight between two nodes is determined as the sum of the boundary cut cost and the interval cut cost for the candidate segment.

Returning to FIG. 16A, at block 1660, a shortest path through the nodes and the edges is computed. At block 1670, presentation of a representation of a segmentation of the video corresponding to the shortest path is caused.

Figure 17:
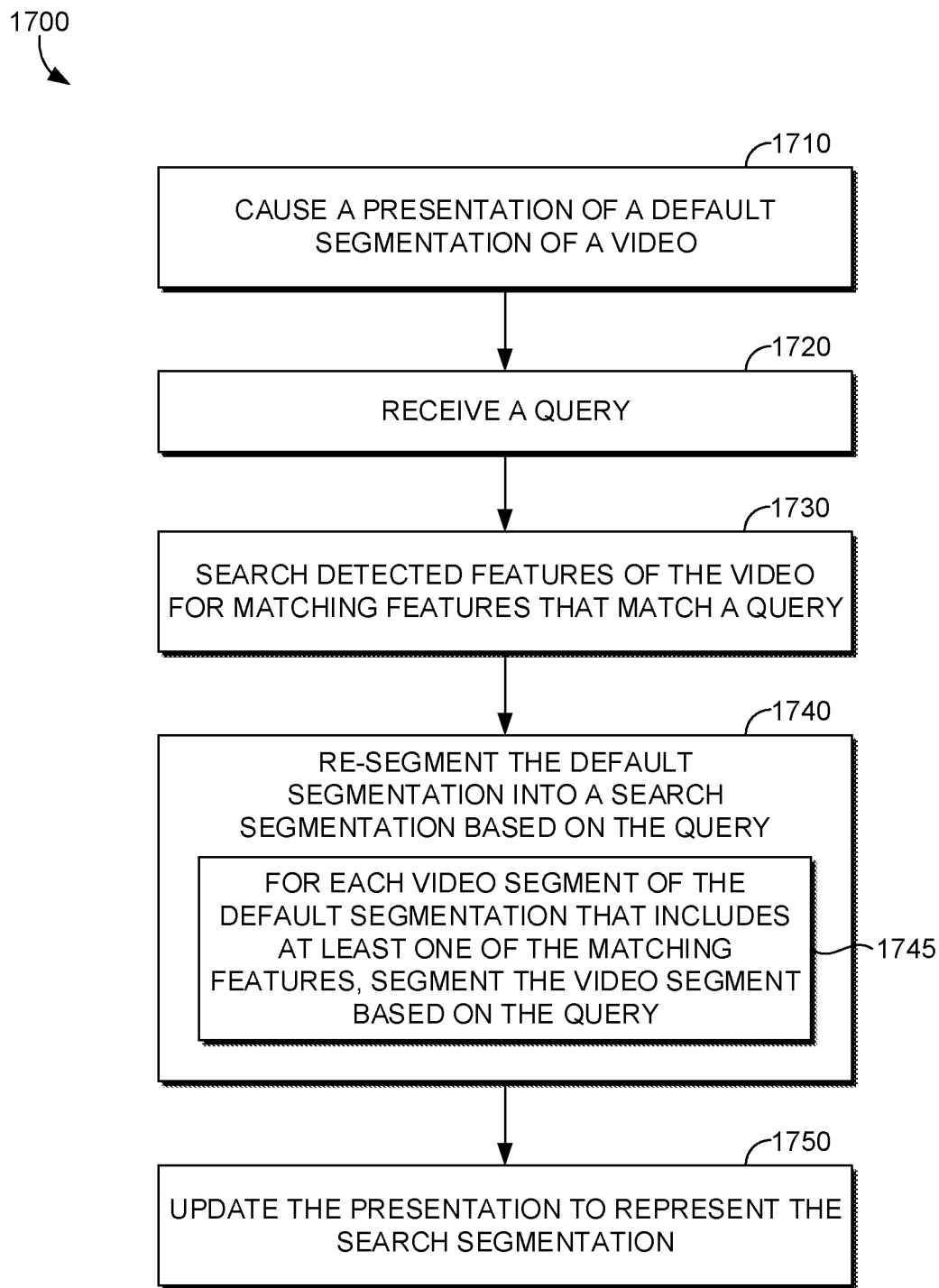
FIG. 17 is a flow diagram showing a method for segmenting a default segmentation of a video into a search segmentation, in accordance with embodiments of the present invention.

Turning now to FIG. 17, FIG. 17 illustrates a method 1700 for segmenting a default segmentation of a video into a search segmentation, in accordance with embodiments of the present invention. Initially at block 1710, a presentation of a default segmentation of a video is caused. At block 1720, a query is received. At block 1730, detected features of the video are searched for matching features that match a query. At block 1740, the default segmentation is re-segmented into a search segmentation based on the query. Block 1745 illustrates a possible way of performing at least a portion of block 1740. At block 1745, each video segment of the default segmentation that includes at least one of the matching features is segmented based on the query. At block 1750, the presentation is updated to represent the search segmentation.

Figure 18:
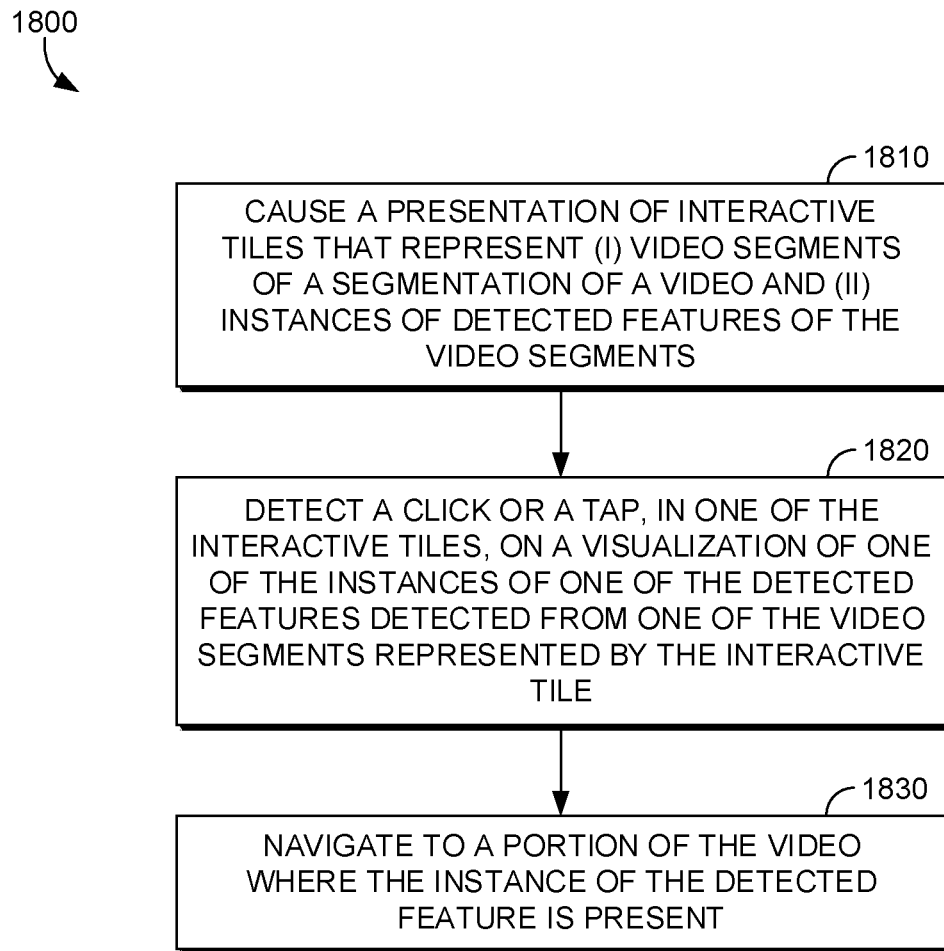
FIG. 18 is a flow diagram showing a method for navigating a video using interactive tiles, in accordance with embodiments of the present invention.

Turning now to FIG. 18, FIG. 18 illustrates a method 1800 for navigating a video using interactive tiles, in accordance with embodiments of the present invention. Initially at block 1810, a presentation is caused of interactive tiles that represent (i) video segments of a segmentation of a video and (ii) instances of detected features of the video segments. At block 1820, a click or a tap in one of the interactive tiles is detected. More specifically, the click or tap is on a visualization of one of the instances of one of the detected features detected from one of the video segments represented by the interactive tile. At block 1830, the video is navigated to a portion of the video where the instance of the detected feature is present.

Figure 19:
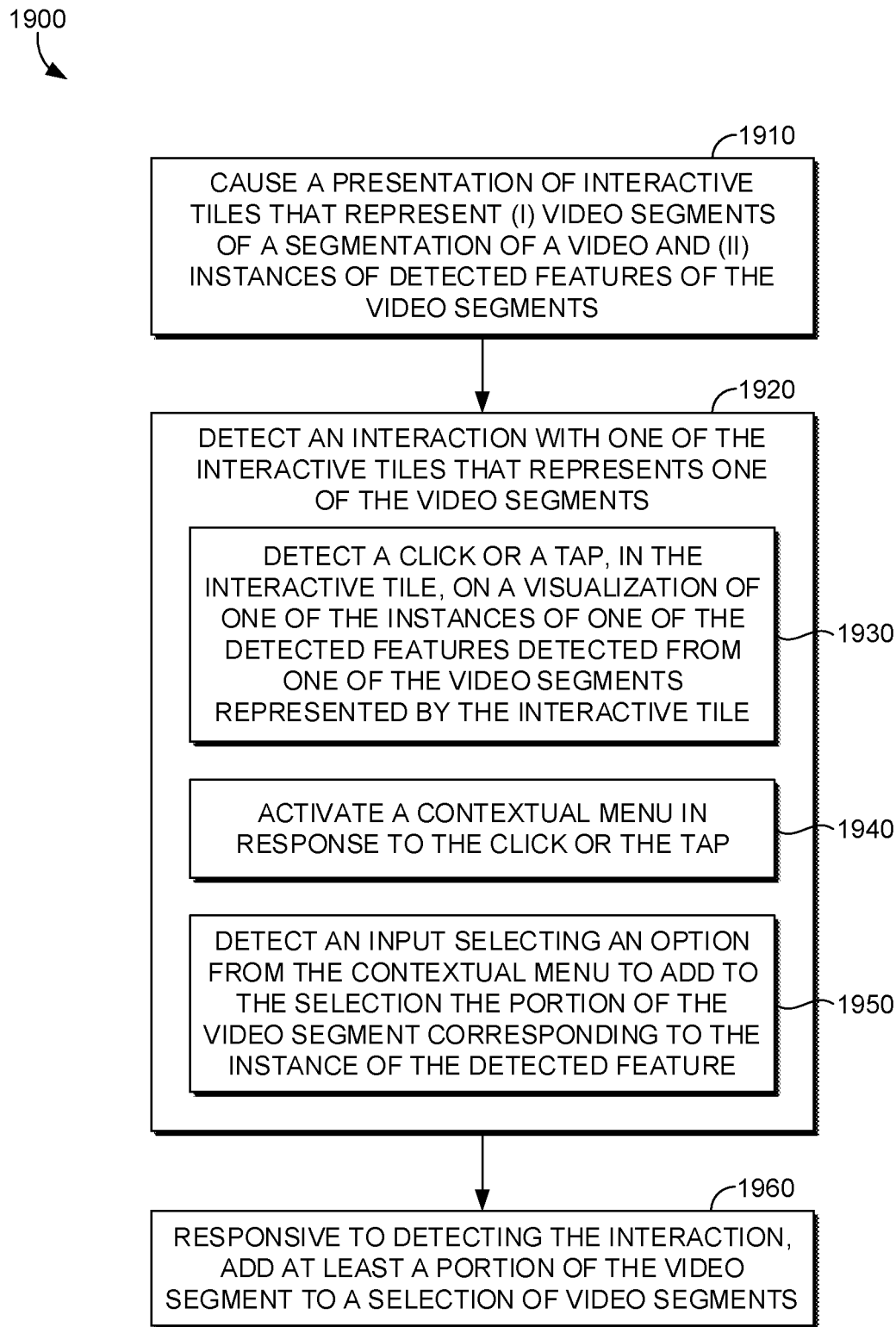
FIG. 19 is a flow diagram showing a method for adding to a selection of video segments, in accordance with embodiments of the present invention.

Turning now to FIG. 19, FIG. 19 illustrates a method 1900 for adding to a selection of video segments, in accordance with embodiments of the present invention. Initially at block 1910, a presentation is caused of interactive tiles that represent (i) video segments of a segmentation of a video and (ii) instances of detected features of the video segments. At block 1920, an interaction with one of the interactive tiles that represents one of the video segments is detected. Blocks 1930-1950 illustrate a possible way of performing at least a portion of block 1920. At block 1930, a click or a tap (e.g., a right click or a tap and hold) in the interactive tile is detected. The click or tap is on a visualization of one of the instances of one of the detected features detected from one of the video segments represented by the interactive tile. At block 1940, a contextual menu is activated in response to the click or tap. At block 1950, an input selecting an option from the contextual menu is detected. The option is to add to the selection the portion of the video segment corresponding to the instance of the detected feature. At block 1960, at least a portion of the video segment is added to a selection of video segments responsive to detecting the interaction.

Figure 20:
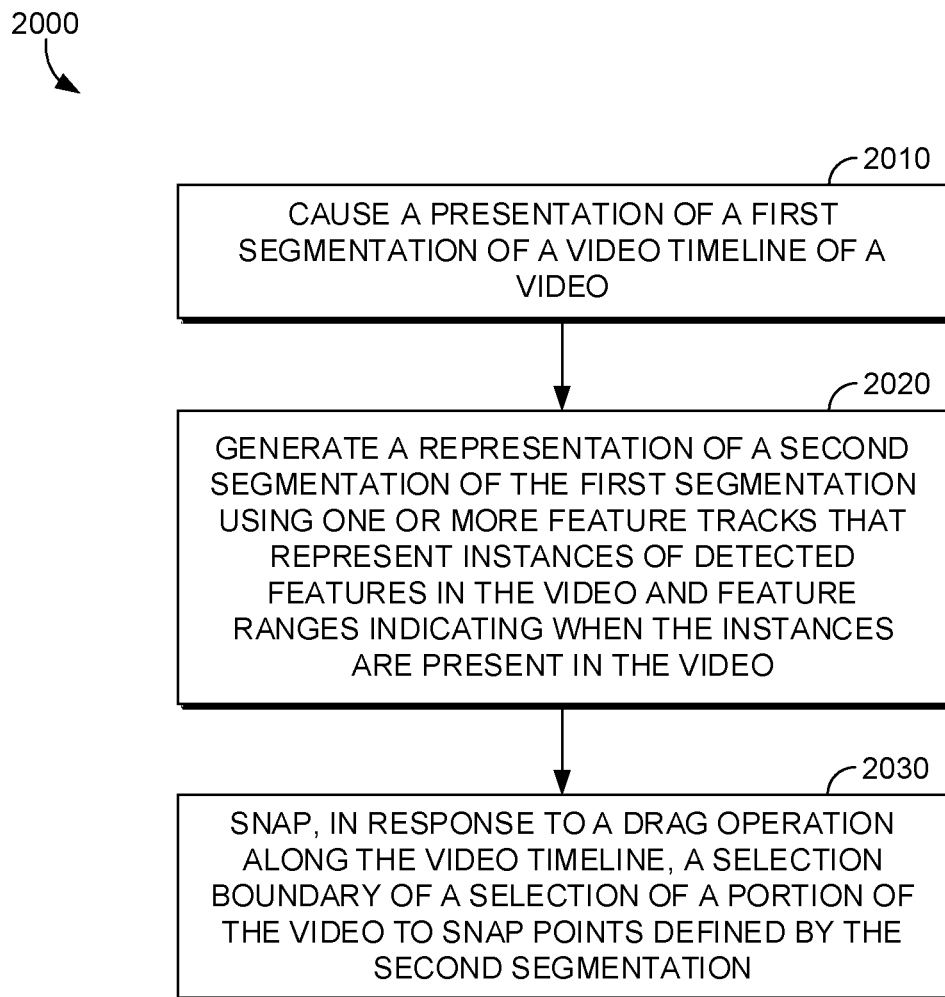
FIG. 20 is a flow diagram showing a method for snapping a selection boundary of a selection of video segments, in accordance with embodiments of the present invention.

Turning now to FIG. 20, FIG. 20 illustrates a method 2000 for snapping a selection boundary of a selection of video segments, in accordance with embodiments of the present invention. Initially at block 2010, a presentation of a first segmentation of a video timeline of a video is caused. At block 2020, a representation of a second segmentation of the first segmentation is generated using one or more feature tracks that represent instances of detected features in the video and feature ranges indicating when the instances are present in the video. At block 2030, in response to a drag operation along the video timeline, a selection boundary of a selection of a portion of the video is snapped to snap points defined by the second segmentation.

Figure 21:
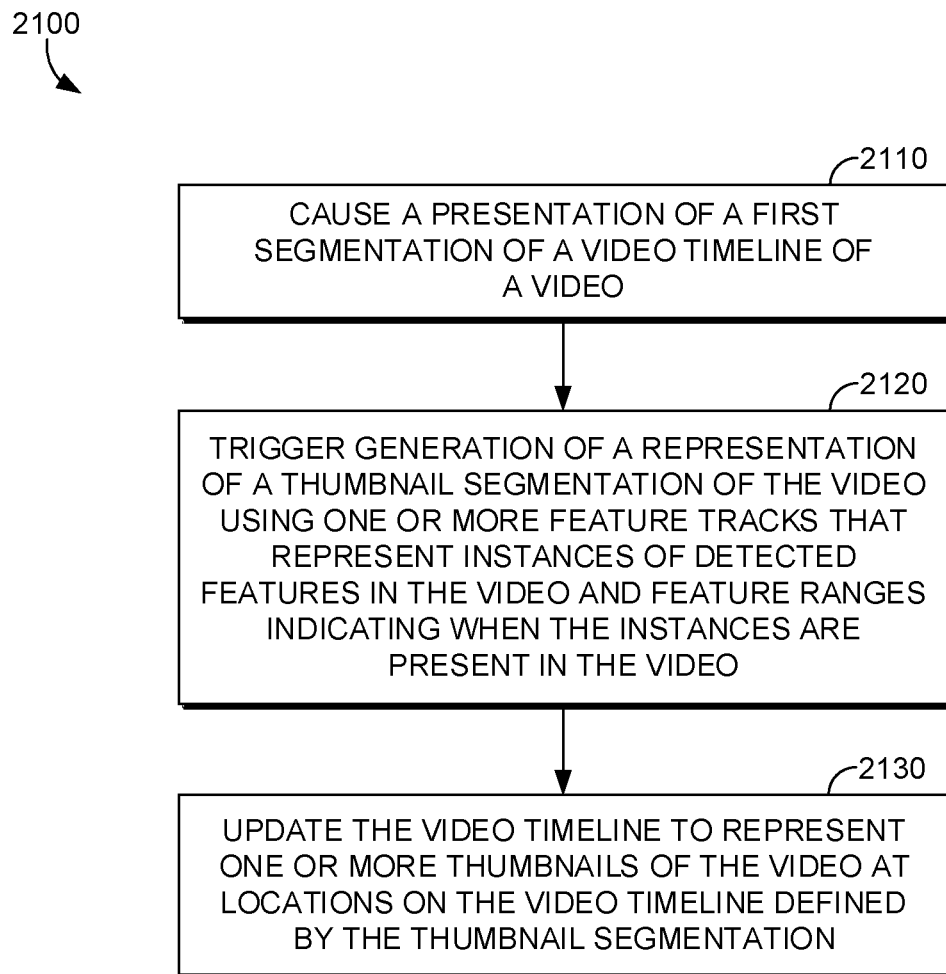
FIG. 21 is a flow diagram showing a method for presenting a video timeline with thumbnails at locations defined by a thumbnail segmentation, in accordance with embodiments of the present invention.

Turning now to FIG. 21, FIG. 21 illustrates a method 2100 for presenting a video timeline with thumbnails at locations defined by a thumbnail segmentation, in accordance with embodiments of the present invention. Initially at block 2110, a presentation of a first segmentation of a video timeline of a video is caused. At block 2120, generation of a representation of a thumbnail segmentation of the video is triggered. Generation of the representation of the thumbnail segmentation uses one or more feature tracks that represent instances of detected features in the video and feature ranges indicating when the instances are present in the video. At block 2130, the video timeline is updated to represent one or more thumbnails of the video at locations on the video timeline defined by the thumbnail segmentation.

Figure 22:
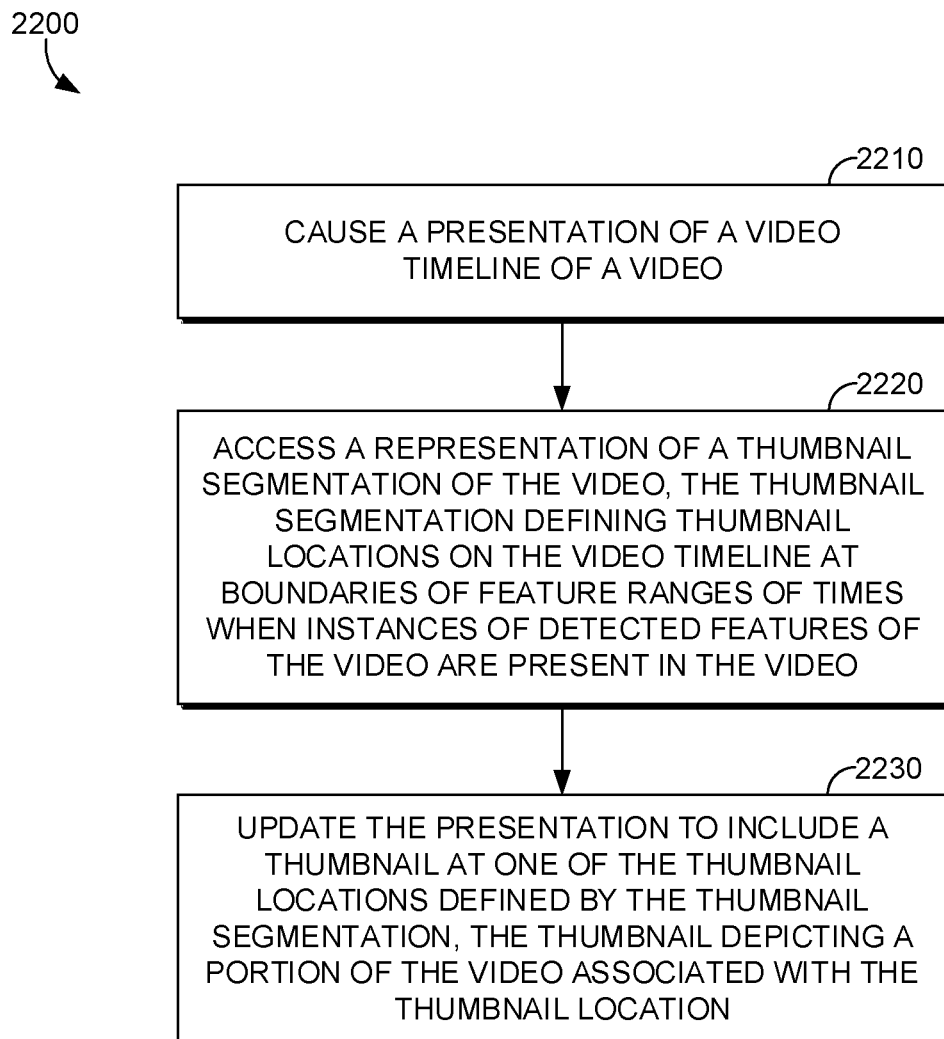
FIG. 22 is a flow diagram showing another method for presenting a video timeline with thumbnails at locations defined by a thumbnail segmentation, in accordance with embodiments of the present invention.

Turning now to FIG. 22, FIG. 22 illustrates a method 2200 for presenting a video timeline with thumbnails at locations defined by a thumbnail segmentation. Initially at block 2210, a presentation of a video timeline of a video is caused. At block 2220, a representation of a thumbnail segmentation of the video is accessed. The thumbnail segmentation defines thumbnail locations on the video timeline at boundaries of feature ranges of times when instances of detected features of the video are present in the video. At block 2230, the presentation is updated to include a thumbnail at one of the thumbnail locations defined by the thumbnail segmentation, and the thumbnail depicts a portion of the video associated with the thumbnail location.

Example Operating Environment

Figure 23:
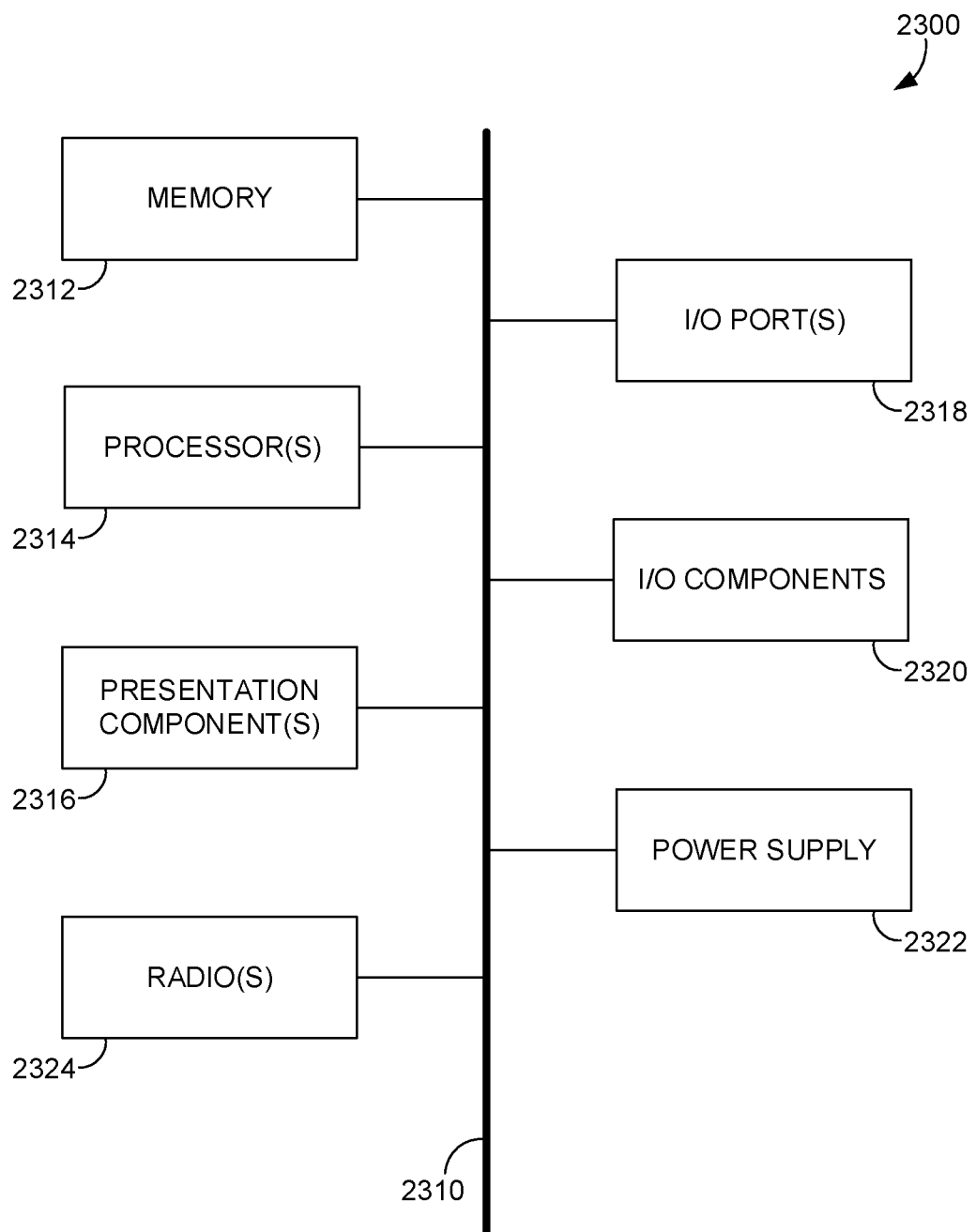
FIG. 23 is a block diagram of an example computing environment suitable for use in implementing embodiments of the present invention.

Having described an overview of embodiments of the present invention, an example operating environment in which embodiments of the present invention may be implemented is described below in order to provide a general context for various aspects of the present invention. Referring now to FIG. 23 in particular, an example operating environment for implementing embodiments of the present invention is shown and designated generally as computing device 2300. Computing device 2300 is but one example of a suitable computing environment and is not intended to suggest any limitation as to the scope of use or functionality of the invention. Neither should computing device 2300 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 23, computing device 2300 includes bus 2310 that directly or indirectly couples the following devices: memory 2312, one or more processors 2314, one or more presentation components 2316, input/output (I/O) ports 2318, input/output components 2320, and illustrative power supply 2322. Bus 2310 represents what may be one or more busses (such as an address bus, data bus, or combination thereof). Although the various blocks of FIG. 23 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 23 is merely illustrative of an example computing device that can be used in connection with one or more embodiments of the present invention. Distinction is not made between such categories as "workstation," "server," "laptop," "hand-held device," etc., as all are contemplated within the scope of FIG. 23 and reference to "computing device."

Computing device 2300 typically includes a variety of computer-readable media. Computer-readable media can be any available media that can be accessed by computing device 2300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 2300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2312 includes computer-storage media in the form of volatile and/or nonvolatile memory. The memory may be removable, non-removable, or a combination thereof. Example hardware devices include solid-state memory, hard drives, optical-disc drives, etc. Computing device 2300 includes one or more processors that read data from various entities such as memory 2312 or I/O components 2320. Presentation component(s) 2316 present data indications to a user or other device. Example presentation components include a display device, speaker, printing component, vibrating component, etc.

I/O ports 2318 allow computing device 2300 to be logically coupled to other devices including I/O components 2320, some of which may be built in. Illustrative components include a microphone, joystick, game pad, satellite dish, scanner, printer, wireless device, etc. The I/O components 2320 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 2300. Computing device 2300 may be equipped with depth cameras, such as stereoscopic camera systems, infrared camera systems, RGB camera systems, touchscreen technology, and combinations of these, for gesture detection and recognition. Additionally, the computing device 2300 may be equipped with accelerometers or gyroscopes that enable detection of motion. The output of the accelerometers or gyroscopes may be provided to the display of computing device 2300 to render immersive augmented reality or virtual reality.

Embodiments described herein support video editing or playback. The components described herein refer to integrated components of a video editing system. The integrated components refer to the hardware architecture and software framework that support functionality using the video editing system. The hardware architecture refers to physical components and interrelationships thereof and the software framework refers to software providing functionality that can be implemented with hardware embodied on a device.

The end-to-end software-based video editing system can operate within the video editing system components to operate computer hardware to provide video editing system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the video editing system components can manage resources and provide services for the video editing system functionality. Any other variations and combinations thereof are contemplated with embodiments of the present invention.

Although some implementations are described with respect to neural networks, generally embodiments may be implemented using any type of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:

causing a presentation of a first segmentation of a video timeline of a video;

triggering generation of a representation of a thumbnail segmentation of the video using one or more feature tracks that represent instances of detected features in the video and feature ranges indicating when the instances are present in the video, the thumbnail segmentation determined by penalizing (i) candidate thumbnail locations based on similarity between consecutive thumbnails, or (ii) candidate thumbnail separations that are less than a minimum separation apart; and updating the video timeline to visually represent one or more thumbnails of the video at locations on the video timeline that are defined by the thumbnail segmentation.

2. The one or more computer storage media of claim 1, wherein the video timeline includes an initial thumbnail at each location on the video timeline where a video segment of the first segmentation begins.

3. The one or more computer storage media of claim 1, the operations further comprising selecting the candidate thumbnail locations for the thumbnail segmentation from boundaries of the feature ranges.

4. The one or more computer storage media of claim 1, the thumbnail segmentation determined by penalizing the candidate thumbnail locations based on the similarity between the consecutive thumbnails.

5. The one or more computer storage media of claim 1, the thumbnail segmentation determined by penalizing the candidate thumbnail separations less than the minimum separation apart, the minimum separation corresponding to a minimum pixel separation between the consecutive thumbnails on the video timeline.

6. The one or more computer storage media of claim 1, the thumbnail segmentation determined by penalizing the candidate thumbnail separations less than the minimum separation apart, the minimum separation corresponding to a minimum pixel separation between the consecutive thumbnails on the video timeline, the minimum pixel separation being dependent on a zoom level of the video timeline.

7. The one or more computer storage media of claim 6, wherein the minimum pixel separation corresponds to thumbnail width.

8. A computerized method comprising:

causing a presentation of a video timeline of a video;

accessing a representation of a thumbnail segmentation of the video, the thumbnail segmentation defining thumbnail locations on the video timeline at boundaries of feature ranges of times when instances of detected features of the video are present in the video and determined by penalizing candidate thumbnail locations based on similarity between consecutive thumbnails; and updating the presentation to include at least one thumbnail at one of the thumbnail locations on the video timeline that are defined by the thumbnail segmentation.

9. The computerized method of claim 8, wherein the presentation of the video timeline represents video segments of a default segmentation of the video, wherein the video timeline includes an initial thumbnail at each location on the video timeline where one of the video segments begins.

10. The computerized method of claim 8, further comprising selecting the candidate thumbnail locations for the thumbnail segmentation from the boundaries of the feature ranges for a category of the detected features, the category comprising detected faces, detected sounds, detected visual scenes, or detected visual artifacts.

11. The computerized method of claim 8, the thumbnail segmentation determined by penalizing candidate thumbnail separations less than a minimum separation apart, the minimum separation corresponding to a minimum pixel separation between the consecutive thumbnails on the video timeline.

12. The computerized method of claim 8, the thumbnail segmentation determined by penalizing candidate thumbnail separations less than a minimum separation apart, the minimum separation corresponding to a minimum pixel separation between the consecutive thumbnails on the video timeline, the minimum pixel separation being dependent on a zoom level of the video timeline.

13. The computerized method of claim 12, wherein the minimum pixel separation corresponds to thumbnail width.

14. A computer system comprising:
one or more hardware processors and memory configured to provide computer program instructions to the one or more hardware processors;
a video interaction engine configured to use the one or more hardware processors to perform operations comprising:
causing a presentation of a video timeline of a video;
accessing a representation of a thumbnail segmentation of the video, the thumbnail segmentation defining thumbnail locations on the video timeline at boundaries of feature ranges of times when instances of detected features of the video are present in the video and determined by penalizing candidate thumbnail separations less than a minimum separation apart; and
updating the presentation to include a thumbnail at one of the thumbnail locations that is defined by the thumbnail segmentation and independent of cursor location, the thumbnail depicting a portion of the video associated with the thumbnail location.

15. The computer system of claim 14, wherein the presentation of the video timeline represents video segments of a default segmentation of the video, wherein the video timeline includes an initial thumbnail at each location on the video timeline where one of the video segments begins.

16. The computer system of claim 14, the operations further comprising selecting candidate thumbnail locations for the thumbnail segmentation from the boundaries of the feature ranges for a category of the detected features, the category comprising detected faces, detected sounds, detected visual scenes, or detected visual artifacts.

17. The computer system of claim 14, the thumbnail segmentation determined by penalizing candidate thumbnail locations based on similarity between consecutive thumbnails.

18. The computer system of claim 14, the minimum separation corresponding to a minimum pixel separation between consecutive thumbnails on the video timeline.

19. The computer system of claim 14, the minimum separation corresponding to a minimum pixel separation between consecutive thumbnails on the video timeline, the minimum pixel separation being dependent on a zoom level of the video timeline.

* * * * *